(12) United States Patent
Miyamoto et al.

(10) Patent No.: US 6,249,305 B1
(45) Date of Patent: Jun. 19, 2001

(54) COLOR IMAGE FORMING APPARATUS

(75) Inventors: Takayuki Miyamoto, Kanagawa; Masaaki Ikeda, Tokyo; Yuji Okugawa, Tokyo; Hajime Tanaka, Tokyo; Naoki Tajima, Tokyo; Masahiro Shigetomi, Tokyo, all of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/076,462

(22) Filed: May 12, 1998

(30) Foreign Application Priority Data

| May 16, 1997 | (JP) | 9-127181 |
| May 16, 1997 | (JP) | 9-127182 |
| Jun. 10, 1997 | (JP) | 9-152053 |
| Sep. 19, 1997 | (JP) | 9-254913 |
| Dec. 22, 1997 | (JP) | 9-353052 |

(51) Int. Cl.[7] .................................................. G01D 9/42
(52) U.S. Cl. .................................. 347/232; 347/118
(58) Field of Search .................................. 399/118, 162, 399/178, 223, 179, 231, 298, 299; 347/115, 117, 118, 232, 241, 242, 245, 263

(56) References Cited

U.S. PATENT DOCUMENTS

| 5,181,137 | * | 1/1993 | Koide ........................... 359/217 |
| 5,257,037 | * | 10/1993 | Haneda et al. ................ 347/118 |
| 5,298,946 | * | 3/1994 | Haneda et al. ................ 399/112 |
| 5,313,259 | * | 5/1994 | Smith .............................. 399/76 |
| 5,365,258 | * | 11/1994 | Murata et al. ................ 347/232 |
| 5,381,167 | * | 1/1995 | Fujii et al. .................... 347/116 |
| 5,444,515 | * | 8/1995 | Haneda et al. ................ 399/112 |
| 5,473,421 | * | 12/1995 | Maruyama et al. .............. 399/39 |
| 5,557,377 | * | 9/1996 | Loewen et al. ................ 399/182 |
| 5,583,629 | * | 12/1996 | Brewington et al. .......... 399/302 |
| 5,585,912 | | 12/1996 | Shin et al. . |
| 5,666,599 | | 9/1997 | Miyasaka et al. . |
| 5,752,137 | * | 5/1998 | Haneda .......................... 399/223 |
| 5,842,095 | * | 11/1998 | Kitamura ....................... 399/299 |
| 5,914,741 | * | 6/1999 | Snelling et al. ............... 347/117 |
| 5,946,533 | * | 8/1999 | Omelchenko et al. ........ 399/223 |

FOREIGN PATENT DOCUMENTS

| 0616266 | 9/1994 | (EP) . |
| 0818716 | 1/1998 | (EP) . |
| 4-086847 | * 3/1992 | (JP) . |
| 9-243944 | * 9/1997 | (JP) . |

* cited by examiner

Primary Examiner—Robert Beatty
(74) Attorney, Agent, or Firm—Frishauf, Holtz, Goodman, Langer & Chick, P.C.

(57) ABSTRACT

An image forming apparatus is provided which includes an image carrying member, a plurality of charging devices for charging the image carrying member, a plurality of laser exposing units for scanning the charged image carrying member with laser beams so as to form latent images at a predetermined position on the image carrying member, a plurality of developing devices for developing the latent images so as to form toner images, and a transfer section for transferring the toner images onto a sheet. The plurality of laser exposing units are vertically arranged and fixed to each other as a single body so that each laser beam of the laser exposing units is parallel to another laser beam with a predetermined interval.

15 Claims, 33 Drawing Sheets

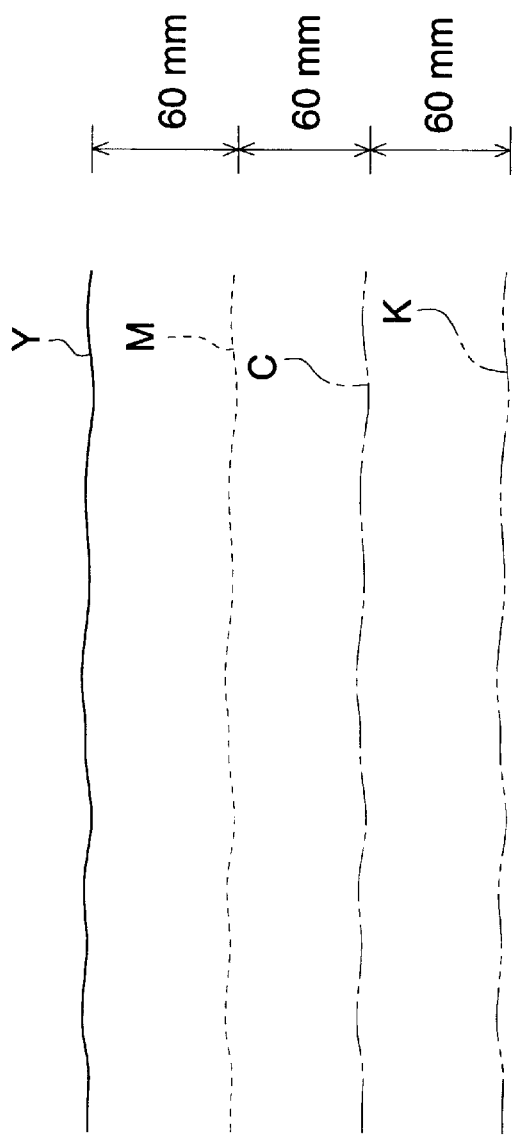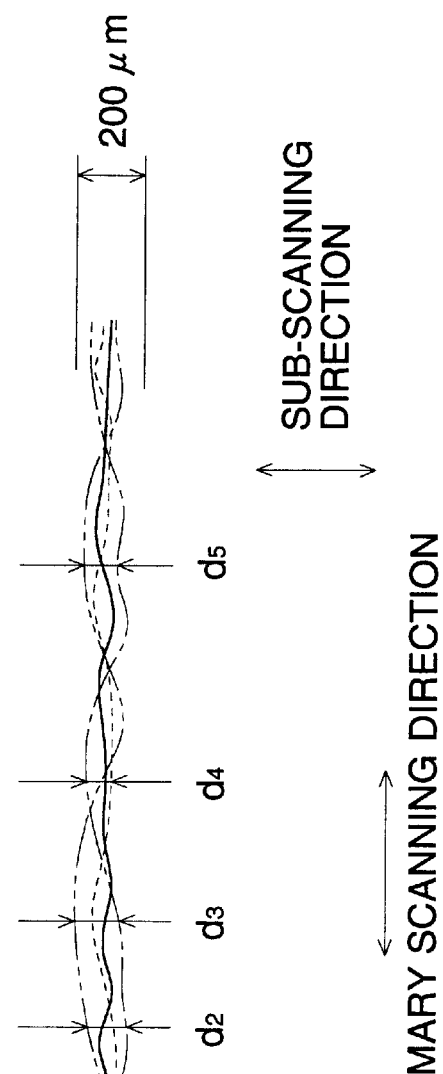
FIG. 9(a)
FIG. 9(b)
FIG. 9(c)
FIG. 9(d)
FIG. 9(e)

FIG. 35 (a)  PRIOR ART

COLOR IMAGE FORMING APPARATUS

BACKGROUND OF THE INVENTION

The present invention relates to a color image forming apparatus.

Heretofore, there has been a color image forming apparatus wherein a laser beam scanning unit is housed, and an image carrier is caused to make several turns to form thereon toner images respectively for Y, M, C and K and these toner images are superposed to form a color image. This color image forming apparatus has been inexpensive because it contains only one laser beam scanning unit, but it has been time-consuming for forming a color image because it has been necessary for the image carrier to make several turns. Under this situation, there is available an image forming apparatus which houses therein plural laser beam scanning units for shortening a period of time for forming a color image. In this image forming apparatus, a color image can be formed in a short period of time because toner images respectively for Y, M, C and K are formed simultaneously in the same time zone through scanning of plural laser beams conducted by plural laser beam scanning units, and these toner images are superposed on an image carrier or on a recording medium.

In an image forming apparatus having therein plural laser beam scanning optical units, when a position of a latent image formed by the laser beam scanning optical unit is relatively deviated, image quality troubles such as shear in colors and shade variation are caused. Though there is considered a device wherein the position deviation mentioned above is automatically adjusted through bending, tilting and parallel movement conducted by a position changing unit utilizing a mirror, a lens and a motor in the laser beam scanning optical unit or by a position changing unit utilizing a dimensional change caused by thermal expansion, there are caused problems that an apparatus has to be made larger or the cost therefor has to be high. Further, there are several types for the position deviation, and even the direction thereof is roughly divided into two types including the primary scanning direction and the sub-scanning direction, and each of them is further subdivided into total magnification and partial magnification. Among these, the magnification in the primary scanning direction is relatively easy to control because it can be controlled electrically as is corrected by changing a dot clock. However, for the curved scanning line and relative deviation of parallelism, it has been necessary to make the complicated control mentioned above.

The first object of the invention, therefore, is to provide a scanning optical unit and an image forming apparatus wherein plural color images formed by plural laser beams emitted from plural laser scanning optical units are not deviated in the sub-scanning direction when they are superposed on an image carrier or on a recording medium, and thereby an appropriate color image with high quality can be obtained.

In the internal arrangement of a color image forming apparatus, it is common that a drum-shaped photoreceptor representing an image carrier is arranged at the central portion, an exposure system and a developing unit both representing an image forming means are arranged to surround the photoreceptor, a transfer means is arranged to be directly under the photoreceptor, and a sheet-feeding cassette is arranged at the lowermost portion in the color image forming apparatus.

Further, it has been attempted to increase a degree of freedom for layout inside a color image forming apparatus by using a belt-shaped photoreceptor (hereinafter referred to also as a belt-shaped image carrier) wherein a photoreceptor layer is provided on a belt-shaped base body trained about driving rollers, in place of the drum-shaped photoreceptor.

For example, there has been known a color image forming apparatus wherein each of plural developing units is provided with different color toner, and a latent image for each color is formed on a belt-shaped image carrier by each of plural exposure systems, and toner images each being for each color are developed to be superposed on the belt-shaped image carrier while it makes one turn, thus the toner images are collectively transferred onto a transfer sheet taken out of a sheet-feeding cassette arranged under the belt-shaped image carrier for obtaining a color image. The image forming system employed in the image forming apparatus mentioned above is called a single-rotation superposing system.

For example, TOKKAIHEI 3-80286 discloses a color image forming apparatus of a single-rotation superposing system, wherein a belt-shaped image carrier is arranged to be long sideways, and plural developing units and plural exposure systems representing image forming means are arranged under the belt-shaped image carrier. In the exposure system in this example, light emitted from a light-emitting diode is converged by a SELFOC lens so that an image is formed on the belt-shaped image carrier.

TOKKAIHEI 4-102874 discloses a color image forming apparatus of a single-rotation superposing system, wherein a belt-shaped image carrier is arranged to be long sideways, plural developing units are arranged under the belt-shaped image carrier, and plural exposure systems representing image forming means are arranged under the developing units. In this example, the exposure system is a scanning exposure system which deflects a laser beam by the use of a rotary polygon mirror.

TOKKAIHEI 5-158319 discloses a color image forming apparatus of a single-rotation superposing system, wherein a belt-shaped image carrier is arranged to be long lengthwise, and plural developing units and plural exposure systems are arranged on both sides of the belt-shaped image carrier. The exposure system in this example is a scanning exposure system.

In the color image forming apparatus described in TOKKAIHEI 4-102874, scanning exposure systems are arranged under the belt-shaped image carrier which is long sideways, and a mirror is arranged to change temporarily a path for the laser beam reflected on the polygon mirror. The mirror is sometimes deformed depending on temperature and humidity to cause distortion. When the mirror is distorted, an electrostatic latent image formed on the belt-shaped image carrier is distorted, and quality of outputted images is sometimes deteriorated, which is a problem. Further, since the scanning exposure systems are arranged under the developing units in this color image forming apparatus, toner sticks to the scanning exposure systems including the mirror, making the accurate exposure to be impossible, and quality of outputted images is deteriorated, which is a problem.

When an exposure system is arranged under a belt-shaped image carrier as in the color image forming apparatus described in TOKKAIHEI 3-80286, it results in the arrangement wherein toner falls and lies on the SELFOC lens due to the exposure direction. If toner falls and lies to interfere with an optical path of a laser beam, there is caused a problem that accurate exposure can be performed and quality of an outputted image is deteriorated. In addition, when comparing an exposure system employing a light-emitting diode array with a scanning exposure system, the exposure system employing a light-emitting diode array has a problem that it is not suitable for high quality outputting, because of the reason that a shape, a size and a position of a light spot forming an image on the surface of an exposure system photoreceptor can not be controlled accurately to the extent of the scanning exposure system.

When a belt-shaped image carrier is arranged to be long sideways as those in the color image forming apparatus described in TOKKAIHEI 4-102874 and that described in TOKKAIHEI 3-80286, there is caused a problem that a large floor space is needed for installation of the color image forming apparatus.

In the color image forming apparatus described in TOKKAIHEI 5-158319, a belt-shaped image carrier is arranged to be long lengthwise, and thereby a space occupied sideways by the belt-shaped image carrier is reduced. However, a floor space needed for substantial installation of the color image forming apparatus is not improved because an exposure system and a developing unit are arranged on both sides of the belt-shaped image carrier. Further, since the exposure system and the developing unit are arranged on both sides of the belt-shaped image carrier, parts of the exposure system and the developing unit can not be used in common for the reason that the direction of rotation of a rotary polygon mirror needs to be reversed, and it leads deviation of the exposure scanning position, which is a problem. Further, due to the decentralized exposure systems, position deviation between exposure means caused by fluctuation of an environmental condition such as heat tends to occur.

Therefore, the second object of the invention is to realize a color image forming apparatus wherein deterioration of image quality is prevented, by reviewing the internal structure of the conventional color image forming apparatus, reducing a floor space by improving efficiency for using a space in the apparatus, reducing toner sticking to exposure systems, and by preventing position deviation between exposure means caused by environmental fluctuation.

In the color image forming apparatus having therein a plurality of laser scanning optical units, color images are formed at high speed through simultaneous scanning of plural laser beams conducted by the plural laser scanning optical units. As stated above, the color image forming apparatus, on the other hand, is required to form a shear-free color image wherein plural toner images (Y, M, C and K) are superposed without being deviated. Therefore, in the color image forming apparatus having plural laser scanning optical units wherein the laser scanning optical units are supposed to be arranged keeping their accurate intervals, there has been a possibility that each laser scanning optical unit is subjected to thermal deformation caused by heat from a fixing means installed in the color image forming apparatus and thereby positions of the laser scanning optical units are shifted. In the case of an image forming apparatus wherein a fixing means is located in the vicinity of the end portion of a belt-shaped image carrier, there is a possibility that heat generated from a fixing unit creeps to a laser scanning optical unit, causing thermal deformation of a lens system and a mirror system, and a problem of deterioration of image quality is caused. This problem is more conspicuous in an image forming apparatus wherein a laser scanning optical unit is located directly above a fixing unit. The same problem lies also on a color image forming apparatus having a belt-shaped transfer means which is for transferring a toner image formed on an image carrier onto a transfer sheet.

Therefore, the third object of the invention is to provide an image forming apparatus capable of forming a shear-free color image with high quality, by preventing thermal deformation caused by heat from a fixing unit and by preventing position deviation of each unit at plural laser scanning optical systems in the image forming apparatus.

In an image forming apparatus wherein an image is formed on an image carrier by a rotary polygon mirror which deflects a laser beam, the laser beam is deflected by the polygon mirror, and then is deflected a few times through mirrors. The reason for this is to arrange a writing unit having therein the rotary polygon mirror at an appropriate position and thereby to make the entire apparatus small. However, even when the entire apparatus can be made small, there still is an occasion where it is not preferable to make the entire apparatus small, from the viewpoint of image forming. In that occasion, the scanning position for a laser beam on an image carrier is required to be set strictly, and in the example of the occasion, plural writing units are installed in an image forming apparatus, and a laser beam emitted from each writing unit is required to scan at an appropriate position on the image carrier. The reason is that when each of scanning positions of plural laser beams is shifted, it is confirmed as deviation on the formed image. Therefore, the system in which a laser beam is deflect with a mirror has not been preferable because a laser optical path is distorted by distortion of the mirror, and there is a possibility that scanning can not be conducted at an appropriate position on the image carrier.

Accordingly, the fourth object of the invention is to provide an image forming apparatus employing plural laser beams to form images on an image carrier through scanning of the laser beams conducted by a rotary polygon mirror wherein a color image with high quality can be obtained by preventing deviation of scanning positions for the plural laser beams on the image carrier and thereby by making the plural laser beams to scan at an appropriate position.

Further, as the speed of color image forming has been accelerated, a laser printer wherein plural writing means each corresponding to each color are provided to be close each other and an LED printer have become available.

With regard to these writing means, each toner image is required to be superposed accurately for obtaining a color image with high quality and therefore each writing means is positioned with high positioning accuracy, because a color image is made by superposing toner images formed through writing and developing conducted after the writing on an image forming body.

In the case of a writing means of a laser scanning optical type, however, only enhancement of positional accuracy for mounting the aforesaid writing means is not enough, and there is caused a problem that each member constituting a scanning optical system is affected by thermal expansion, resulting in variation of positional relation of the writing position, and doubling is caused on a toner image to be formed and image quality is lowered, because heat generating bodies such as a motor to drive a laser beam deflecting means and drive control circuits are housed.

After solving the aforesaid point for improvement, therefore, the fifth object of the invention is to an image forming apparatus wherein thermal expansion caused by temperature rise of each writing means can be controlled by efficient arrangement of extremely simple units, and thereby accuracy of each writing position can be maintained.

Many methods and apparatuses have been proposed for obtaining a color image by the use of an electrophotographic method. For example, as disclosed in TOKKAISHO 61-100770, there is a method wherein forming of latent images corresponding in terms of number to the number of separated colors of a document image and developing therefor are conducted on a photoreceptor drum representing an image carrier, then, developed images are transferred onto a transfer drum for each developing to form a multi-color image on the transfer drum, and thus, a color copy is obtained by transferring onto a recording sheet. It is not avoidable for an apparatus of this method to be large in size and complicated in structure, because a transfer drum having a circumferential surface in a size on which an image equivalent to one sheet can be transferred is required to be provided in addition to a photoreceptor drum.

Further, as is disclosed in TOKKAISHO 61-149972, for example, there is a method wherein forming of latent images corresponding in terms of number to the number of separated colors of a document image and developing therefor are conducted on a photoreceptor drum, and a color copy of a multi-color type is obtained by transferring developed images onto a transfer material for each developing. In this method, it is difficult to superpose multi-color images accurately, and it is impossible to obtain a color copy with excellent quality.

There is further a method wherein a color image is obtained by transferring after superposing color toner images on a photoreceptor drum by repeating forming of latent images corresponding in terms of number to the number of separated colors of a document image and developing therefor with color toners. The basic process of this multi-color type is disclosed in TOKKAISHOs 60-75850, 60-76766, 60-95456, 60-95458 and 60-158475.

In the multi-color image forming apparatus wherein a color image is obtained through the superposing operations stated above, a charging means, an exposure means and plural developing units each housing color toner of different color are arranged around a photoreceptor drum, and a color image is obtained by rotating the photoreceptor drum several times and thereby by developing latent images on the photoreceptor drum, or, plural charging means, plural exposure means and plural developing units each housing color toner of different color are arranged around a photoreceptor drum, and a color image is obtained by conducting charging, imagewise exposure and developing several times and thereby by superposing plural toner images on the photoreceptor drum while the photoreceptor makes one turn.

For example, the structure shown in FIG. 32 can be considered as that for a color image forming apparatus employing a photoreceptor drum. In the image forming apparatus shown in FIG. 32, there are arranged imagewise exposure units 103, 109, 115 and 121, developing units 105, 111, 117 and 123, and charging units 107, 113, 119 and 125, around photoreceptor drum 102 for the purpose of forming toner images each being for Y (yellow), M (magenta), C (cyan) and K (black). However, in the space inside the photoreceptor drum 102, there are many wasteful spaces, which prevents an apparatus from being made small. Further, when the structure like this is employed, it is difficult to obtain a quality image due to deformation of a lens system and a mirror system caused by heat, and it is necessary to provide duct 129 for heat interception use, because the imagewise exposure means 103 is arranged above fixing unit 127 which is a heat source. In addition, the direction of exposure for each of the imagewise exposure units 103, 109, 115 and 121 is different from others and the direction of a developing agent supply section for each developing unit is different from others, which causes a problem that parts can not be used in common, whereby each developing unit can not be structured with the same parts, resulting in an increase in the number of parts.

Though there may be considered the structure wherein imagewise exposure units 203, 209, 215 and 221, developing units 205, 211, 217 and 223, and charging units 207, 213, 219 and 225 are arranged on the circumferential surface on one side of photoreceptor drum 201 as shown in FIG. 33, for avoiding the problem mentioned above, this structure tends to cause problems of a large diameter of the photoreceptor drum 201, further increase of wasteful spaces like those mentioned above, and separation troubles for a transfer material.

With regard to an image carrier, a belt-shaped image carrier wherein photoconductor is coated or evaporated on a flexible belt has also been proposed together with a photoreceptor drum wherein photoconductor is coated or evaporated on the drum circumferential surface as stated above. Since a form of the belt-shaped image carrier (hereinafter referred to also as a belt photoreceptor) is determined when the belt-shaped image carrier is trained about rotary rollers including a driving roller, it is effective when structuring a color image forming apparatus which is made to be compact by utilizing the space effectively.

Since the belt photoreceptor can run along a small curved surface, it has an advantageous point that separation troubles for a transfer material can be prevented by separating the transfer material by utilizing the curved surface, using rotary rollers having a small diameter.

Since it is extremely effective, also for forming a monochromatic image, to separate a transfer material from a belt photoreceptor by the use of rotary rollers having a small diameter, there has also been proposed an image forming apparatus which forms a monochromatic image by using a belt photoreceptor.

In the image forming apparatus employing a belt photoreceptor image forming means such as a charging means, an imagewise exposure means, and a developing means are provided around the belt photoreceptor, and these image forming means face the rotating belt photoreceptor, while being away therefrom by a certain distance.

As a developing means used in a color image forming apparatus wherein toner images are superposed on an image carrier, a developing means conducting non-contact developing is used preferably. The reason for this is as follows, When the developing means conducting contact developing is used, a toner image formed previously is damaged when developing a toner image which is to be formed on the toner image formed previously, in the course of forming toner images by superposing them on a belt photoreceptor.

In the non-contact developing method, a photoreceptor and a developing sleeve which carries thereon developing agents are kept to be away from each other by a certain distance, and DC bias, or bias wherein DC bias and AC bias are superposed is impressed between the photoreceptor and the developing sleeve while maintaining a small clearance through which developing agents sticking to the developing sleeve do not come in contact with the photoreceptor, so that toner may leave a carrier in the developing agents on the developing sleeve to move to a latent image portion for development.

When the non-contact developing method is used, it is necessary to keep the distance between a photoreceptor and a developing sleeve to be constant for the total length of the developing sleeve at considerably high accuracy, and when the distance can not be kept constant, toner images developed turn out to be defective. In the case of a belt photoreceptor, it was extremely difficult to keep the distance between the photoreceptor and a developing sleeve to be constant, because the photoreceptor surface varies as the belt moves.

As a method to solve the problem mentioned above, TOKKAIHEI 3-18868 discloses a proposal wherein a fixed backup plate is provided on the rear side of a rotating belt photoreceptor so that the belt photoreceptor moves along the backup plate, and when stopper members provided at both ends of a developing sleeve are in contact with the backup plate, a prescribed developing clearance is maintained. FIG. 34 is an illustration showing the relation of the foregoing, wherein when stopper members 232A are arranged to be in contact with flat backup plate 40A, even when the axial direction of developing sleeve 55A is not perfectly perpendicular to the moving direction of belt-shaped image carrier 1A, it does not have an influence on developing clearance Dsd formed between the belt-shaped image carrier 1A and the developing sleeve 55A, which is an advantageous point. However, when the belt-shaped image carrier 1A moves, it is not kept to be in close contact with the backup plate 40A, and even when the belt-shaped image carrier 1A is in contact with the backup plate 40A at edge portion 401A of the backup plate 40A, the belt-shaped image carrier 1A is slightly lifted at intermediate portion 402A, and an amount of its rise is unstable, resulting in unstable developing clearance Dsd, thus, satisfactory developing is difficult to be carried out.

TOKKAIHEI 6-51627 also discloses a method to solve the aforesaid problem. In this proposal, a cylindrical backup roller is provided on the rear side of a photoreceptor belt which rotates, and prescribed developing clearance Dsd is maintained when stopper rollers provided on both ends of a developing sleeve are in contact with the backup roller. FIG. 15 is an illustration showing the relation of the foregoing, wherein when backup roller 40B as that stated above is provided on the rear side of belt-shaped image carrier 1B, the rear surface of the belt-shaped image carrier 1B moves while it keeps to be in close contact with the backup roller 40B. Therefore, when a developing means is arranged so that the axial direction of the backup roller 40B and the axial direction of developing sleeve 55B may be positioned to be in parallel with each other perfectly, the developing clearance Dsd can be maintained to be constant as shown in FIG. 35 (a). However, it is actually difficult to keep perfect parallelism, and when the parallelism is not maintained, developing clearance Dsd turns out to be one having different clearances in the axial direction, developing for excellent images is impossible.

Therefore, the sixth object of the invention is to provide an image forming apparatus which solves a problem that it has been difficult to eliminate an influence by fluctuation of the belt photoreceptor surface by keeping the distance between the photoreceptor surface of a belt photoreceptor and a developing sleeve, and is capable of obtaining excellent images by the use of the belt photoreceptor.

In the image forming apparatus, parts such as an image carrier, a charging means and a developing unit need to be replaced when the umber of prints arrives at the prescribed value.

On the other hand, in the case of an image forming apparatus employing a belt-shaped image carrier, an attempt to make an apparatus small by achieving efficient arrangement of parts such as the image carrier has not been made. In the case of a multi-color image forming apparatus, in particular, a plurality of charging means, image forming means and developing means are necessary, and it is unavoidable for the apparatus to be made large.

On the other hand, time to replace the parts which need to be replaced when arriving at the prescribed number of prints varies variously. For example, in the charging means having therein a grid and a charging electrode, life of the grid is shorter than that of the charging electrode. In the case of a multi-color image forming apparatus, a plurality of charging means, image forming means and developing means are necessary as stated above, resulting in many parts to be replaced.

The invention has been achieved in view of the aforesaid problems, and its object is to obtain an image which is excellent and with high quality. Namely, the seventh object of the invention is to provide an image forming apparatus wherein which can be structured to be simple and made to be small in size. Further, the eighth object is to provide an image forming apparatus wherein replacement of parts such as an image carrier or the like is simple. The ninth object is to provide an image forming apparatus wherein replacement of parts such as a developing means is simple.

Further, the tenth object is to provide an image carrier cartridge wherein replacement of parts such as an image carrier or the like is simple. The eleventh object is to provide an image carrier cartridge wherein the mechanism can be simplified and can be made small, and replacement of parts such as an image carrier or the like is simple.

Still further, the twelfth object is to provide an image forming cartridge wherein replacement of parts is simple.

In a color image forming apparatus wherein plural charging means, plural developing means, and plural exposure means are arranged around an image carrier, and a color image is formed by superposing toner images respectively for Y, M, C and K while the image carrier makes one turn, it is necessary to install plural charging means and plural exposure means, which is different from one (hereinafter referred to as "multi-rotation system") wherein a color image is formed by rotating an image carrier many times, and therefore, it is unavoidable for the total size of the color image forming apparatus to be large. In addition, when attempting to install plural charging means, plural developing means and plural exposure means so that they face the image carrier, it is necessary to secure an installation space for each of them along the image carrier surface. As a result, a developed length of an image carrier needs to be established long, and a problem of a large-sized apparatus is further caused. On the other hand, the developing means and the charging means need to be used for the prescribed number of prints and to be replaced at almost the same time, but when plural developing means are installed separately from plural charging means with out being connected to each other, an individual replacement operation is necessary for each of them in the case of replacement, resulting in poor operability for a user.

Therefore, the thirteenth object of the invention is to provide an image forming apparatus having therein plural charging means, plural developing means and plural exposure means all arranged around an image carrier wherein a small space is achieved and a small size of the apparatus can be realized, and to provide an image forming apparatus and an image forming cartridge wherein plural developing means and plural charging means can easily be replaced and operability for a user can be improved.

In order to form images satisfactorily, there have been provided, in an image forming apparatus, some means for detecting the state of the surface of an image carrier (photoreceptor) such as, for example, detecting means including a patch detection sensor which detects an amount of stuck developing agents, a registration sensor which detects the state of registration of images formed by plural developing units, and a surface potential sensor which detects the state of surface potential.

Among these means, the detecting means such as the patch detection sensor and the registration sensor are required to be located at the downstream side of developing means, because they detect images visualized with developing agents on the image carrier.

Since images to be detected by a transfer means are required to be detected before the images are transferred onto a transfer material, the detecting means is located between a developing means and the transfer means. Further, in the case of the registration detection which requires accuracy, it is preferable that the registration sensor is arranged to be as close as possible to the developing means, because more developing agents are scattered at the place which is farther from the developing means.

Incidentally, it can also be considered to separately form an image for detection use outside the image forming area (outside the primary scanning area) on the image carrier and to detect this image. In this case, however, various components such as the developing unit, the transfer means and the cleaning means are required to function even in the outside of the image forming area, which causes problems of cost and a large size of the apparatus.

On the other hand, between the developing means and the transfer means, there is formed a conveyance path through which a transfer material is conveyed to the transfer means. When the detecting means is provided in the vicinity of the image carrier for enhancing accuracy of the detecting means, the conveyance path needs to make a detour around the detecting means. When there is a sharp curved portion in the detoured conveyance path, there is caused a problem of "jamming" of a transfer material, while when the curved portion is formed to be of a gentle curve for avoiding the "jamming", there is caused a problem of a large-sized apparatus. Therefore, how to arrange the detecting means and the conveyance means is an issue to be considered.

Therefore, the fourteenth object of the invention is to provide an image forming apparatus which can be made small by ellaborated arrangement of an image carrier surface state detecting means and a conveyance path.

In an image forming apparatus having a belt-shaped image carrier wherein the belt-shaped image carrier is trained about plural rollers, it is common that the rollers about which the belt-shaped image carrier is trained are made to have a small diameter. For example, in the image forming apparatus described in TOKKAIHEI 3-77975, toner images are transferred onto a recording sheet at the portion of a roller about which a belt-shaped image carrier is trained, and the recording sheet is separated, utilizing a curve of the roller. An enlarged diagram of the transfer section and its surrounding in TOKKAIHEI 3-77975 is shown in FIG. 13. When space 5" of the portion through which transfer body P conveyed by transfer belt 91" advances to a transfer section between transfer roller 5' and transfer electrode 91' is broad as shown in the diagram, movement of toner t from belt-shaped image carrier 1' to the transfer body P is started by an electric field for transfer, before the transfer body P comes in close contact with the belt-shaped image carrier 1'. Therefore, a problem that toner t is scattered as shown with arrow marks in the diagram tends to occur.

In an image forming apparatus having a drum-shaped image carrier, it is relatively easy, due to an elaborated shape of a transfer body guiding member at the guiding side, to make a transfer body to come in close contact with the image carrier before the application of an electric field for transfer, because a size of a diameter of the drum can be secured to a certain level. However, in the case of a roller with a small diameter about which a belt-shaped image carrier is trained, there has been caused a problem that an angle of bending for a transfer body is too great and a sheet to be conveyed is jammed.

Therefore, the fifteenth object of the invention is to provide an image forming apparatus having a belt-shaped image carrier trained about plural rollers wherein toner scattering from a belt-shaped photoreceptor can be prevented, and toner images formed on the belt photoreceptor can be transferred onto a recording sheet properly, making an excellent image to be obtained.

With regard to a general internal structure of an image forming apparatus, there are many examples wherein a photoreceptor representing an image carrier is installed at the central portion and an exposure means, a developing unit and a transfer means are arranged around the photoreceptor to surround it, and the transfer means is arranged directly under the photoreceptor while a sheet-feeding cassette is arranged directly under the transfer means. In an image forming apparatus having the internal structure wherein the transfer means is arranged directly under the photoreceptor and a sheet-feeding cassette is arranged directly under the transfer means, a transfer sheet is conveyed from the sheet-feeding cassette to the transfer means through an S-shaped path or a U-shaped path in many cases, due to the positional relation between the sheet-feeding cassette and the transfer means.

When trying to convey a transfer sheet through an S-shaped path or a U-shaped path, there is a possibility that sheet jamming takes place at a turning portion, and when conveying the stiff transfer sheet, in particular, occurrence of sheet jamming at the turning portion is conspicuous. On the other hand, a normal image forming apparatus is equipped with a manual sheet-feeding mechanism, and a conveyance path based on the manual sheet-feeding mechanism is straight in shape, which reduces occurrence of sheet jamming. However, in the manual sheet-feeding mechanism, a folding tray, for example, is unfolded to be protruded extensively from the image forming apparatus and then a transfer sheet is placed on the tray, which causes a problem that a floor space of the image forming apparatus is considerably increased. In addition, there is caused a problem that sheet size detection is difficult, because the manual sheet-feeding mechanism does not usually have a rear end stopper.

Therefore, the sixteenth object of the invention is to realize a color image forming apparatus wherein an increase of an area for a sheet-feeding unit is controlled and a height of the sheet-feeding unit is reduced, by reviewing the conventional internal structure of a color image forming apparatus, whereby by controlling occurrence of sheet jamming caused in conveying a transfer sheet (for example, transfer sheet used frequently) placed on at least one transfer body holding means, and further by improving efficiency of using spaces in the apparatus.

Arrangement of a sheet-feeding cassette in an image forming apparatus which has been commonly known is shown in each of FIGS. 29 and 30. In the conventional sheet-feeding unit shown in FIG. 29, small-sized sheet-feeding cassette 41a housing therein small-sized sheets is stacked on large-sized sheet-feeding cassette 410b housing therein large-sized sheets, and sheets ejected respectively out of the sheet-feeding cassettes 41a and 41b respectively for both sizes pass respectively through path a and path b, then are turned by 180° and are directed to transfer means 41c. The path a and the path b join each other on the half way. In another conventional sheet-feeding unit shown in FIG. 30, sheets pass through paths c and d which extend respectively from small-sized cassette 41a and large-sized cassette 41b and are almost straight and join each other on the half way, and enter transfer means 41c.

With regard to the sheet-feeding unit shown in FIG. 29, since sheets of both sizes are turned by 180°, when the curvature of the turning is made large, there is caused a possibility of sheet jamming. When the curvature is made small to avoid the possibility of sheet jamming, it is unavoidable for distance n in the vertical direction from the bottom surface of the large-sized sheet-feeding cassette 410b to the transfer means 41c to be great, and thereby the total height of the apparatus is increased. With regard to the sheet-feeding unit shown in FIG. 30, a possibility of sheet jamming is small because paths c and d are not turned, but distance m in the horizontal direction from the end of the large-sized sheet-feeding cassette 410b to the transfer means 41c is great, and the total width of the apparatus in the lateral direction is great, which has been a problem.

As stated above, plural sheet-feeding cassettes have not been arranged efficiently in the conventional sheet-feeding unit. Further, there have been available cassettes for exclusive use for small-sized sheets, but for the apparatus capable of printing for large sizes, most of cassettes therefor have been those capable of housing large-sized sheets wherein a size regulating plate inside the cassette is fixed, thus the space occupied by the cassette is large, and a space where no sheets are housed can not be used effectively, which have been problems.

Therefore, the seventeenth object of the invention is to provide a sheet-feeding unit and an image forming apparatus wherein a sheet-feeding cassette housing therein small-sized recording sheets and a sheet-feeding cassette housing therein large-sized recording sheets are arranged efficiently, and thereby a small size of the apparatus is realized, and a recording sheet can be conveyed smoothly.

There has been further known an image forming apparatus wherein a belt-shaped image carrier which has a seam and rotates is used, and toner images are formed continuously on the belt-shaped image carrier to be transferred onto a transfer sheet. Incidentally, it is preferable that a developed length of the belt-shaped image carrier is controlled to be as short as possible, because it has an influence on the size of the image forming apparatus. On the other hand, it is also desired to set the developed length to be long, for the requirement to form an image on the large-sized transfer sheet, or to increase printing speed by forming plural images on the belt-shaped image carrier. In the belt-shaped image carrier having a seam, therefore, it has been necessary, for efficient continuous transferring onto a transfer sheet, to establish the developed length of the belt-shaped image carrier and an effective image area by giving consideration to the length of a transfer sheet and sheet-feeding intervals.

Therefore, the eighteenth object of the invention is to provide an image forming apparatus for forming toner images continuously on a belt-shaped image carrier which has a seam and rotates and for transferring them onto a recording sheet, wherein it is possible, for efficient continuous transferring onto a recording sheet, to establish a developed length and an effective image area of the belt-shaped image carrier by giving consideration to the length of a transfer sheet and sheet-feeding intervals, and to achieve a small size of the apparatus.

SUMMARY OF THE INVENTION

The objects mentioned above can be attained by an image forming apparatus having the following structures.

Item 1

An image forming apparatus having therein an image carrier, plural charging means each charging the image carrier, plural laser exposure units each scanning the charged image carrier through projection of plural laser beams and forming a latent image at a prescribed position on the image carrier, plural developing means each forming a toner image by developing the latent image, and a transfer means for transferring the toner image onto a transfer material, wherein the plural laser exposure units are fixed solidly so that the image carrier may be scanned by the laser beams in parallel and at prescribed intervals.

Item 2

The image forming apparatus described in Item 1 wherein the image carrier is of a belt shape and is arranged to be long lengthwise and has the first and second surfaces extending vertically substantially, while all of the plural laser exposure units are united solidly to be arranged to form a line vertically substantially along the first surface, and light from a polygon mirror in each laser exposure unit is projected on the prescribed position on the first surface for exposure through no mirror.

Item 3

The image forming apparatus described in Item 2 wherein a rotary shaft of a polygon mirror in each laser exposure unit is almost in parallel with the first surface.

Item 4

The image forming apparatus described in Item 1 wherein the plural laser exposure units are fixed solidly so that a plane formed by a laser beam reflected on a polygon mirror in each laser exposure unit may be in parallel with other planes formed by other laser exposure units.

Item 5

The image forming apparatus described in Item 4 wherein a rotary shaft of a polygon mirror in each laser exposure unit is in parallel with other rotary shafts in other laser exposure units.

Item 6

The image forming apparatus described in Item 1 wherein each laser exposure unit is glued and fixed at the position determined in advance so that the prescribed position mentioned above on the image carrier may be scanned by a laser beam.

Item 7

The image forming apparatus described in Item 1 wherein each laser exposure unit is fixed to others so that plural scanning lines may be formed on a photoreceptor by the plural laser beams and an amount of relative positional deviation of scanning lines in the sub-scanning direction may be 200 $\mu$m or less when the plural scanning lines are moved in parallel in the sub-scanning direction of the photoreceptor to be superposed.

Item 8

An image forming apparatus having therein a belt-shaped image carrier, plural charging means each charging the belt-shaped image carrier, plural latent image forming means each forming a latent image on the charged belt-shaped image carrier, plural developing means each forming a toner image by developing the latent image, and a transfer means for transferring the toner image onto a transfer material, wherein the belt-shaped image carrier is arranged to be long lengthwise and has the first and second surfaces extending vertically substantially, and further, all of the plural latent image forming means are arranged to form a line vertically substantially along the first surface.

Item 9

The image forming apparatus described in Item 8 wherein the plural developing means are arranged to form a line vertically substantially along the first surface.

Item 10

The image forming apparatus described in Item 8 wherein the latent image forming means forms a latent image through exposure conducted by a laser beam reflected on a polygon mirror (rotary polygon mirror).

Item 11

The image forming apparatus described in Item 8 wherein plural laser beams reflected on a polygon mirror (rotary polygon mirror) are projected on a photoreceptor for exposure through no mirror.

Item 12

The image forming apparatus described in Item 8 wherein the fixing means is arranged almost at the central portion on the side of the second surface of the belt-shaped image carrier.

Item 13

The image forming apparatus described in Item 8 having further a cleaning means for removing developing agents on the image carrier, wherein the second surface mentioned above is the surface where the image carrier moves upward from the bottom to the top, and the cleaning means is arranged at the upper portion of the second surface. Item 14

The image forming apparatus described in Item 13 wherein a collection box for developing agents removed by the cleaning means is arranged along the second surface of the belt-shaped image carrier.

Item 15

The image forming apparatus described in Item 13 wherein the collection box is arrange between the fixing means and the belt-shaped image carrier.

Item 16

The image forming apparatus described in Item 8 wherein each latent image forming means is housed in a frame body which is united solidly in the vertical direction.

Item 17

The image forming apparatus described in Item 8 wherein plural developing means are united solidly to be one developing cartridge.

Item 18

The image forming apparatus described in Item 17 wherein the developing cartridge is equipped with a hole through which a laser beam passes.

Item 19

The image forming apparatus described in Item 8 wherein plural laser optical systems are arranged behind the plural developing means which face a belt-shaped photoreceptor, and exposure is conducted on the first surface of the photoreceptor by plural beams which are in parallel each other substantially.

Item 20

The image forming apparatus described in Item 8 wherein an air intake or an air outlet is provided on at least one plane which cuts all of plural latent image forming means at right angles.

BRIEF DESCRIPTION OF THE DRAWINGS

FIG. 7 (b) is a sectional view of a primary section of an image carrier cartridge shown in FIG. 6.

Each of FIGS. 9 (a)–9 (e) is a diagram for illustrating an amount of relative positional deviation of each scanning line.

Figure 10:
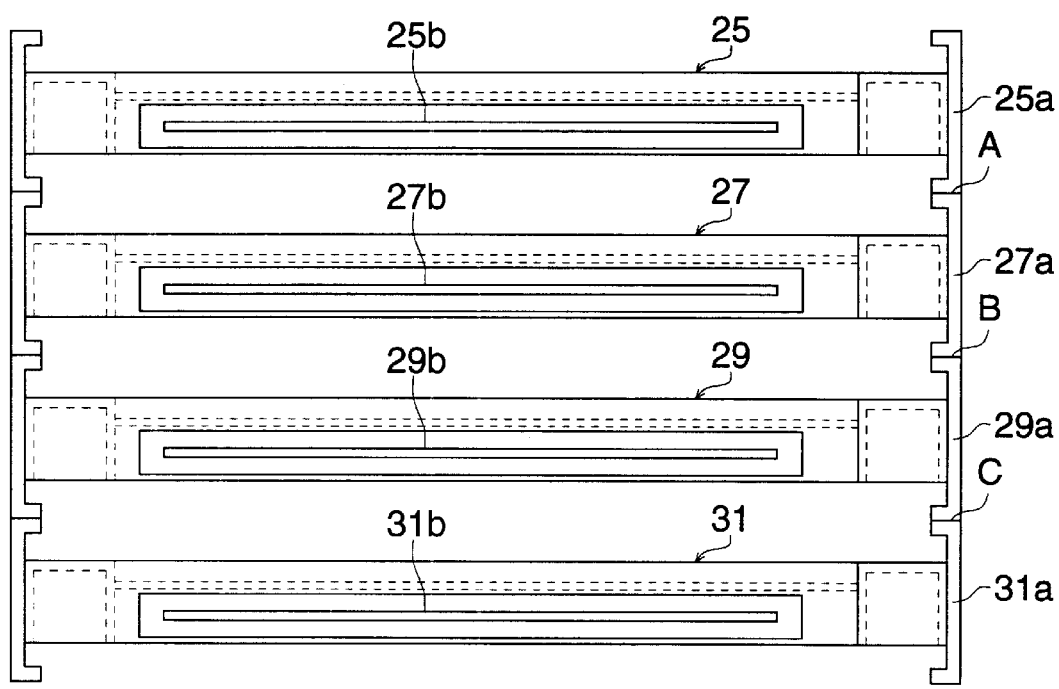

FIG. 10 is a front view showing the state wherein plural scanning optical units in the invention are unitized.

Figure 11:
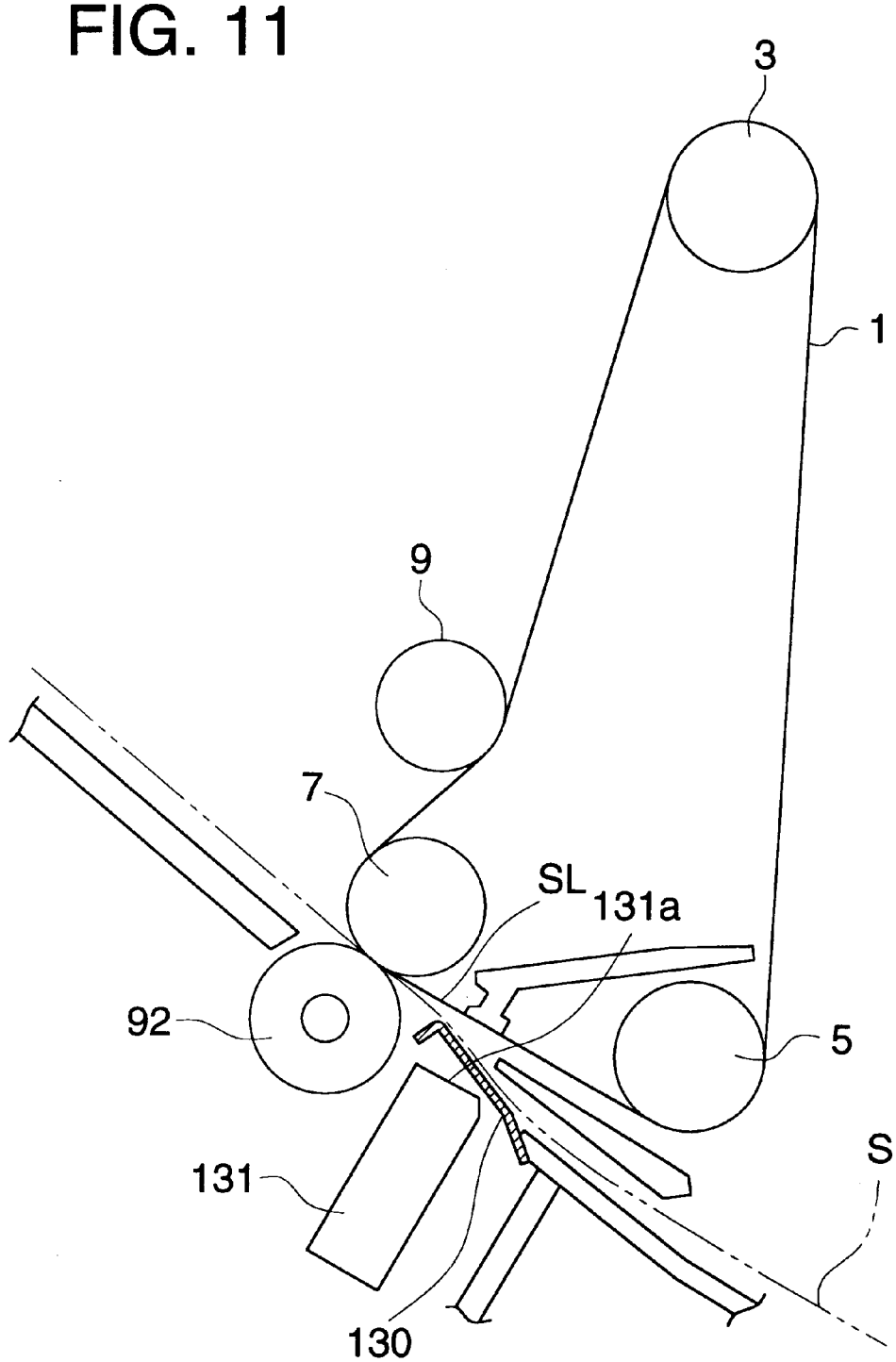

FIG. 11 is a structure diagram of primary portions in an image forming apparatus in the second embodiment of the invention.

Figure 12:
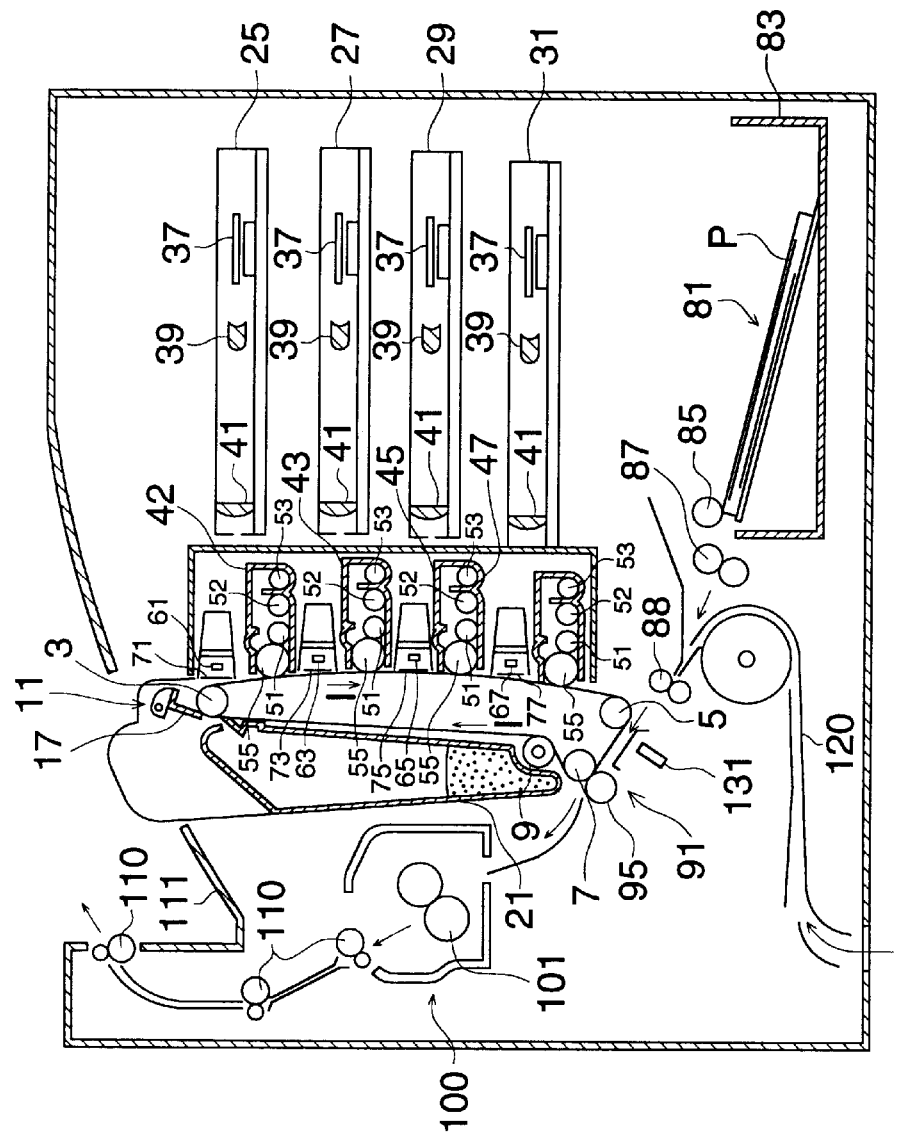

FIG. 12 is a general structure diagram of an image forming apparatus in the second embodiment of the invention.

Figure 13:
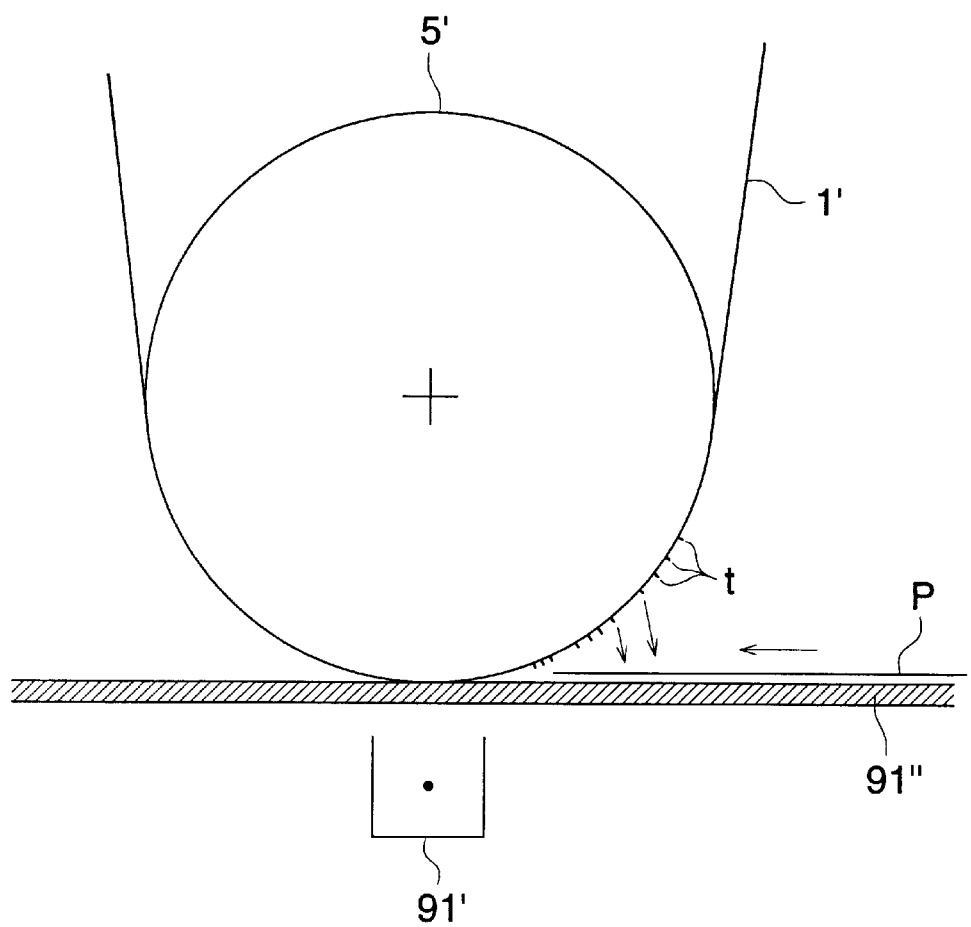

FIG. 13 is a diagram showing a conventional belt photoreceptor and a transfer means.

Figure 14:
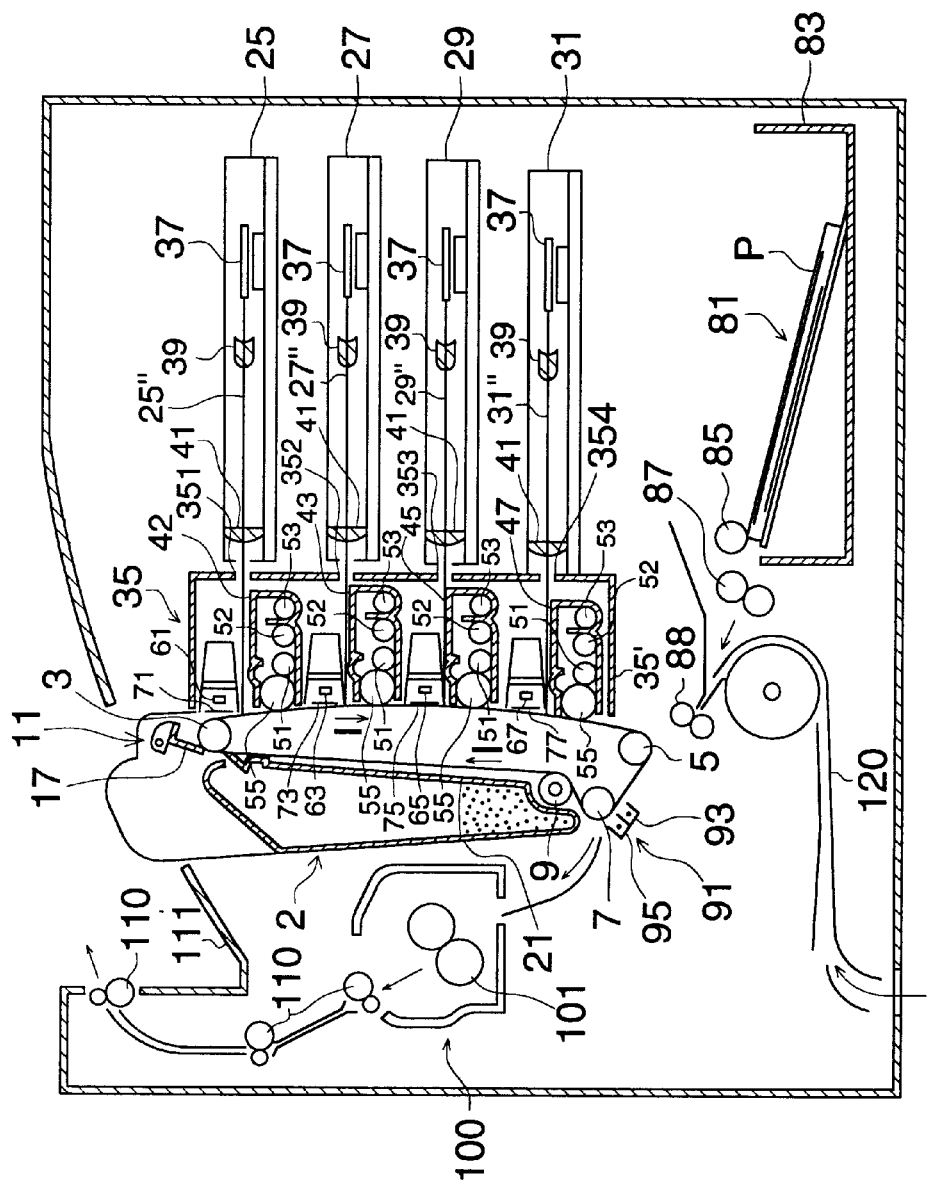

FIG. 14 is a sectional structure diagram of an image forming apparatus showing an embodiment of the invention.

Figure 15:
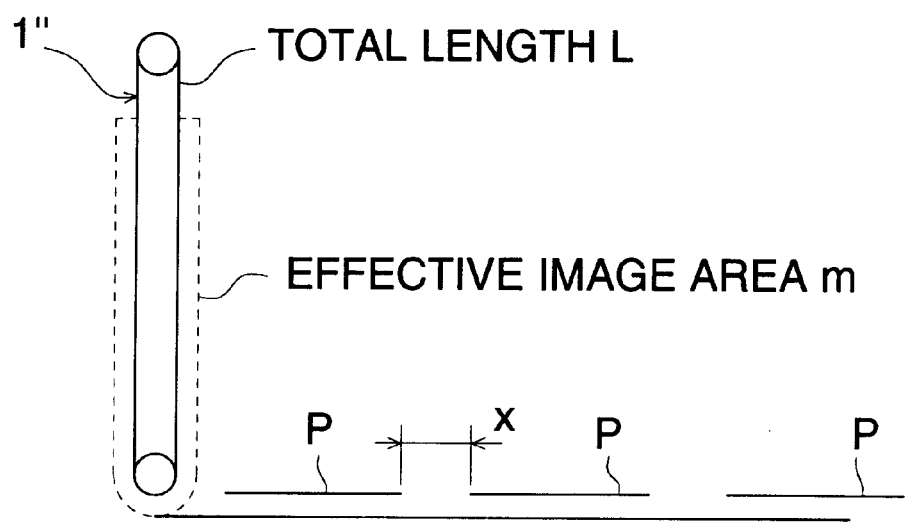

FIG. 15 is a side view showing schematically a belt-shaped image carrier and a recording sheet.

Figure 16:
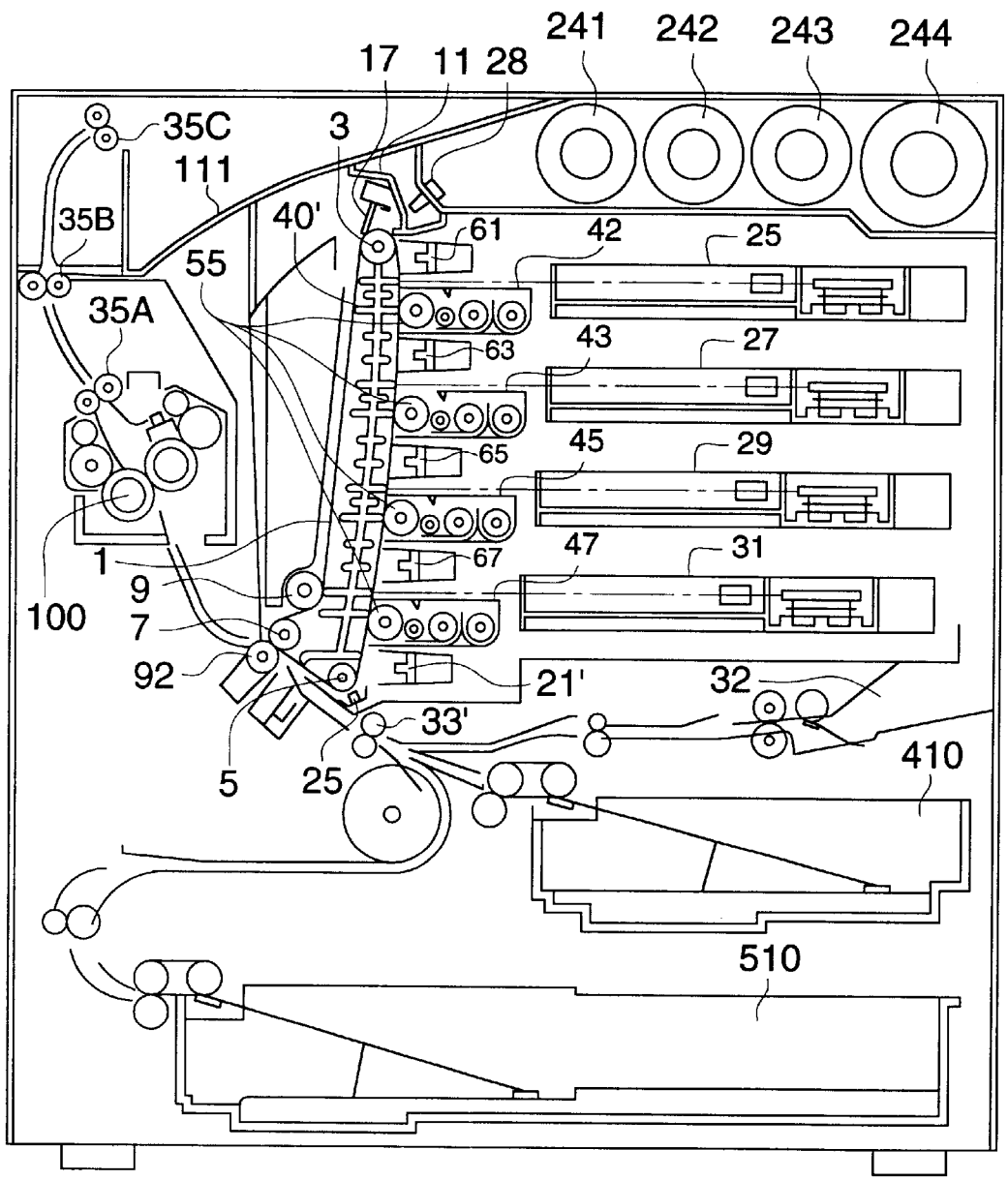

FIG. 16 is a sectional structure diagram showing the third embodiment of the invention.

Figure 17:
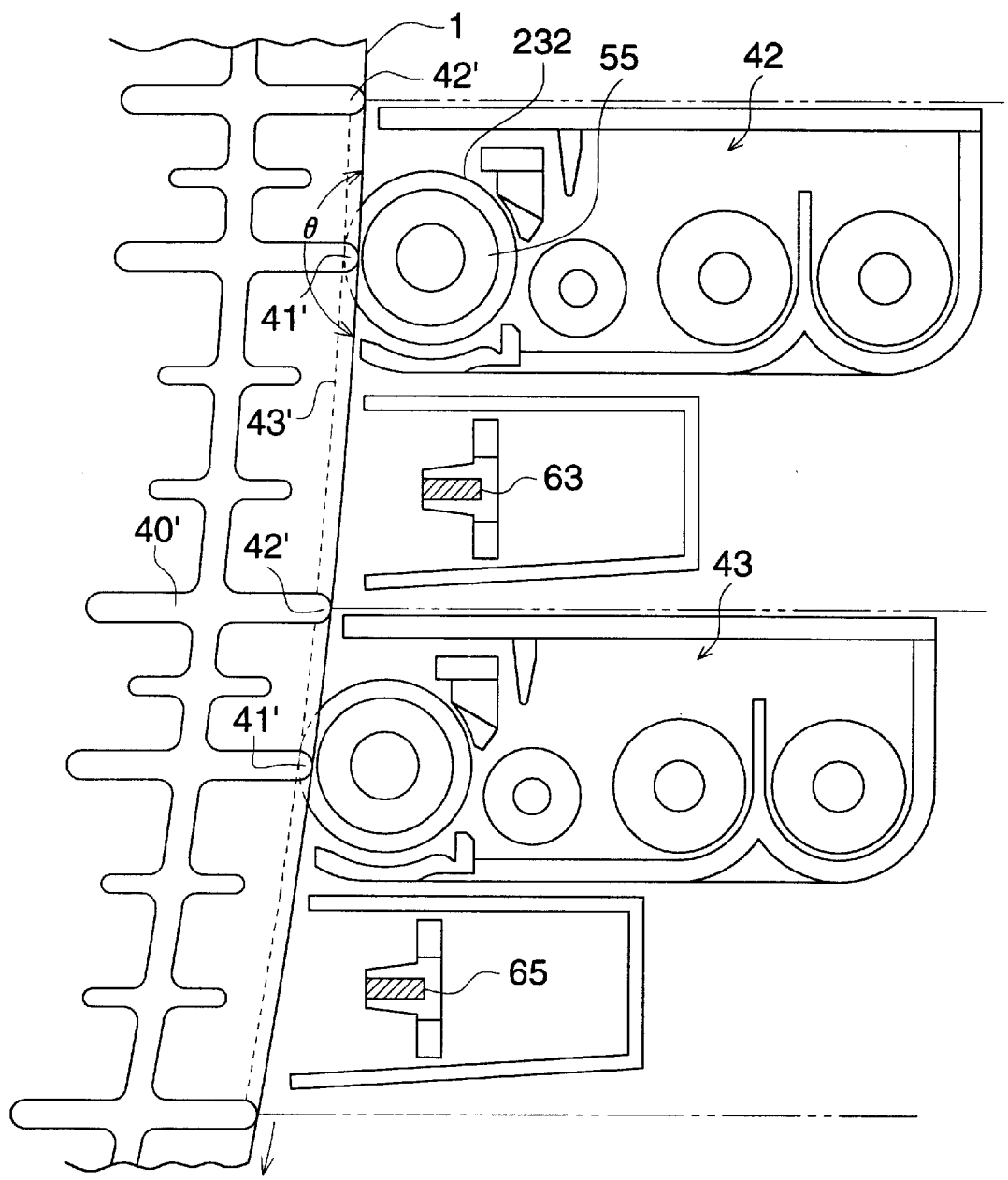

FIG. 17 is an enlarged sectional view of primary portions in FIG. 16.

Figure 18:
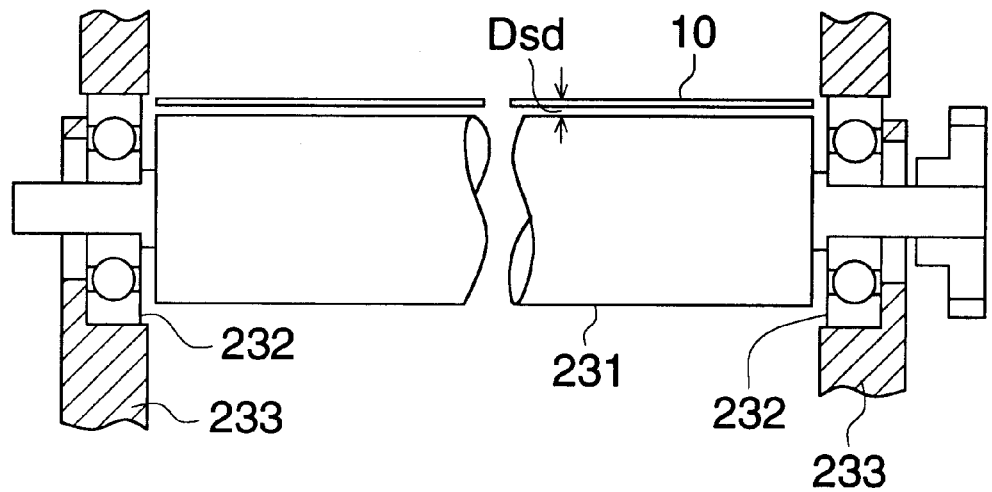
Figure 18:
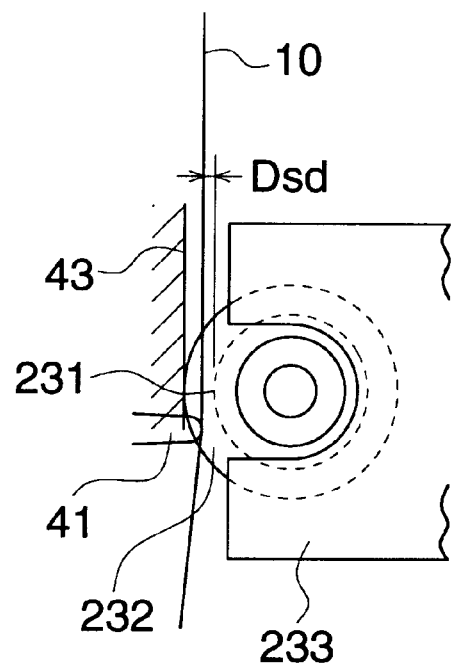

Each of FIGS. 18 (a) and 18 (b) is a sectional view showing a developing area.

Figure 19:
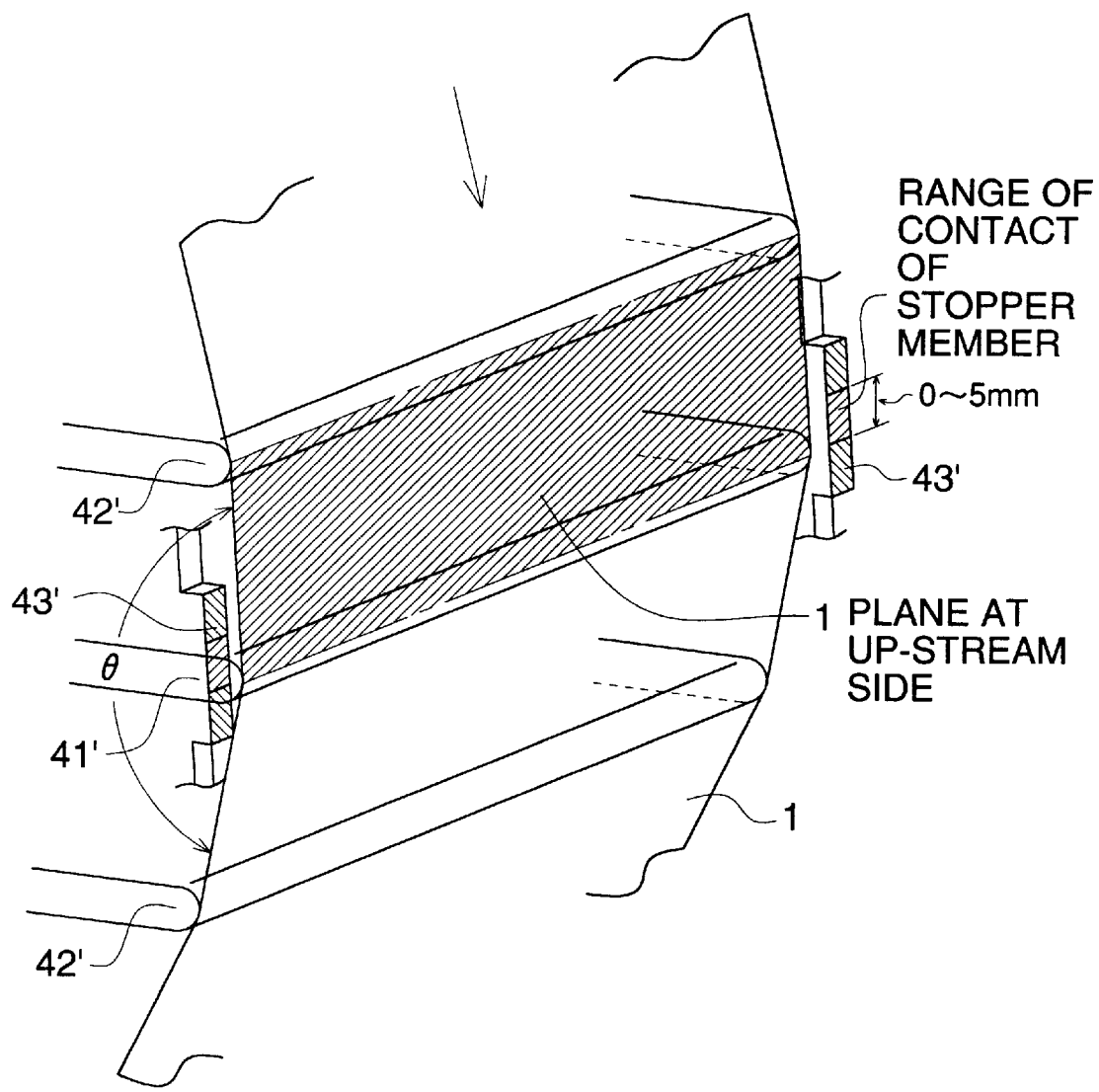

FIG. 19 is a perspective view showing the state of a stopper supporting section.

Figure 20:
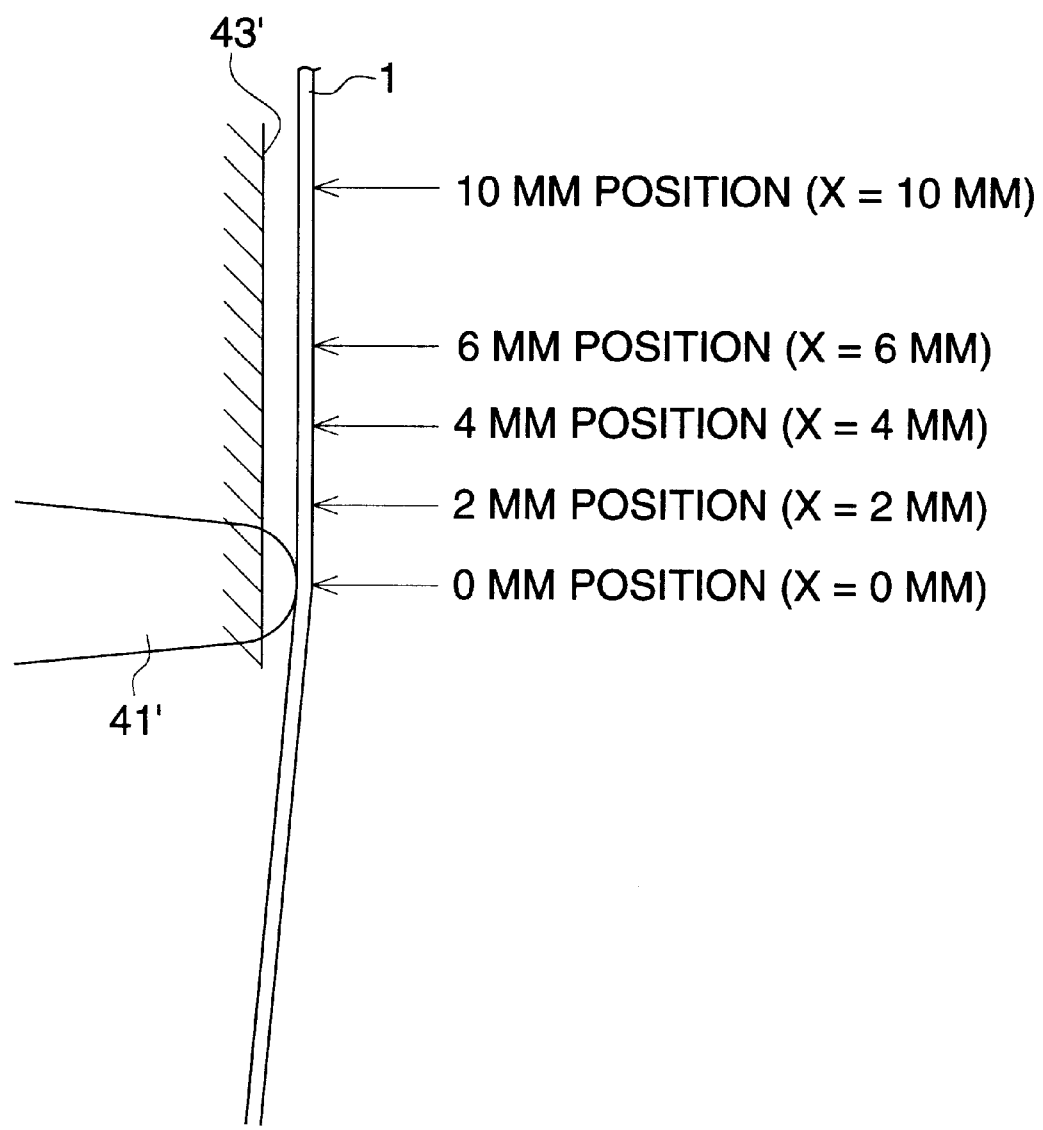

FIG. 20 is a diagram showing a measurement position on a belt photoreceptor where the fluctuation state was measured.

Figure 21:
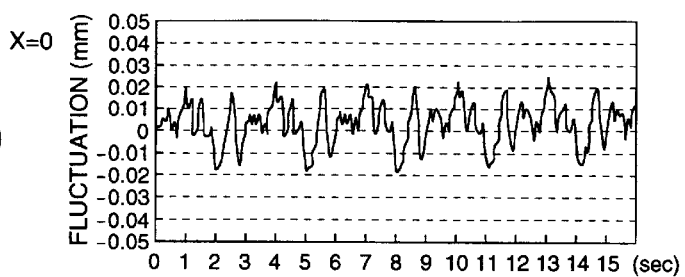
Figure 21:
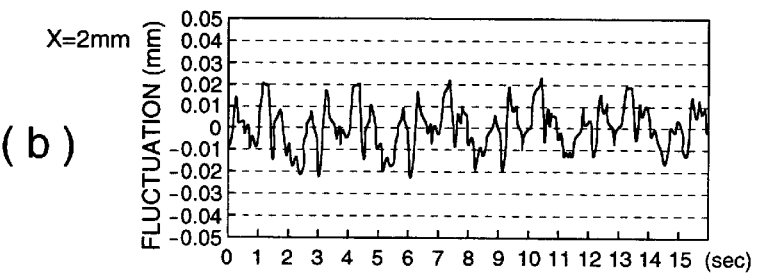
Figure 21:
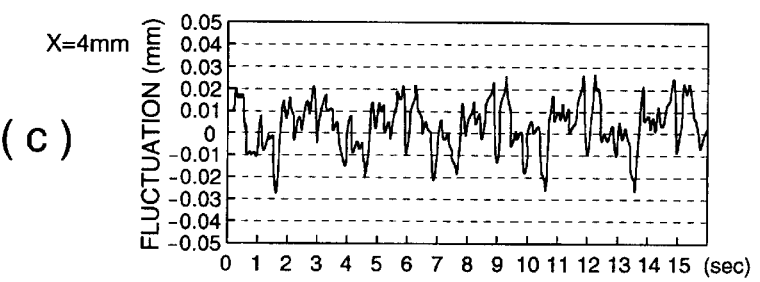
Figure 21:
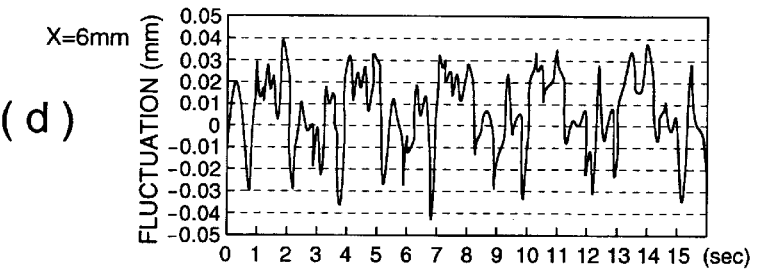
Figure 21:
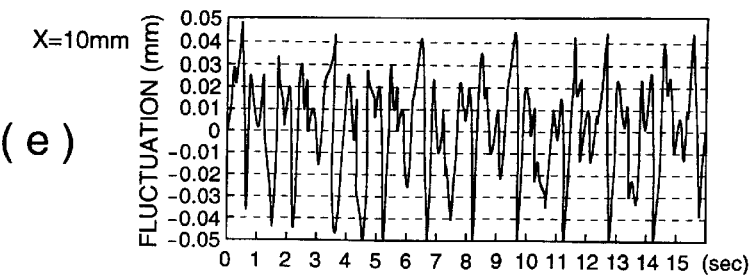

Each of FIGS. 21 (a)–21 (e) is a graph showing the state of fluctuation of a belt photoreceptor.

Figure 22:
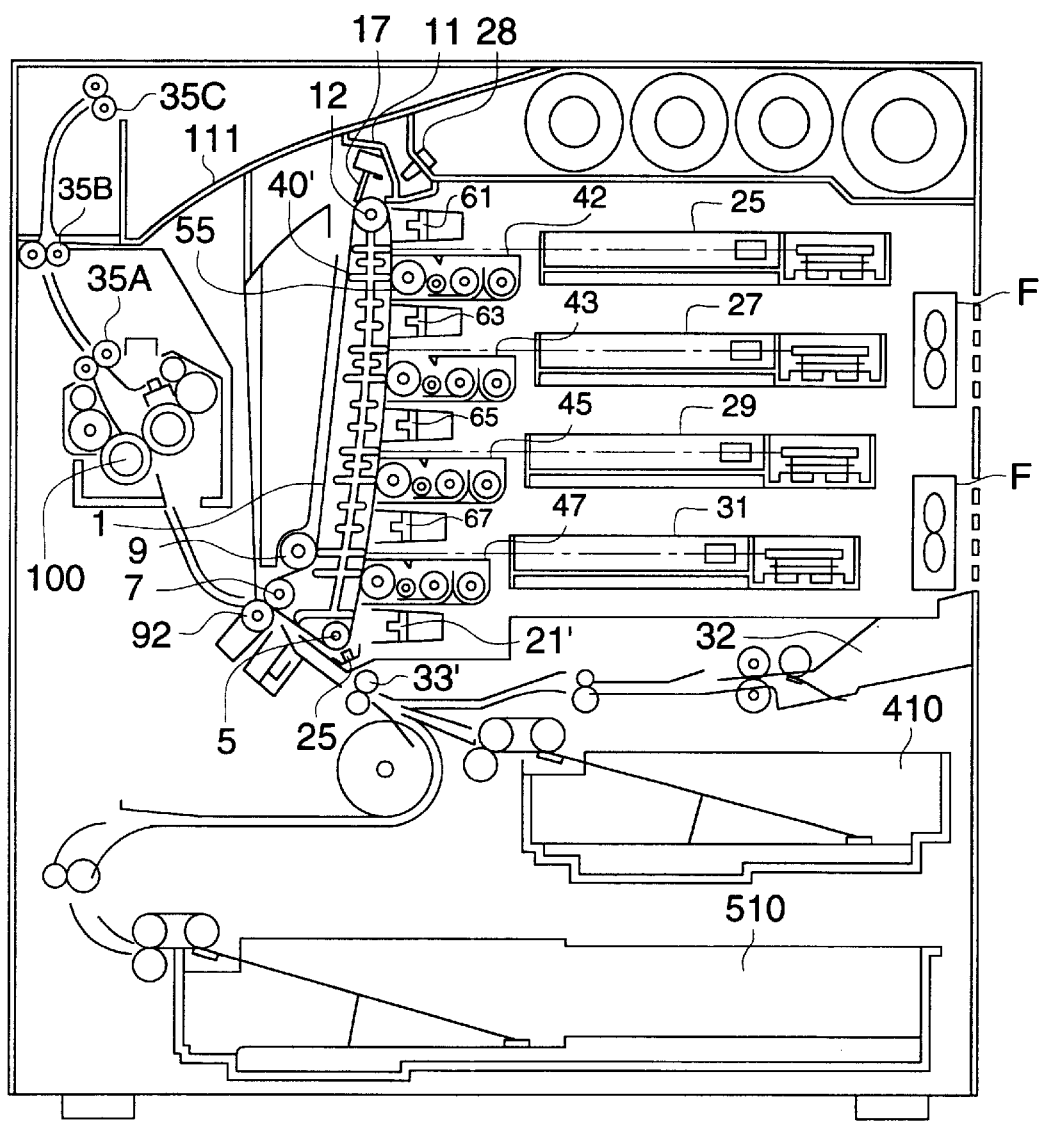

FIG. 22 is a sectional view of an image forming apparatus in the fourth embodiment.

Figure 23:
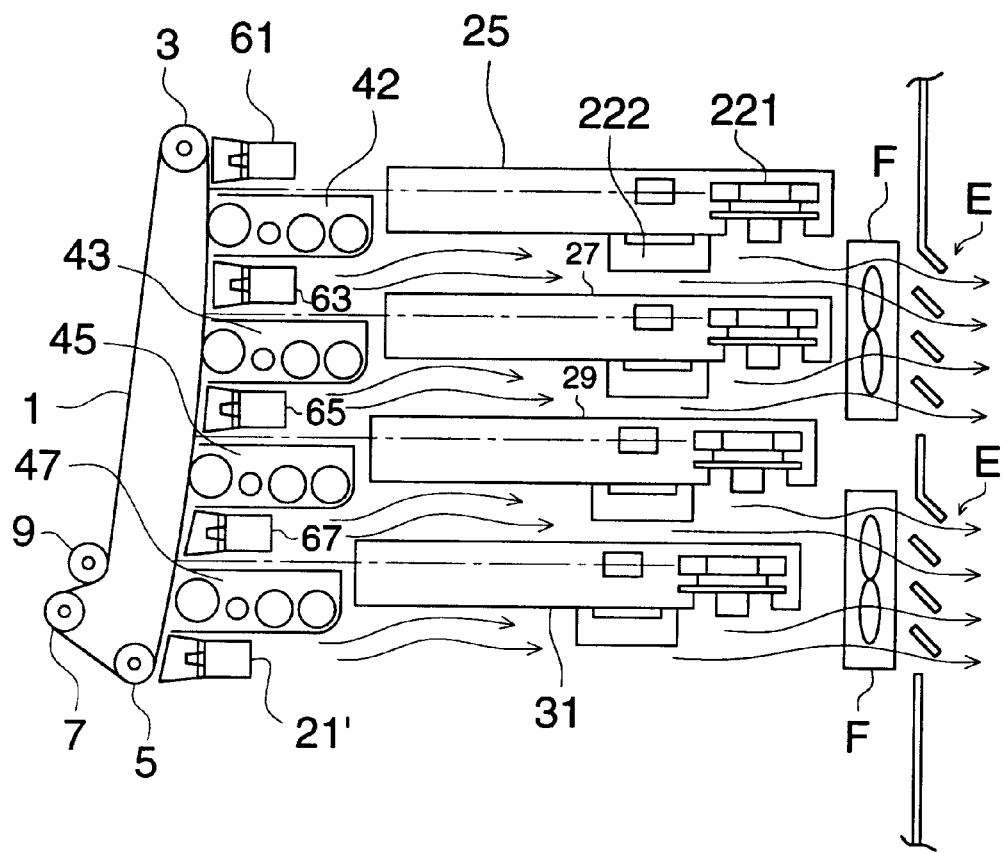

FIG. 23 is a sectional view of primary sections of an image forming apparatus in FIG. 22.

Figure 24:
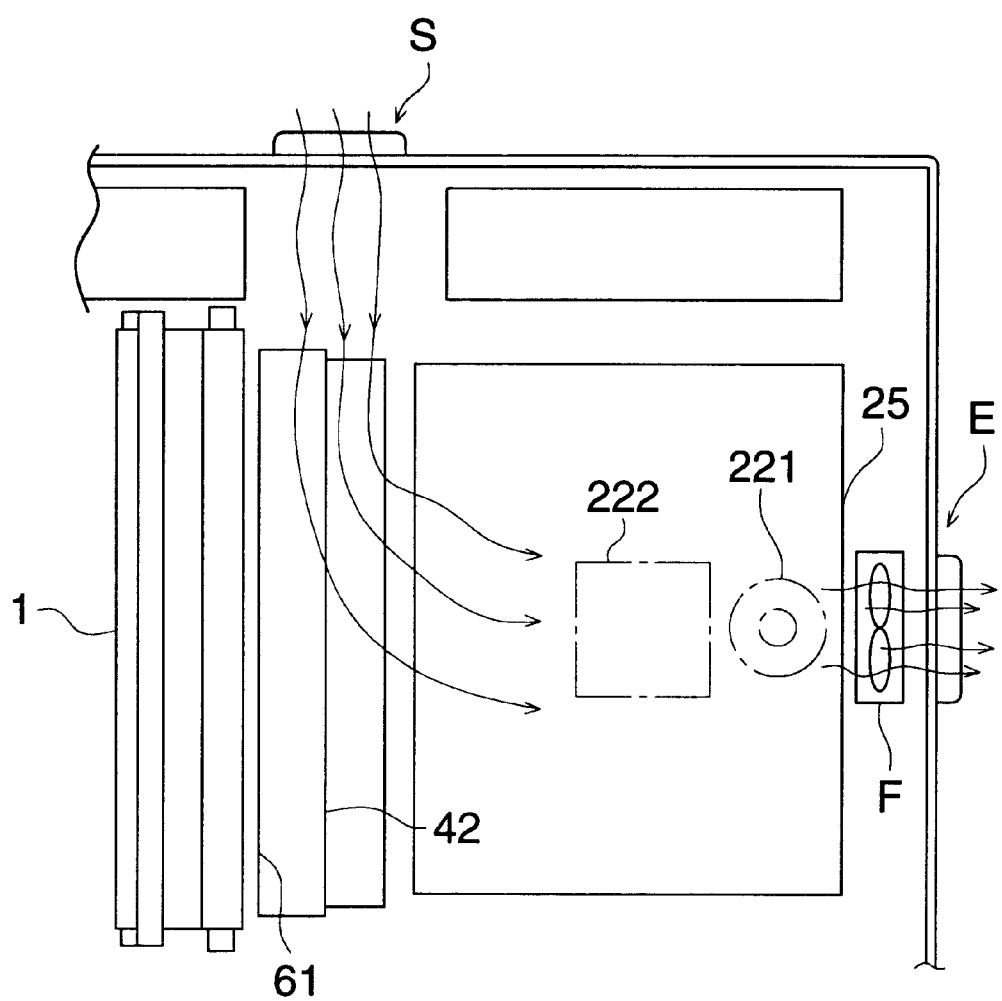

FIG. 24 is a top view of primary sections of an image forming apparatus in FIG. 22.

Figure 25:
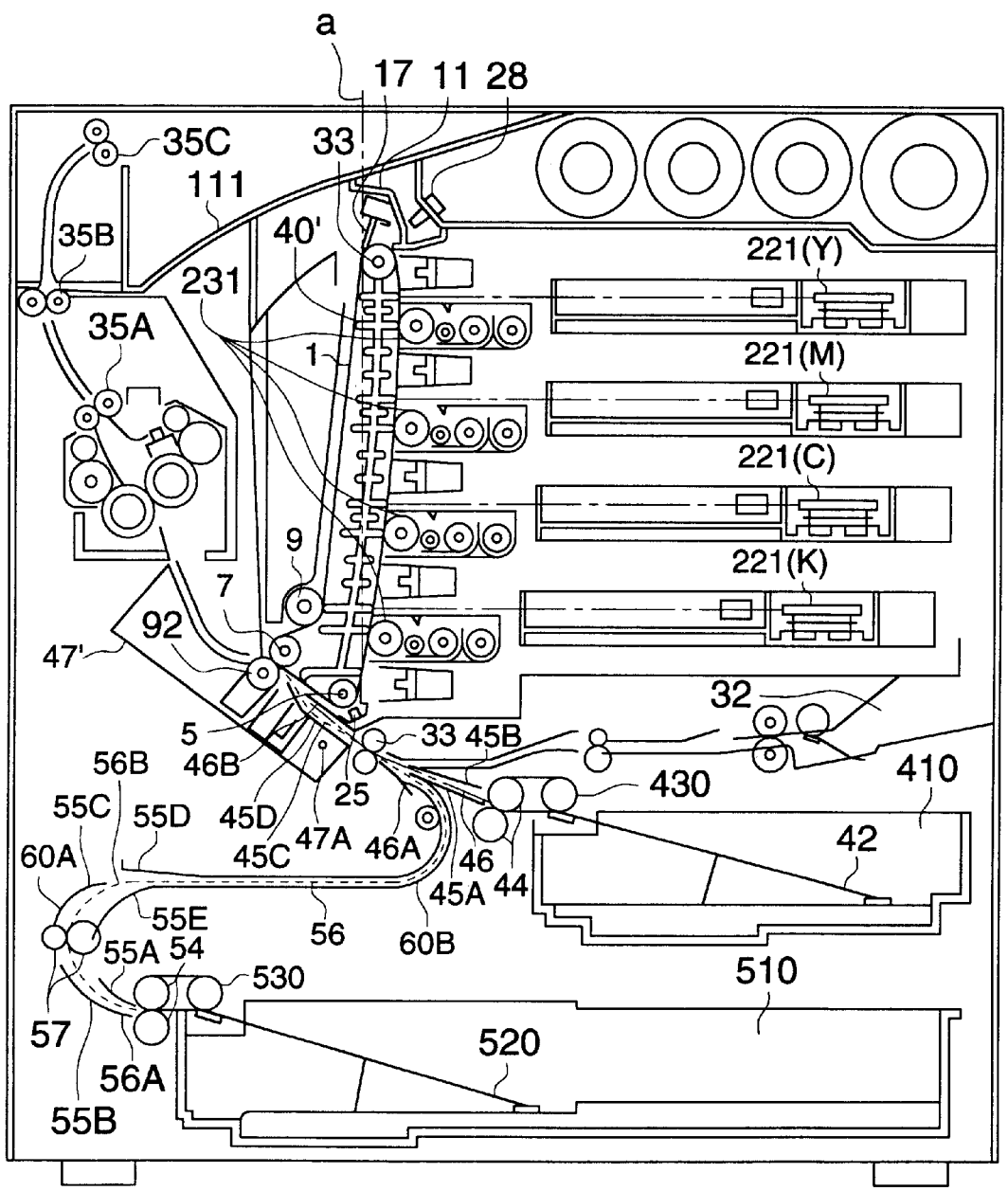

FIG. 25 is a sectional structure diagram of a color image forming apparatus in the fifth embodiment.

Figure 26:
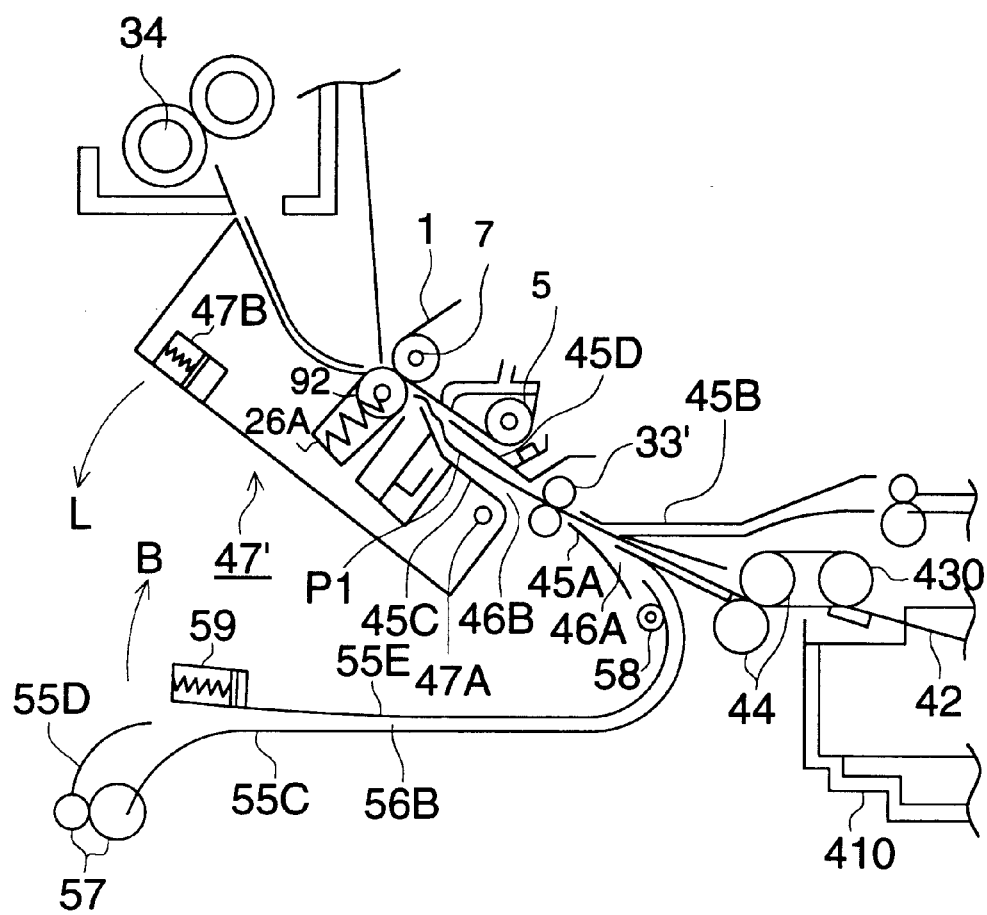

FIG. 26 is a side view of a conveyance path of the apparatus in FIG. 25.

Figure 27:
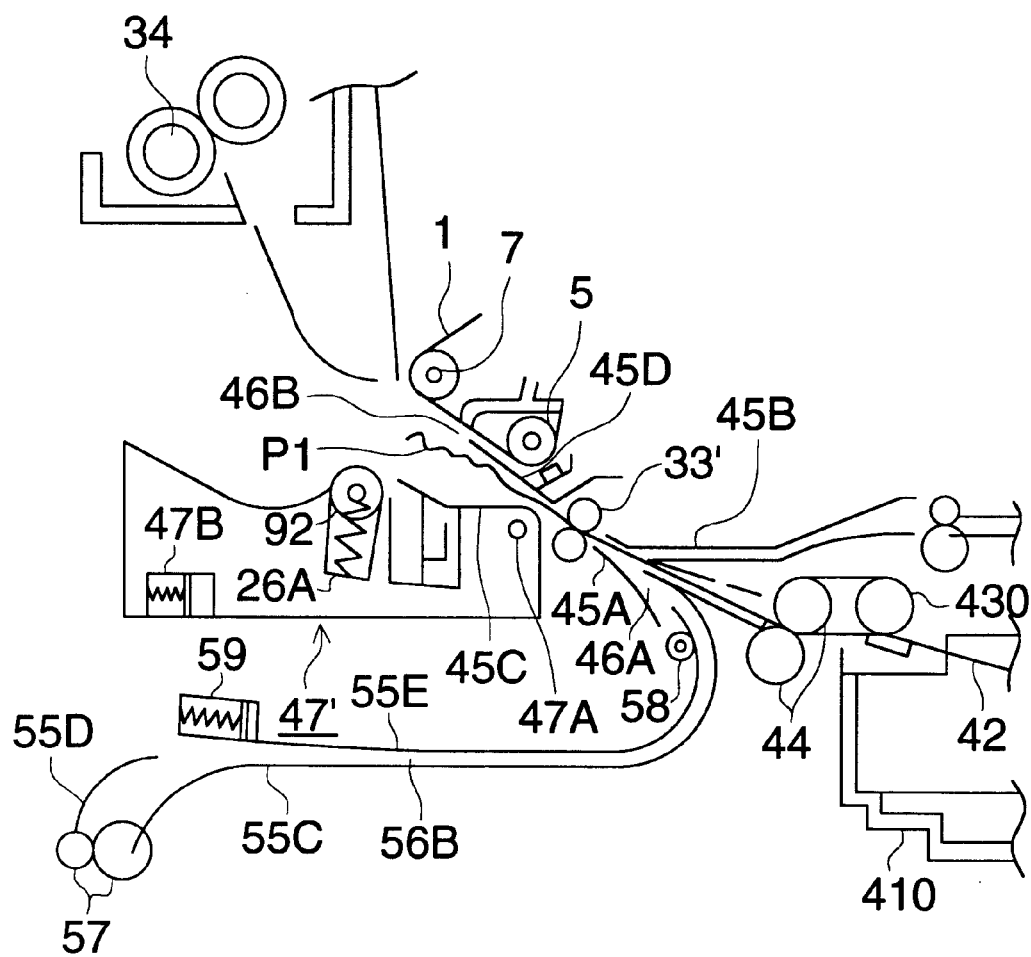

FIG. 27 is a side view of a conveyance path of the apparatus in FIG. 25.

Figure 28:
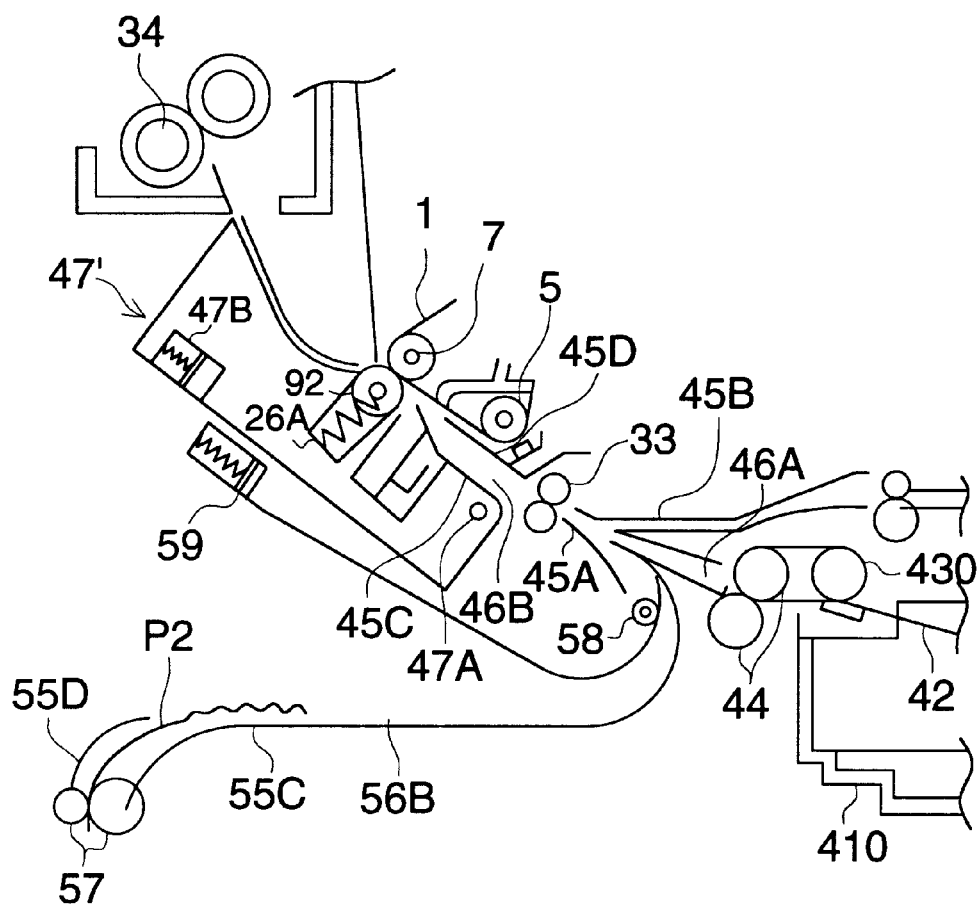

FIG. 28 is a side view of a conveyance path of the apparatus in FIG. 25.

Figure 29:
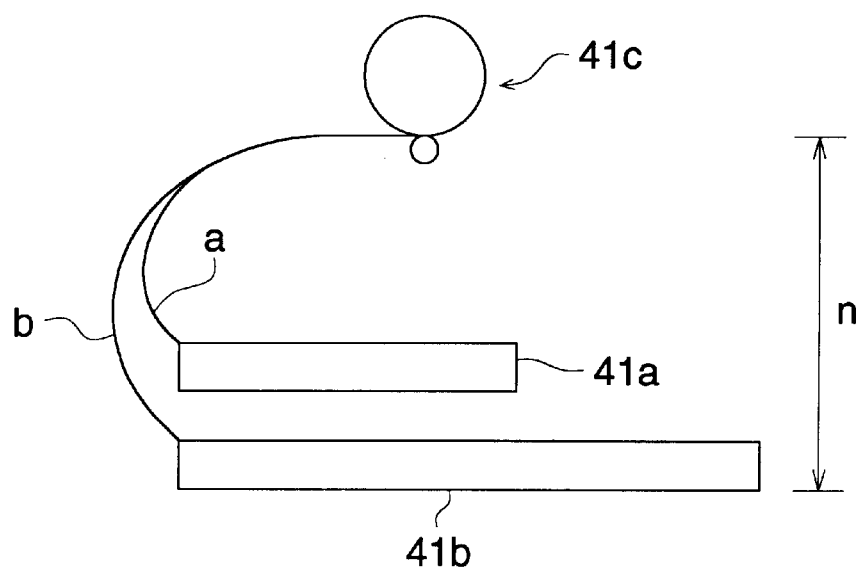

FIG. 29 is a side view showing arrangement of a conventional sheet-feeding cassette.

Figure 30:
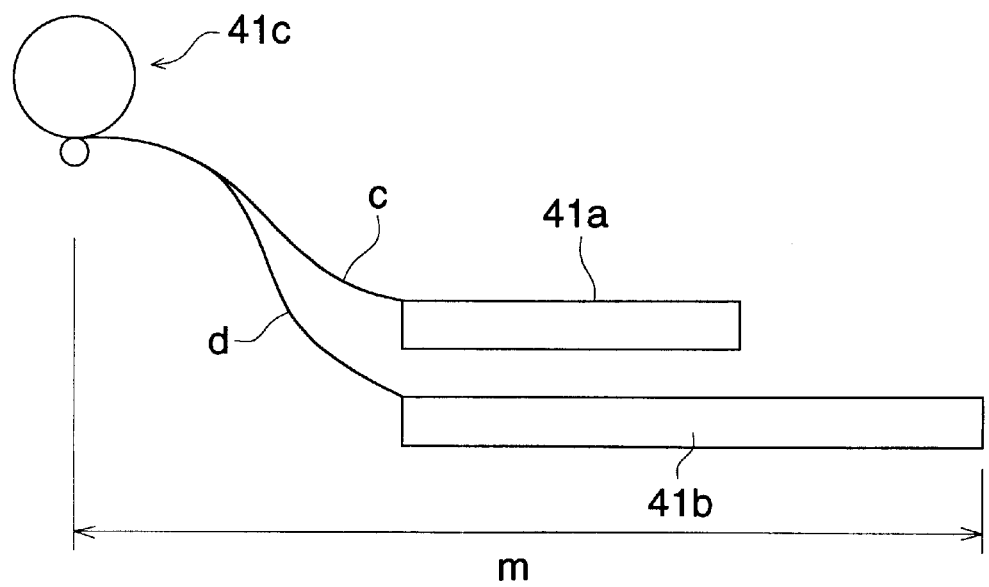

FIG. 30 is a side view showing another arrangement of a conventional sheet-feeding cassette.

Figure 31:
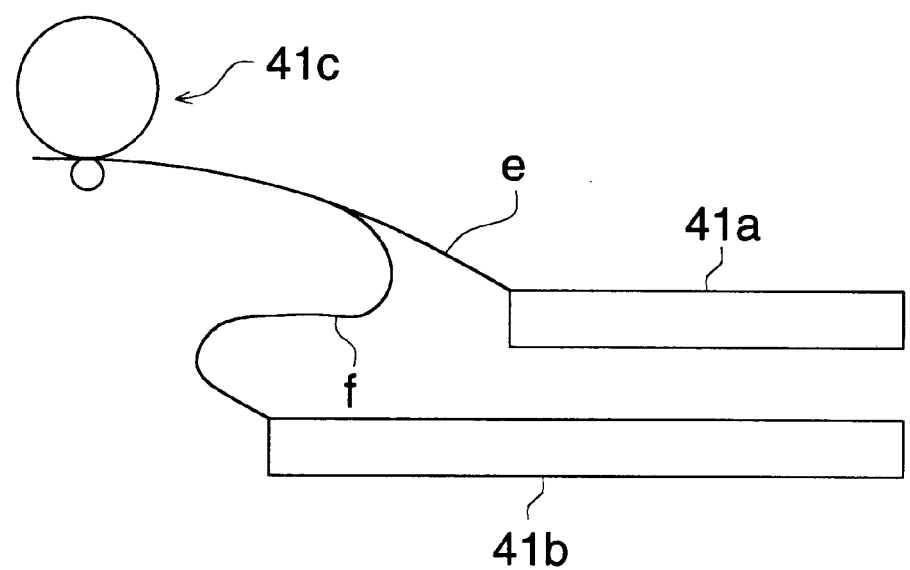

FIG. 31 is a side view showing schematically the structure of a sheet-feeding unit in the invention.

Figure 32:
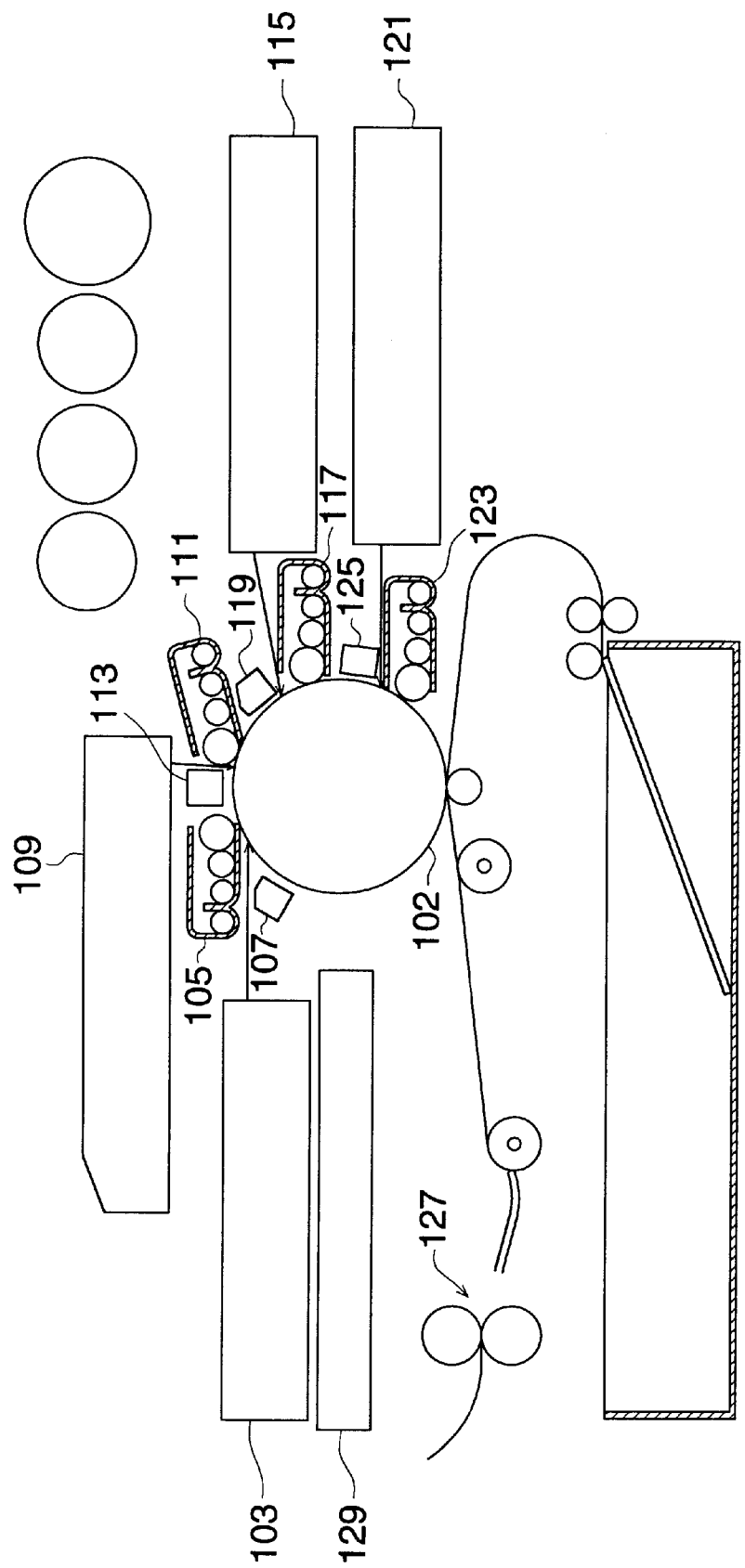

FIG. 32 is a side view of an image forming apparatus in a conventional example for illustrating a problem which is caused when plural developing units, exposure units and charging electrodes are arranged around a photoreceptor drum.

Figure 33:
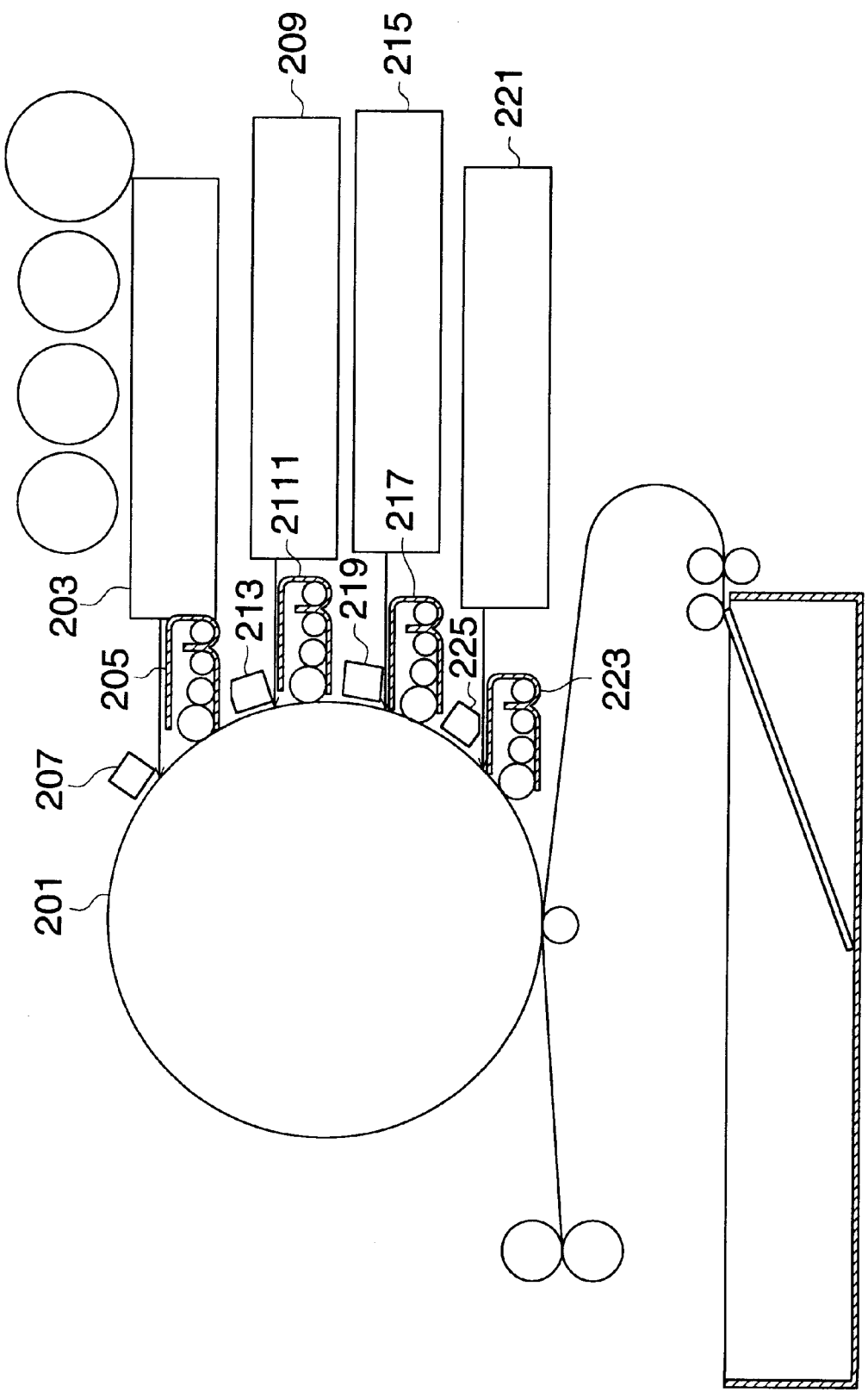

FIG. 33 is a side view of an image forming apparatus in another conventional example for illustrating a problem which is caused when plural developing units, exposure units and charging electrodes are arranged around a photo-receptor drum.

Figure 34:
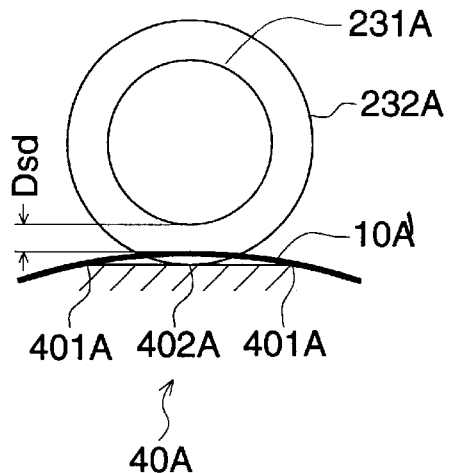
Figure 34:
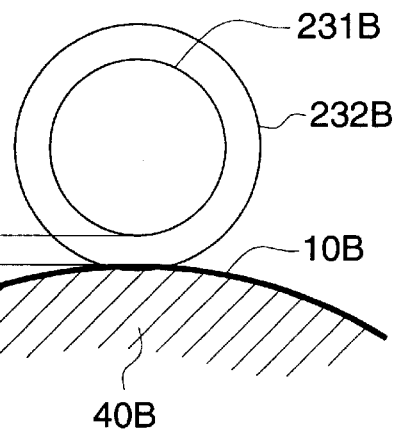

FIG. 34 is an illustration of a developing clearance in conventional example 1.

Figure 35:
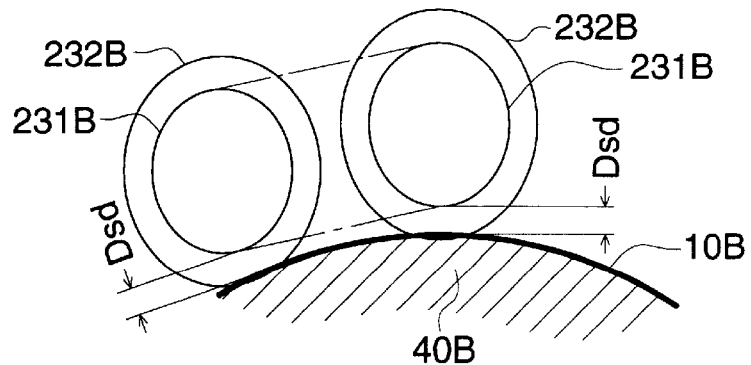

Each of FIGS. 35 (a)–35 (b) is an illustration of a developing clearance in conventional example 2.

DETAILED DESCRIPTION OF THE PREFERRED EMBODIMENT

First Embodiment

Figure 1:
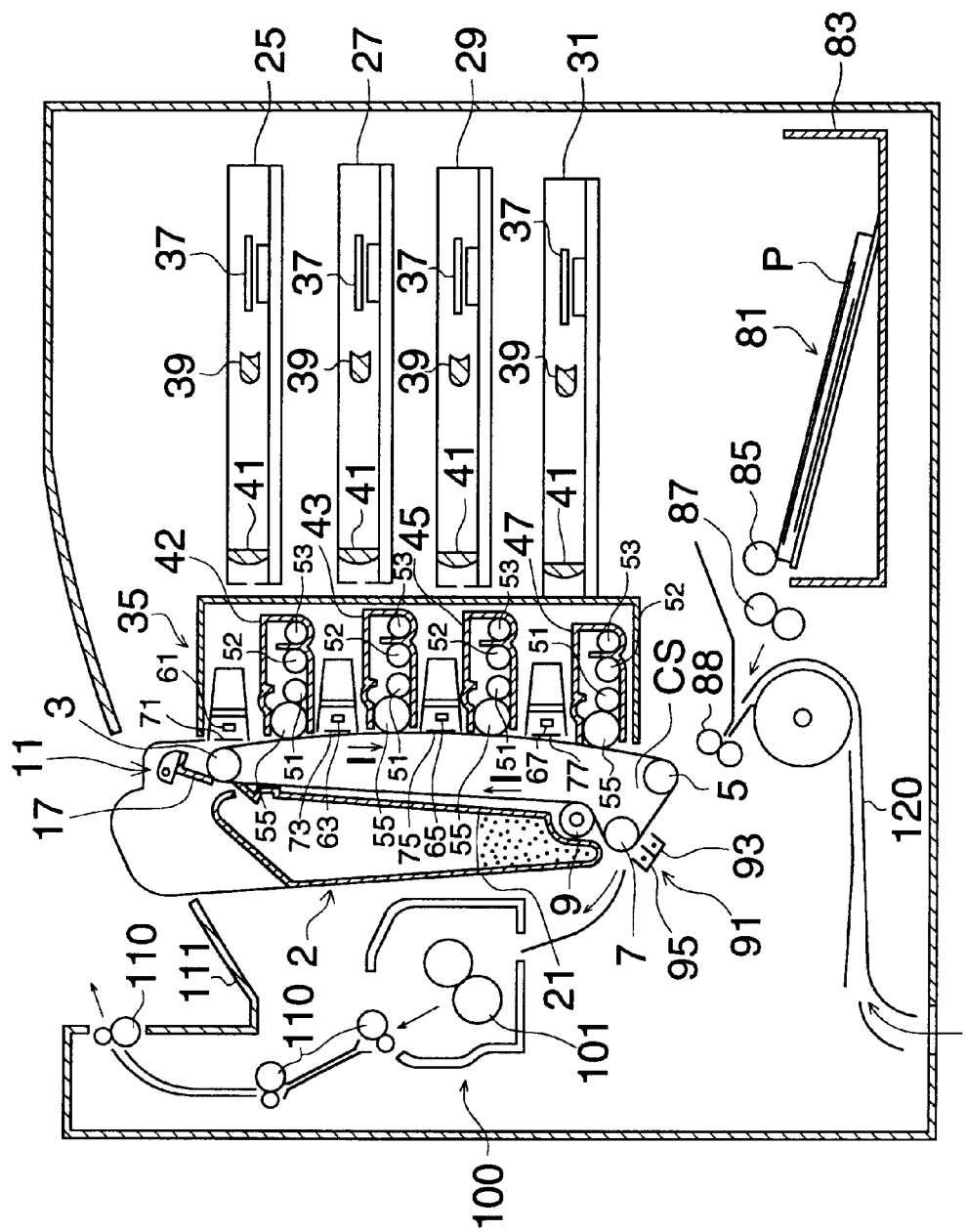
FIG. 1 is a structure diagram of an image forming apparatus in the first embodiment of the invention.
Figure 4:
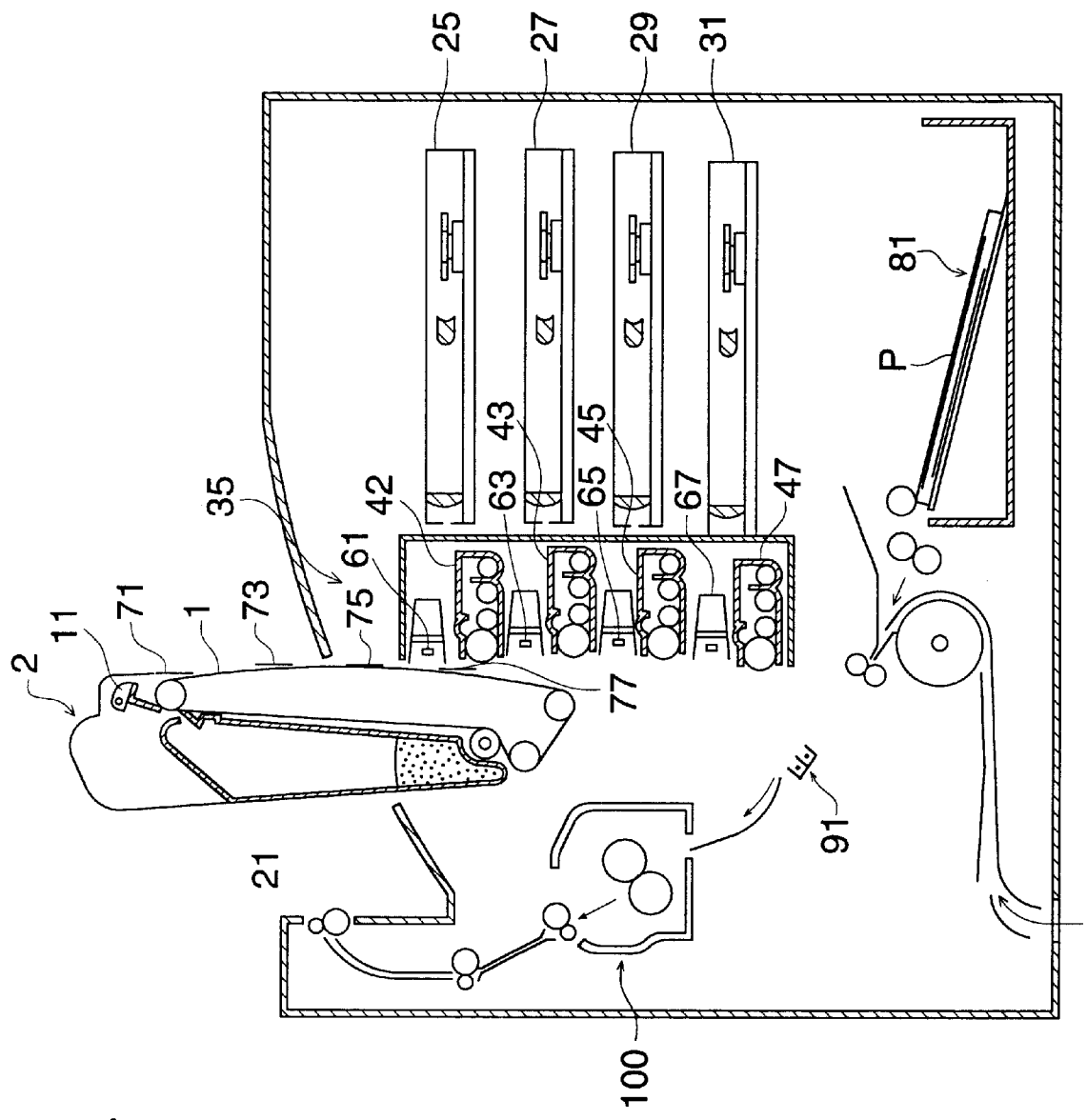
FIG. 4 is a structure diagram wherein an image carrier cartridge is detached from an image forming apparatus in FIG. 1.
Figure 5:
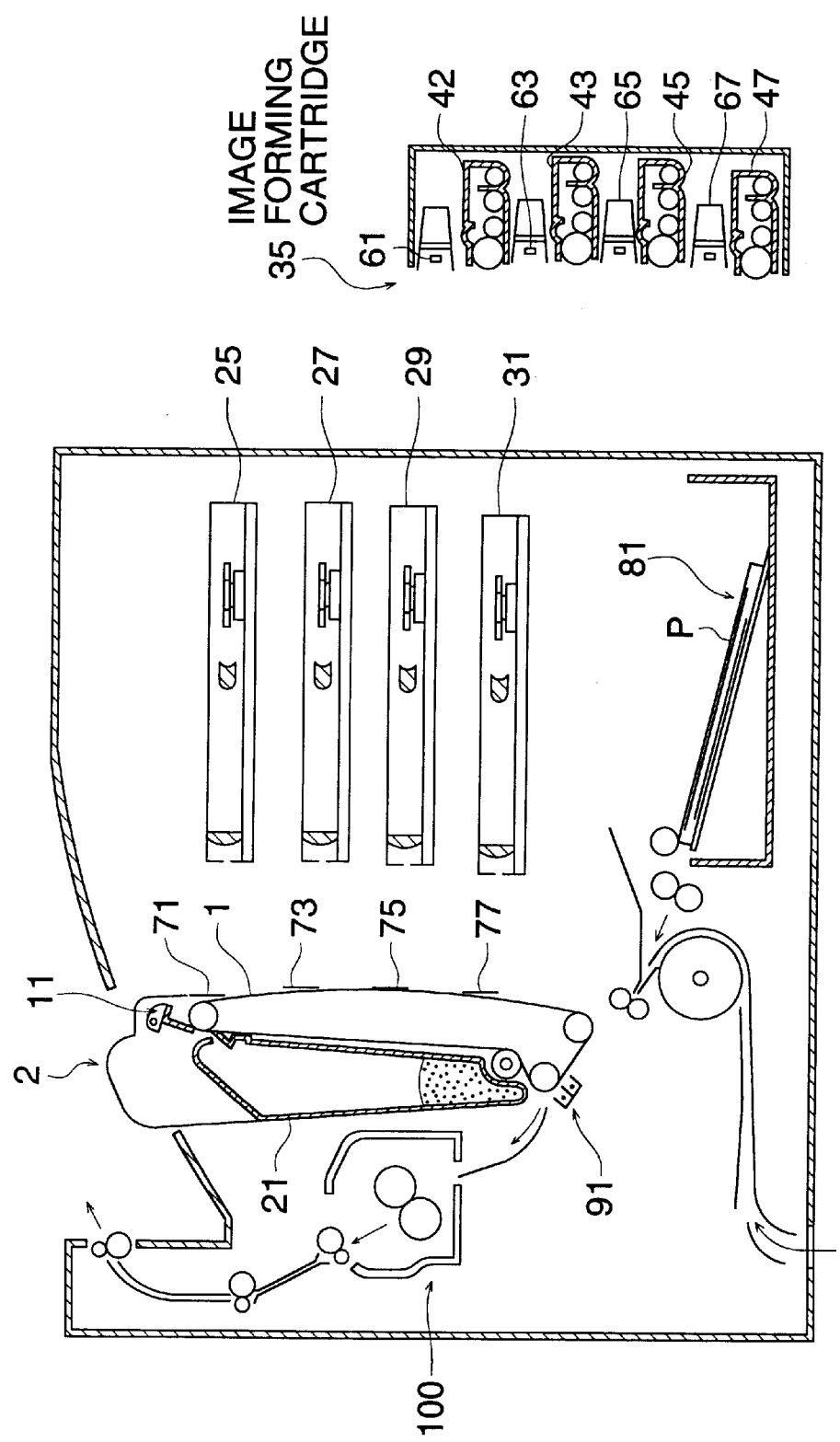
FIG. 5 is a structure diagram wherein an image forming cartridge is detached from an image forming apparatus in FIG. 1.

The first embodiment of the invention will be explained as follows with reference to the drawings. Referring to FIGS. 1, 4 and 5 each representing a structure diagram of an image forming apparatus in the first embodiment of the invention, the general structure of the image forming apparatus will be explained first. Incidentally, the image forming apparatus in the first embodiment is a multi-color (4 colors of (Y) yellow, (M) magenta, C (cyan) and K (black)) image forming apparatus.

First of all, as shown in FIGS. 1 and 4, image carrier cartridge 2 which is provided detachably on the image forming apparatus will be explained. Belt-shaped image carrier (photoreceptor) 1 which is trained about upper roller 3, lower roller 5 and side roller 7 is spread vertically by the upper roller 3 and the lower roller 5, and is driven in the arrowed direction.

Further, on the surface which moves from the bottom to the top in the belt-shaped image carrier 1, there is provided pressure roller 9 serving as a guide means which presses the belt-shaped image carrier 1 toward closed space CS formed by the belt-shaped image carrier 1 and guides the belt-shaped image carrier 1 toward the closed space CS.

Figure 2:
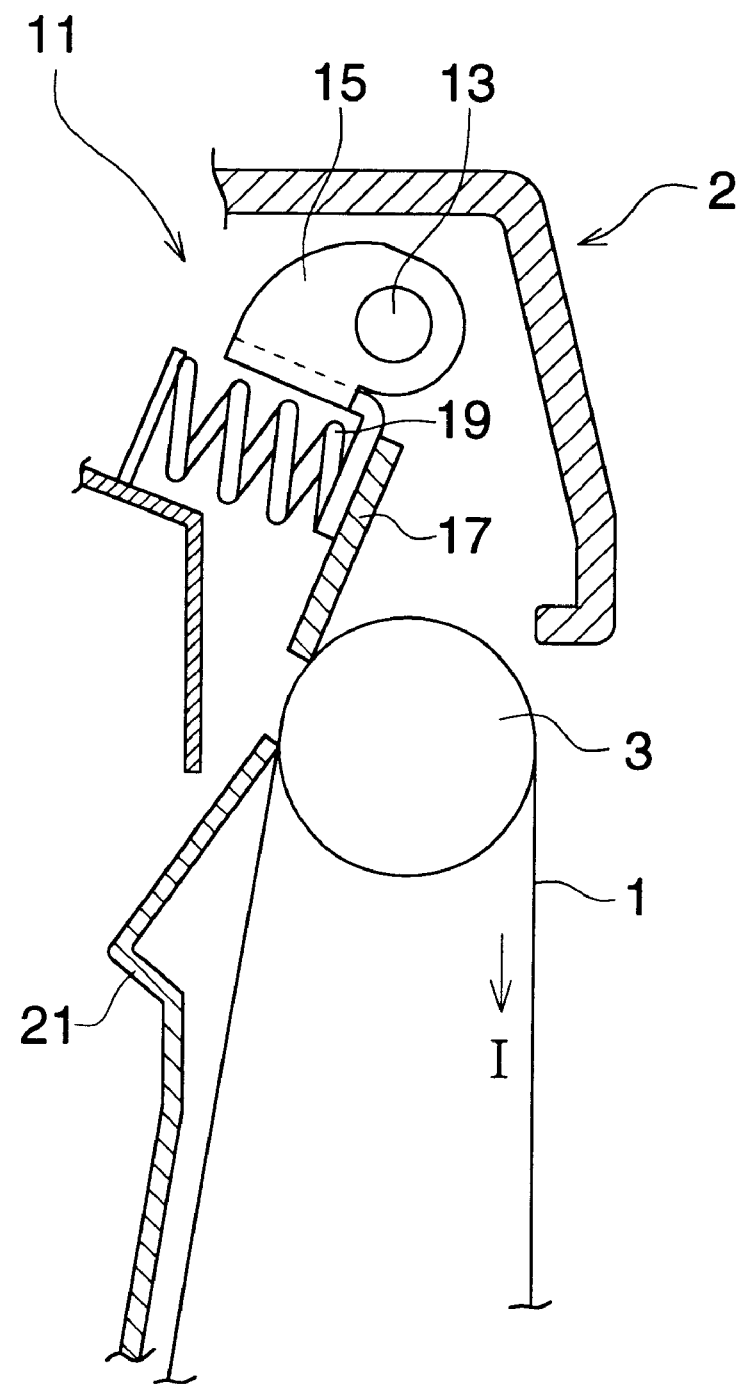
FIG. 2 is an enlarged structure diagram of a cleaning means in FIG. 1.

On the upper portion of the surface in the belt-shaped image carrier 1 moving from the bottom to the top, there is provided cleaning means 11 which removes developing agents on the belt-shaped image carrier 1. This cleaning means 11 will be explained with reference to FIG. 2. On bracket 15 provided on shaft 13 rotatably, there is attached blade 17 capable of coming in contact with the surface of the belt-shaped image carrier 1 moving from the bottom to the top of the belt-shaped image carrier 1. Further, the bracket 15 is urged in the direction in which the blade 17 comes in pressure contact with the belt-shaped image carrier 1 by spring 19 whose one end portion is hooked on the main body side of image carrier cartridge 2 and the other end portion is hooked on the bracket 15. Incidentally, the cleaning means is not limited to the present structure. For example, the bracket 15 may also be attached directly on the image carrier cartridge 2, without being rotatable. Further, though the blade 17 is brought into contact in a countering method in the present structure, it may also be brought into contact in a trailing method.

In FIG. 1 again, below the cleaning means 11, collecting box 21 serving as a collecting means which collects developing agents removed by the cleaning means 11 is provided along the belt-shaped image carrier 1.

Next, an image forming means which forms a latent image for the belt-shaped image carrier 1 will be explained. The image forming apparatus in the present embodiment has therein four image forming means each being for each color, because it is a 4-color image forming apparatus. Namely, the image forming means are imagewise exposure section 25 which forms a latent image for Y (yellow) by the use of a laser beam for the belt-shaped image carrier 1, imagewise exposure section 27 which forms a latent image for M (magenta) by the use of a laser beam for the belt-shaped image carrier 1, imagewise exposure section 29 which forms a latent image for C (cyan) by the use of a laser beam for the belt-shaped image carrier 1, and imagewise exposure section 31 which forms a latent image for K (black) by the use of a laser beam for the belt-shaped image carrier 1.

Since structures of the imagewise exposure sections 25, 27, 29 and 31 serving as four optical writing sections are the same, the imagewise exposure section 25 is explained with reference to FIGS. 1 and 3, and explanations for other imagewise exposure sections will be omitted. In these drawings, the numeral 33 represents a laser beam source which emits a laser beam wherein image signals for Y (yellow) are superposed. A laser beam emitted from the laser beam source 33 is reflected to be polarized by movement of a rotary surface of polygon mirror 37, and conducts scanning exposure for the photoreceptor surface of the belt-shaped image carrier 1 through fθ lens 39 and cylindrical lens 41. Due to this scanning exposure, an electrostatic latent image is formed on the photoreceptor surface of the belt-shaped image carrier 1.

Next, as shown in FIGS. 1 and 5, image forming cartridge 35 provided detachably on the image forming apparatus will be explained. Inside the image forming cartridge 35, there are provided four developing means each developing an electrostatic latent image for each color formed on the belt-shaped image carrier 1. Namely, they are developing section 42 which develops a latent image formed by the imagewise exposure section 25, developing section 43 which develops a latent image formed by the imagewise exposure section 27, developing section 45 which develops a latent image formed by the imagewise exposure section 29, and developing section 47 which develops a latent image formed by the imagewise exposure section 31.

Since structures of these four developing sections 42, 43, 45 and 47 are the same, the developing section 42 is explained, and explanations for other developing sections will be omitted. The numerals 51 and 52 represent screws which stir and convey developing agents (in the present embodiment, developing agent is two-component developing agent composed of toner and carrier) for Y conveyed from an unillustrated developing agent reservoir section, and the numeral 53 is a supply roller which supplies developing agents to developing sleeve 55. The developing sleeve 55 carries developing agents, conducts reversal development for an electrostatic latent image on the belt-shaped image carrier 1, and forms toner images on the belt-shaped image carrier 1.

Further, inside the image forming cartridge 35, there are provided charging electrodes for charging means which give electric charges to the belt-shaped image carrier 1. Namely, the charging electrodes are charging electrode 61 for Y, charging electrode 63 for M, charging electrode 65 for C, and charging electrode 67 for K.

On the other hand, charging means each being for each color have grids 71, 73, 75 and 77 which control charging voltage on the belt-shaped image carrier 1, and these grids 71, 73, 75 and 77 are provided on the part of the image carrier cartridge 2.

In FIG. 1 again, in sheet-feeding section 81, there is provided cassette 83 housing therein transfer sheet P. Transfer sheet P in the cassette 83 is fed out by conveyance roller 85, then nipped by paired conveyance rollers 87 and by paired registration rollers 88 to be conveyed, and is conveyed to transfer section 91.

In the transfer section 91, there are provided transfer electrode 93 which transfers a developing agent image on the belt-shaped image carrier 1 onto transfer sheet P through corona discharge and separation electrode 95 which separates the transfer sheet P from the belt-shaped image carrier 1 through AC discharge.

The numeral 100 represents a fixing section of paired rollers wherein transfer sheet P is nipped between a heat roller on one side and a pressure roller on the other side to be given heat and pressure so that toner may be fused on the transfer sheet P, and the numeral 110 represents paired conveyance rollers which nip the transfer sheet P having been subjected to heat fixing to convey to sheet delivery tray 111. The numeral 120 is a sheet-feeding path through which the transfer sheet P in different size conveyed from a sheet-feeding section provided outside the apparatus passes.

Figure 6:
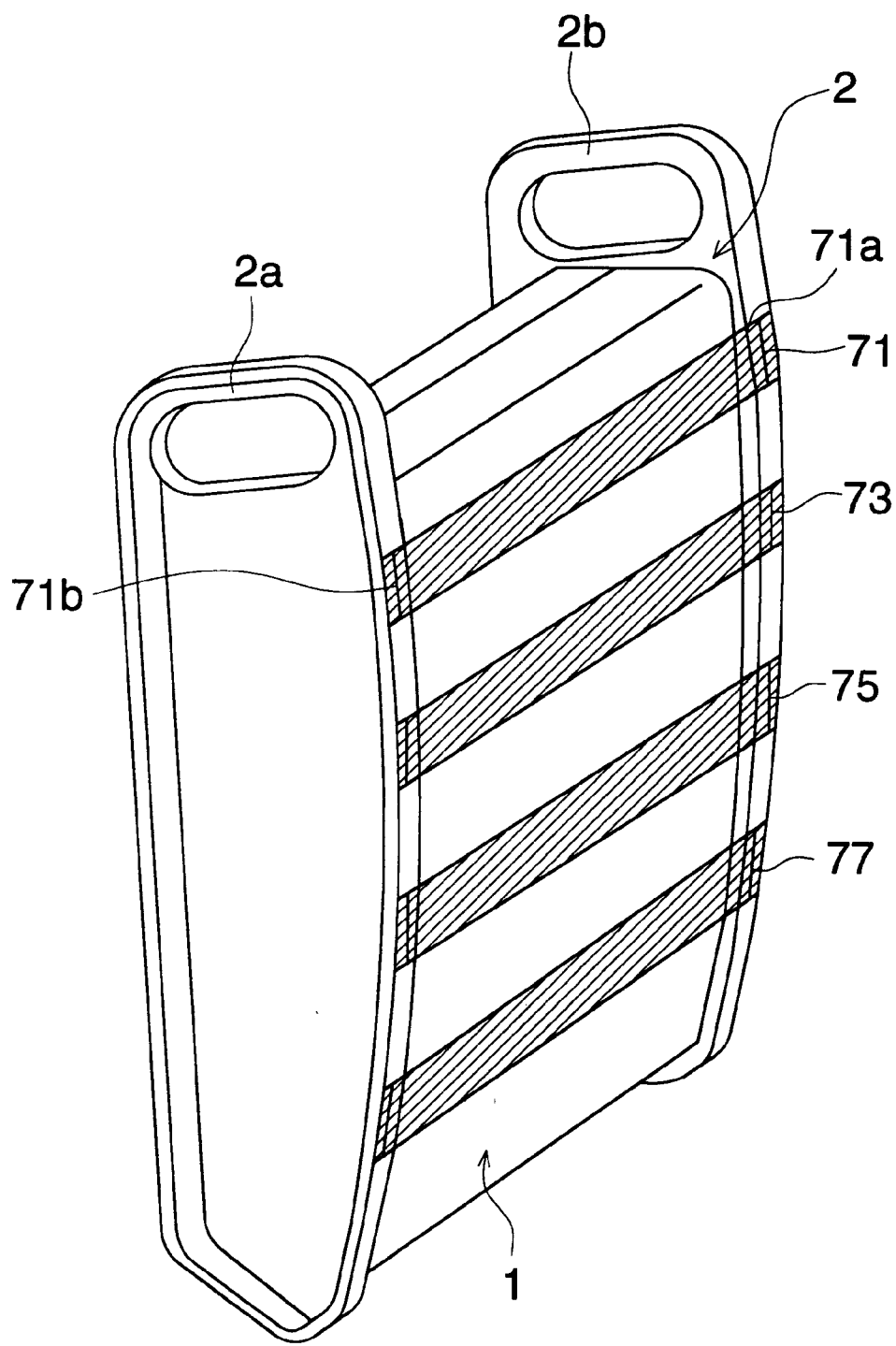
FIG. 6 is a perspective view of an image carrier cartridge shown in FIG. 6.
Figure 7:
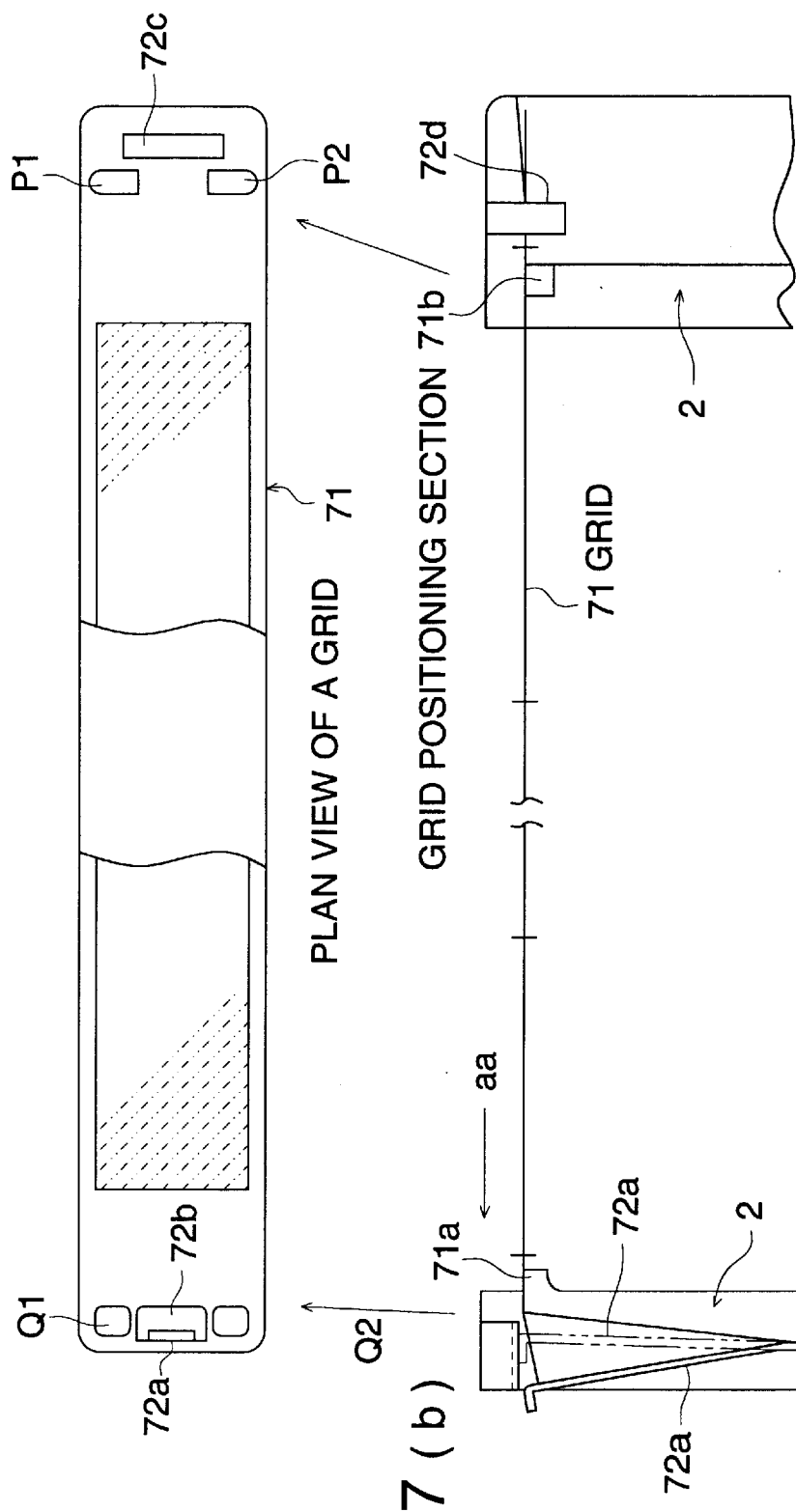
FIG. 7 (a) is a top view of a grid of an image carrier cartridge shown in FIG. 6.

Next, an image carrier cartridge shown in FIG. 4 will be explained further with reference to FIGS. 6 and 7. Image carrier cartridge 2 is structured to be of a rectangular body that is long lengthwise as shown in FIG. 6, and belt-shaped grids 71, 73, 75 and 77 are provided in the lateral direction of the sheet surface to be away from the belt-shaped image carrier 1. The grid 71 has on its one end hole for spring 72*b* into which leaf spring 72*a* enters and holes Q1 and Q2 positioned in the vicinity of the hole for spring 72*b*, and has on the other end thereof hole for hook 72*c* and holes P1 and P2 positioned in the vicinity of the hole for hook 72*c*, as shown in FIG. 7 (*a*). On the image carrier cartridge 2. On both ends of the image carrier cartridge 2, there are solidly provided positioning sections 71*a* and 71*b*, and leaf spring 72*a* is provided on the part of the positioning section 71*a*, while hook portion 72*d* is provided to be projected on the part of the positioning section 72*b*.

The grid 71 is positioned by the positioning sections 71*a* and 71*b* when the hole for hook 72*c* is inserted in the hook portion 72*d* and the hole for spring 72*b* is engaged with the top portion of the leaf spring 72*a*, and then is mounted on the image carrier cartridge 2. In this case, the leaf spring 72*a* is in the free state to be at the position shown with solid lines as shown in FIG. 7 (*b*), and it is in the position shown with two-dot chain lines when it is engaged with the hole for spring 72*b* of the grid 71. Therefore, the leaf spring 72*a* results in the state to pull the grid 71 in a direction in the drawing. Due to this, the grid 71 is attached on the image carrier cartridge 2 under the state of tension. In addition, the grid 71 is slightly bent toward the hole for spring 72*b* and the hole for hook 72*c* from the positioning sections 71*a* and 71*b* so that positioning failure may be prevented. The holes Q1, Q2, P1 and P2, when being bent slightly, lower the rigidity of the grid itself so that it may easily bent for accurate positioning.

Next, in FIG. 1 again, operations in the aforesaid structure will be explained. When the belt-shaped image carrier 1 is driven to move in the direction of arrow mark I, a charging means for Y composed of charging electrode 61 and grid 71 makes the surface of the belt-shaped image carrier 1 to be at the prescribed charging volt, first.

Then, an electrostatic latent image is formed on the belt-shaped image carrier 1 by imagewise exposure section 25. Then, toner in developing agents carried by developing sleeve 55 of developing section 42 is moved by Coulomb force onto the surface of the belt-shaped image carrier 1, thus, a toner image is formed on the belt-shaped image carrier 1.

The same operations as the foregoing are conducted for other colors, namely, for M, C and K, and toner images for Y, M, C and K are formed on the belt-shaped image carrier 1. On the other hand, transfer sheet P is conveyed by conveyance roller 85 and paired conveyance rollers 87 to transfer section 91 from sheet-feeding section 81.

The transfer sheet P thus fed is adjusted in terms of timing by registration roller 88 so that the transfer sheet P may be synchronized with the toner image on the belt-shaped image carrier 1, and is conveyed to transfer section 91 where transfer electrode 93 in the transfer section 91 charges the transfer sheet P and thereby, developing agent images on the belt-shaped image carrier 1 are transferred onto the transfer sheet P.

Further, the transfer sheet P is separated from the belt-shaped image carrier 1 by neutralizing action of separation electrode 95.

Then, the transfer sheet P is heated and pressed at fixing section 100, whereby toner images are fused on the transfer sheet P which is then ejected by paired conveyance rollers 110 onto sheet delivery tray 111.

Excessive toner on the belt-shaped image carrier 1 on which the transferring has been finished is removed by blade 17 of cleaning means 11, and is collected in collecting box 21.

In the image forming apparatus having the aforesaid structure, cleaning means 11 is provided on the surface of belt-shaped image carrier 1 moving upward from the bottom and collecting box 21 in which excessive toner is collected is provided at the lower portion of the cleaning means 11. Therefore, it is possible to make the removed toner to be dropped by the force of gravity, without using a conveyance means, which makes the apparatus to be simple in structure and small in size. Further, these cleaning means 11 and collecting box 21 which are provided along the belt-shaped image carrier 1 can prevent that heat generated from the fixing section 100 adversely affects the belt-shaped image carrier 11, a developing section and an imagewise exposure section.

It is further possible to make the apparatus to be small in size by making the belt-shaped image carrier 1 bend with pressure roller 9 toward the closed space formed by the belt-shaped image carrier 1 and by providing collecting box 21 in the space formed by the bending.

In addition, by providing grids 71, 73, 75 and 77 whose life is similar to that of the belt-shaped image carrier 1 on image carrier cartridge 2, it is possible to replace the belt-shaped image carrier 1 and the grids 71, 73, 75 and 77 after one cycle of operation, which makes parts replacement simple. Furthermore, grids 71, 73, 75 and 77 and the belt-shaped image carrier 1 are integrally structured to be solid by providing the grids 71, 73, 75 and 77 on the image carrier cartridge 2, which makes it possible to keep the distance between the grids 71, 73, 75 and 77 and the belt-shaped image carrier 1 which needs strict precision to be at established accuracy constantly.

Further, by providing charging electrodes 61, 63, 65 and 67 whose life is similar to that of developing sections 42, 43, 45 and 47 on image forming cartridge 35, it is possible to replace the developing sections 42, 43, 45 and 47 and the charging electrodes 61, 63, 65 and 67 after one cycle of operation, which makes parts replacement simple.

Due to the image forming cartridge 35 wherein the developing sections 42, 43, 45 and 47 each being for each color and the charging electrodes 61, 63, 65 and 67 each being for a charging means for each color are integrally structured to be solid, the developing sections 42, 43, 45 and 47 and the charging electrodes 61, 63, 65 and 67 can be replaced after one cycle of operation, resulting in the simple parts replacement. In addition, image carrier cartridge 2 composed of cleaning means 11, collecting box 12, belt-shaped image carrier 1 and grids 71, 73, 75 and 77 makes it possible to replace the parts for replacement such as a cleaning means including a blade, a collecting box limited in terms of capacity, an image carrier and a grid, after one cycle of operation, making the part replacement simple.

Incidentally, the invention is not limited to the embodiment stated above. Though an explanation is given for a multi-color image forming apparatus in the embodiment stated above, the invention can also be applied to a monochromatic image forming apparatus.

As shown in FIG. 1, fixing section 100 housing therein paired rollers 101 is arranged to be at the location which is on the opposite side to imagewise exposure sections 25, 27, 29 and 31 each representing a scanning optical unit about belt-shaped image carrier 1 provided to be long lengthwise, and is almost at the center of the belt-shaped image carrier 1. Due to this arrangement, heat generated from the fixing section 100 is effectively prevented from crawling by the belt-shaped image carrier 1, whereby heat is hardly conducted to each imagewise exposure section of the scanning optical unit, and deformation of the scanning optical unit caused by heat can be prevented.

In a color image forming apparatus, plural toner images (for Y, M, C and K) need to be superposed without a shear to form a color image with no shear so that an image with high quality may be obtained. For this purpose, each of plural laser scanning optical units is required to be set accurately. However, there is a possibility that thermal deformation of each laser scanning optical unit is caused by heat generated from a fixing means arranged in the apparatus, and a position of each unit is deviated. The problem of the deviation in positions of laser scanning optical units caused by the thermal deformation can be solved by the arrangement mentioned above. In the arrangement, therefore, relational positions of plural laser scanning optical units are not deviated, and a quality color image having no shear can be obtained. Since belt-shaped image carrier 1 is arranged to be long lengthwise in the vertical direction, heat generated by fixing section 100 moves upward along the belt surface, making the effect of heat shielding to be great. In addition, a collecting box serving as a developing agent collecting means which is provided along the belt-shaped image carrier 1 in combination makes the heat shielding to be achieve more effectively.

Next, a color image forming apparatus of the so-called tandem system which can obtain the same effect will be explained with reference to FIG. 8. This image forming apparatus has therein transfer belt 9' which conveys a transfer sheet while carrying it, and four photoreceptors 1a, 1b, 1c and 1d arranged around the transfer belt 9'. Each of the photoreceptors 1a, 1b, 1c and 1d is provided on its circumferential surface with each of charging units 61', 63' 65' and 67', each of developing units 42', 43', 45' and 47', and with each of imagewise exposure sections 25', 27', 29' and 31', as shown in the drawing. This image forming apparatus forms on each of the photoreceptors 1a, 1b, 1c and 1d a color-separated electrostatic latent image which is then visualized by each of the developing units 42', 43', 45' and 47' each having therein toner corresponding to each color. On each position where each photoreceptor faces the transfer belt 9', each of transfer electrodes 91', 93', 95' and 95' is provided, whereby each toner image is superposed in succession on a transfer sheet on transfer belt 9' which moves at the same peripheral speed as that of the photoreceptor. In this case, writing on each photoreceptor is conducted with a certain delay time so that toner images can be superposed accurately.

The transfer sheet on which toner images are superposed enters fixing unit 100' in which a composite image is fixed by pressure and heat given to the transfer sheet. Transfer belt 9' is arranged so that its longitudinal direction is in the vertical direction, and the fixing unit 100' is arranged at the location that is almost the center of the transfer belt in its vertical direction, while imagewise exposure sections 25', 27', 29' and 31' are arranged to be opposite to the fixing unit 100' about the transfer belt 9'. Due to the apparatus structure shown in FIG. 8, heat generated from the fixing unit 100' is effectively intercepted by the transfer belt 9' in the same way, positional deviations among the imagewise exposure sections 25', 27', 29' and 31' can be prevented, and no shear is caused when superposing color images, thus a color image with high quality can be obtained.

Next, in the case of the system shown in FIG. 1 wherein plural laser beams from imagewise exposure sections 25, 27, 29 and 31 of plural scanning optical units are used for scanning in the same time period to form toner images for Y, M, C and K and these toner images are superposed on belt-shaped image carrier 1 or on a recording medium, color images can be formed in a shorter time period and productivity is higher than in the system wherein only one scanning optical unit is provided and an image carrier is caused to make plural turns, which is preferable. In the system to employ plural scanning optical units, when superposing toner images for Y, M, C and K formed through scanning of plural laser beams, there sometimes is a possibility that shear in the sub-scanning direction is caused and an appropriate color image can not be formed, unless each laser beam is caused to scan the image carrier at appropriate intervals.

For solving the problem mentioned above, it is arranged in the invention so that relations of relative positions for plural scanning optical units can be established appropriately. Namely, when plural laser beams from imagewise exposure sections 25, 27, 29 and 31 of plural scanning optical units are caused to scan respectively the belt-shaped image carrier 1 at prescribed intervals (60 mm), as shown in FIGS. 9(*a*) to 9(*d*), scanning lines corresponding respectively to Y, M, C and K are formed on the belt-shaped image carrier 1 as shown in the drawing. The relations of relative positions for imagewise exposure sections 25, 27, 29 and 31 of plural scanning optical units are determined so that amount of deviation of relative position in the sub-scanning direction $\delta$ satisfies "$0 \leq \delta < 200$ $\mu$m" at each dot position in the primary scanning direction when the plural scanning lines are moved in parallel to be superposed based on the prescribed intervals in the sub-scanning direction, and the plural scanning optical units are made to be a solid unit. For example, as shown in FIG. 9(*e*), the relations of relative positions of units are established so that an amount of relative deviation in the sub-scanning direction is not more than 200 $\mu$m at arbitrary dot positions (positions in the primary scanning direction) d1–d5 in the primary scanning direction when each scanning line is superposed.

FIG. 10 shows an example wherein plural imagewise exposure sections 25, 27, 29 and 31 are made to be a unit. The front of each imagewise exposure section and outlets of scanning beams 25b, 27b, 29b and 31 are shown in FIG. 10. As shown in the drawing, imagewise exposure sections 25, 27, 29 and 31 are supported respectively by supporting frames 25a, 27a, 29a and 31a as one unit. Under the condition that each of writing sections 25, 27, 29 and 31 is supported by each supporting frame, writing sections are adjusted in terms of positioning therefor while irradiating experimentally imagewise exposure sections mounted on four assembly jigs, and connecting portions A, B and C for supporting frames are glued with adhesives after adjustment of the positioning.

By doing as stated above, each scanning optical unit is positioned at an accurate interval, and when toner images for colors of Y, M, C and K are formed and are superposed on an image carrier or on a recording medium, it is possible to control an amount of shear in the sub-scanning direction to the level which causes no problem. Further, since each unit is made to be a unit, each imagewise exposure section is set at an accurate interval when mounted on an image forming apparatus, and therefore, an interval for each imagewise exposure section does not need to be adjusted after being mounted, thus assembly efficiency and productivity of an image forming apparatus are improved.

Incidentally, though it is considered that distance deviation between laser beams is detected and each scanning optical unit is moved to be adjusted after plural scanning optical units are mounted on an image forming apparatus, this requires to incorporate, in the image forming apparatus, a detecting means which detects deviation between laser beams and a moving and adjusting means for moving and adjusting each scanning optical unit to adjust the detected deviation between laser beams, which makes the image forming apparatus to be big in size and high in cost. However, this problem is solved by the aforesaid method to make scanning optical units a unit.

When structuring each scanning optical unit, it is preferable that constituent parts such as a casing, a lens, a mirror and a polygon mirror are composed of the same parts in the same form in terms of design, which then makes an amount of relative deviation at each dot position small, because distribution characteristics shown in FIG. 9(e) for scanning lines in each scanning optical unit appropriate to others. When a casing, a lens or a part serving as a mirror which is made by evaporating a molded part all constituting each scanning optical unit are made by molding, it is possible to make distribution characteristics to further appropriate to others and to reduce an amount of relative position deviation by selecting molded parts in the same lot and by using those manufactured by the same cavity of a metal mold for molding. Further, since optical elements such as fθ lens 39 and cylindrical lens 41 in FIG. 3, for example, which are arranged between a deflecting unit composed of polygon mirror and others and belt-shaped image carrier 1 have greater influence on deviation of positions, it is effective for reducing an amount of deviation of relative positions that at least the aforesaid parts are manufactured in the same lot and by the same cavity. Though the deviation of positions in the subscanning direction has been explained above as an example, deviation of positions in the primary scanning direction is also a problem, naturally. Since the deviation of positions in the primary scanning direction adversely affects fθ characteristics of lens 39 greatly, it is possible to make the fθ characteristics to appropriate to others and to reduce an amount of deviation of relative positions by using the lenses 39 manufactured in the same lot and by the same cavity.

Second Embodiment

The second embodiment of the invention will be explained as follows with reference to FIGS. 11 and 12. Since an image forming apparatus in the second embodiment is the same as that in the first embodiment in terms of basic structure, the same parts are given the same symbols and explanation therefor will be omitted here.

As shown in FIGS. 11 and 12, on transfer section 91 serving as a transfer means, there is provided transfer roller 92 which is kept at voltage whose polarity is different from that of belt-shaped image carrier 1, and this transfer roller 92 is arranged so that it may cooperate with side roller 7 to nip the belt-shaped image carrier 1.

As shown in FIG. 11, in the vicinity of the belt-shaped image carrier 1, there is provided registration sensor 131 serving as a detecting means which detects the surface condition of the belt-shaped image carrier 1. Between the belt-shaped image carrier 1 and the registration sensor 131, there is provided sheet-feeding path S for transfer sheet P which moves from sheet-feeding section 81 to transfer section 91. Furthermore, in the sheet-feeding path S which faces detecting section 131a of the registration sensor 131, there is arranged light-transmitting cover section 130 on which the transfer sheet P can slide.

Next, operations in the structure mentioned above will be explained.

When a main switch of an apparatus is turned on, the following calibration is conducted first.

Belt-shaped image carrier 1 is driven to move in the direction of arrow mark I, and the surface of the belt-shaped image carrier 1 is made to be at prescribed charging voltage by a charging means for Y composed of charging electrode 61 and grid 71.

Then, an electrostatic latent image with a prescribed pattern is formed on the belt-shaped image carrier 1 by imagewise exposure section 25. Then, toner in developing agents carried on developing sleeve 55 of developing section 42 is moved onto the belt-shaped image carrier 1 by Coulomb force to form a toner image on the belt-shaped image carrier 1.

The same operations as the foregoing are performed for other colors, namely, for M, C and K, whereby toner images for Y, M, C and K are formed on the belt-shaped image carrier 1. Then, the toner images on the belt-shaped image carrier 1 are detected in terms of the state of registration by registration sensor 131, and writing timing for each of Y, M, C and K in image exposing section is corrected so that images corresponding to Y, M, C, and K are formed precisely at the predetermined positions without color deviations.

Next, actual printing is conducted. Namely, when the belt-shaped image carrier 1 is driven to move in the direction of arrow mark I, the surface of the belt-shaped image carrier 1 is made to be at prescribed charging voltage by a charging means for Y composed of charging electrode 61 and grid 71.

Then, an electrostatic latent image is formed on the belt-shaped image carrier 1 by imagewise exposure section 25. Then, toner in developing agents carried on developing sleeve 55 of developing section 42 is moved onto the belt-shaped image carrier 1 by Coulomb force to form a toner image on the belt-shaped image carrier 1.

The same operations as the foregoing are performed for other colors, namely, for M, C and K, whereby toner images for Y, M, C and K are formed on the belt-shaped image carrier 1. On the other hand, transfer sheet P is conveyed by conveyance roller 85 and paired conveyance rollers 87 to transfer section 91 from sheet-feeding section 81.

The transfer sheet P thus fed is adjusted in terms of timing by registration roller 88 so that the transfer sheet P may be synchronized with the toner image on the belt-shaped image carrier 1, and is conveyed, through sheet-feeding path S in synchronization, to transfer section 91 where transfer roller 92 in the transfer section 91 charges the transfer sheet P and thereby, developing agent images on the belt-shaped image carrier 1 are transferred onto the transfer sheet P.

Then, the transfer sheet P is heated and pressed at fixing section 100, whereby toner images are fused on the transfer sheet P which is then ejected by paired conveyance rollers 110 onto sheet delivery tray 11. Excessive toner on the belt-shaped image carrier 1 on which the transferring has been finished is removed by blade 17 of cleaning means 11, and is collected in collecting box 21.

Due to the structure mentioned above wherein registration sensor 131 serving as a detecting means is provided between belt-shaped image carrier 1, the sheet-feeding path can be provided without making a detour around a registration sensor, which makes an apparatus to be small in size. When the sheet-feeding path is caused to make a detour, it is necessary to provide an unnatural path (for example, a small radius of curvature), which causes a possibility of occurrence of a paper jamming problem. This problem, however, can be prevented in advance by the structure mentioned above. Since it is further unnecessary to secure a space for a registration sensor by avoiding the sheet-feeding path, on the contrary, it is possible to set a distance between a developing section and a transfer section to be short, which makes an apparatus small.

Registration sensor 131 serving as a detecting means which is provided in the vicinity of belt-shaped image carrier 1 makes it possible to detect accurately the surface condition of the belt-shaped image carrier 1. Due to light-transmitting cover member 130 which is provided, in a way that transfer sheet P can slide thereon, on sheet-feeding path S facing detecting surface 131a of registration sensor 131 serving as a detecting means, the transfer sheet P can slide on the cover member 130, whereby paper dust or dust sticking to the cover member 130 is removed, and the registration sensor is not soiled, thus detection accuracy of the registration sensor 131 can always be kept constant. By arranging the registration sensor between developing section 47 and transfer section 91, a latent image on belt-shaped image carrier 1 is developed, and surface conditions of the belt-shaped image carrier 1 can further be detected before being influenced by the transfer means, therefore, pressure contact and releasing for the transfer means are not necessary, and the structure can be made simple.

Incidentally, the invention is not limited to the embodiment mentioned above. Though the registration sensor is used as a detecting means in the embodiment mentioned above, it is also possible to use other detecting means such as a patch sensor which detects an amount of adhering developing agents and a surface potential sensor which detects the surface potential conditions.

Further, in the embodiment mentioned above, a multi-color image forming apparatus is used for the explanation, but the invention can also be applied to a monochromatic image forming apparatus.

Next, there will be explained another effect obtained by the arrangement of upper roller 3, lower roller 5 and side roller 7 about which the belt-shaped image carrier 1 is trained as shown in FIG. 11. Problems of the conventional example stated above will be explained with reference to FIG. 13. In an image forming apparatus wherein belt-shaped image carrier 1 is trained about plural rollers, there has been known the structure wherein a toner image is transferred by transfer roller 5' facing transfer electrode 91' onto recording sheet P conveyed by transfer belt 91" in the arrowed direction, and the curvature of the transfer roller 5' is utilized to separate the recording sheet P from the belt-shaped image carrier 1 (see TOKKAIHEI 3-77975). In the case of this structure, however, toner t having electric charges due to the electric field of a transfer section starts moving before the transfer sheet P enters a nip portion formed between the transfer roller 5' and the transfer belt 91", namely, before the transfer sheet P comes in close contact with the belt-shaped image carrier 1, which causes a high possibility that accurate transfer is impossible and a problem of toner dust occurs. Even when trying to make the recording sheet P to come in close contact with the belt-shaped image carrier 1 in advance to avoid this phenomenon, unnaturalness is caused in the sheet-feeding path because the transfer roller 5' has a certain level of a radius of curvature, resulting in a high possibility that a problem of paper jamming occurs. Due to this, it is difficult, in the structure shown in FIG. 13, to transfer a toner image formed on the belt-shaped image carrier 1 onto a transfer sheet properly.

Therefore, as shown in FIG. 11, straight line section SL is formed at the upstream side of transfer roller 92 between lower roller 5 and side roller 7 on the belt-shaped image carrier 1, and thus, it is possible to make a recording sheet to come in close contact with the belt-shaped image carrier 1 in advance within the straight line section SL, namely before being influenced by the transfer electric field, and to solve the problem of toner falling and scattering. Further, by separating the recording sheet from the belt-shaped image carrier 1 at the side roller 7, it is possible to separate simply by utilizing the curved surface of the roller.

Incidentally, as shown in FIG. 12, it is preferable not to arrange other units excluding a sheet delivery section above fixing section 100. It is also preferable that a toner supply device for each developing unit is arranged above each developing unit and at the upper portion of the apparatus main body. Due to this, it is possible to supply toner efficiently to the developing unit from the toner supply device, utilizing the force of gravity. Further, by arranging belt-shaped image carrier 1 to be long lengthwise and by collecting residual toner on the belt-shaped image carrier 1 by cleaning blade 17 at the upper portion of the belt-shaped image carrier 1, it is possible to collect toner in collecting box 21 efficiently owing to an action of the force of gravity.

Next, an opening section which is provided on image forming cartridge 35 for exposing the belt-shaped image carrier 1 with each of imagewise exposure sections 25, 27, 29 and 31 in FIG. 1 will be explained with reference to FIG. 14. Opening sections 351, 352, 353 and 354 are formed on connection frame 35' which houses developing sections 42, 43, 45 and 47 and charging electrodes 61, 63, 65 and 67 integrally in a way that the opening sections correspond respectively to optical axes 25", 27", 29" and 31" each being directed from each of imagewise exposure sections 25, 27, 29 and 31 to the belt-shaped image carrier 1. A laser beam from each imagewise exposure section passes through the opening section to conduct scanning exposure on the belt-shaped image carrier 1. In this case, each of optical axes 25", 27", 29" and 31" passes through the portion between charging electrode 61 and developing section 42, between charging electrode 63 and developing section 43, between charging electrode 65 and developing section 45, and between charging electrode 67 and developing section 47 in image forming cartridge 35. It is therefore sufficient that only space where an optical axis is formed is secured between each charging electrode and each developing section. Due to this, a length of the belt-shaped image carrier 1 can be made short and an entire image forming apparatus can be made small in size accordingly.

As shown in FIG. 14, plural charging electrodes and plural developing sections are housed integrally in image forming cartridge 35, belt-shaped image carrier 1 is arranged in front of the image forming cartridge 35, imagewise exposure sections are arranged behind the image forming cartridge 35, and opening sections 351, 352, 353 and 354 are formed on connecting frame 35' of the image forming cartridge 35 so that the belt-shaped image carrier 1 can be exposed to light from each imagewise exposure section, thus it is possible to replace plural charging means and plural developing means collectively, resulting in easier operation for a user and easier maintenance, which is preferable. Further, imagewise exposure sections are arranged behind image forming cartridge 35 and only space for forming each optical axis between each charging electrode and each developing section has only to be secured in image forming cartridge 35, which makes it possible to shorten a developed length of the belt-shaped image carrier 1 which faces the cartridge 35.

Though ozone tends to be generated from each charging electrode in image forming cartridge 35, it is possible to ventilate efficiently and thereby to deal with ozone by making all or a part of opening sections 351, 352, 353 and 354 to be a ventilation path, which is preferable.

In the case of an image forming apparatus wherein a belt-shaped image carrier, plural charging means, plural developing means and plural exposure means are arranged and toner images for Y, M, C and K are superposed within one turn of the belt-shaped image carrier to form a color image, the apparatus tends to be large in size due to plural charging means and plural developing sections. However, the structure shown in FIG. 14 makes it possible to achieve a small-sized apparatus. Further, when trying to arrange plural charging means, plural developing sections and plural exposure means to face the belt-shaped image carrier, it is necessary to secure each installation space around the belt-shaped image carrier, which makes a developed length of the belt-shaped image carrier to be long and further makes an apparatus to be large in size. However, this problem can be solved by the present apparatus structure. In addition, both the developing sections and charging means need to be replaced almost simultaneously, but when plural charging means and plural developing sections are replaced separately, it is too time-consuming for a user, causing poor operation and poor maintenance. However, this problem can be solved by the cartridge of the present structure which can be removed from the apparatus main body for replacement.

Figure 3:
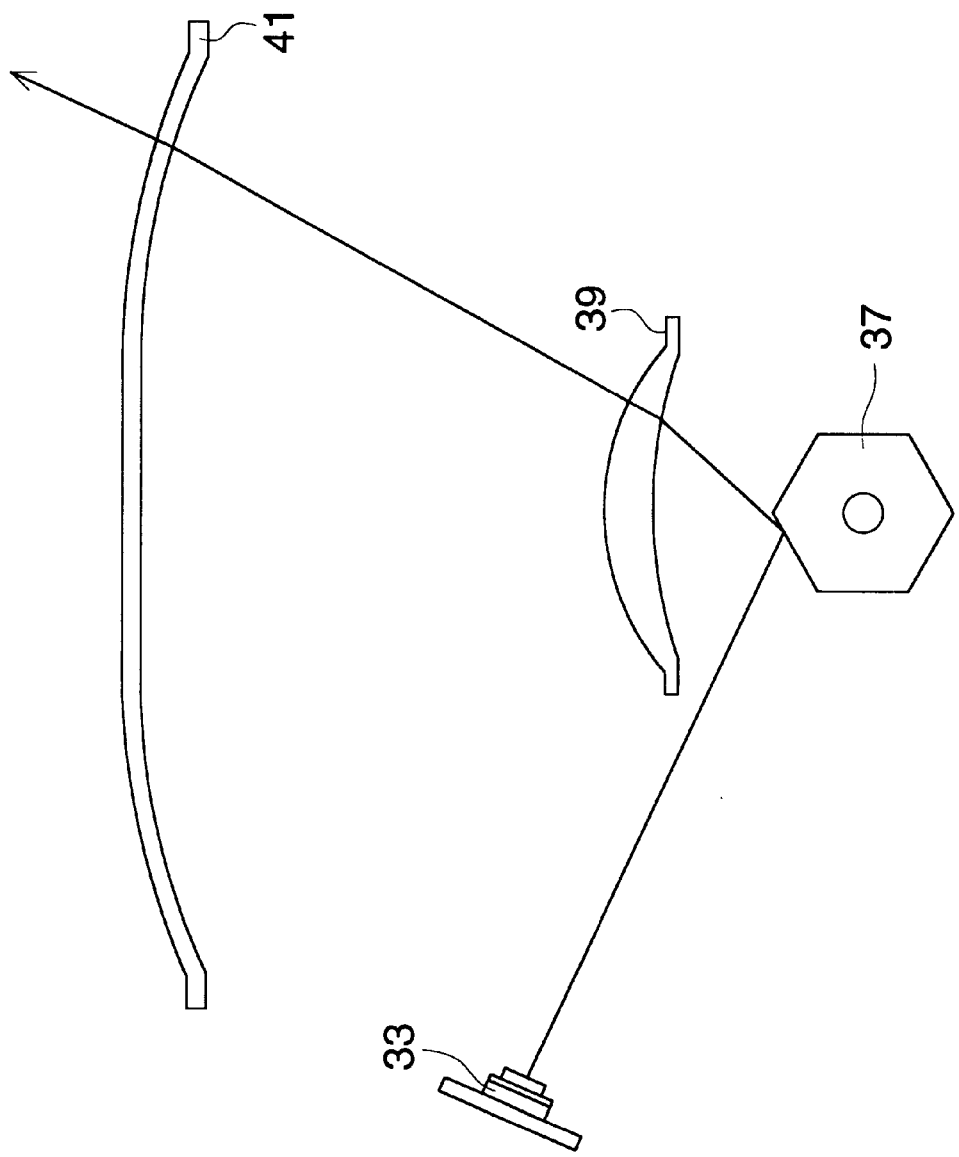
FIG. 3 is a planar structure diagram of an imagewise exposure section in FIG. 1.

In the exposure means stated above, a mirror is not provided on an optical path for exposing belt-shaped image carrier 1 between polygon mirror 37 in each of imagewise exposure sections 25, 27, 29 and 31 and the belt-shaped image carrier 1 is directly exposed as shown in FIGS. 1 and 3. Heretofore, there has been a case wherein an optical path is changed by deflecting a laser beam with a mirror for the reason of arrangement of imagewise exposure sections in the entire apparatus. When a mirror is used as in the foregoing, there is a possibility of occurrence of an occasion wherein an optical path of a laser beam is deflected by the distortion of the mirror and scanning can not be conducted on an appropriate position on belt-shaped image carrier 1b which is not preferable because shear is caused on the formed images. However the structure mentioned above makes it possible to scan the belt-shaped image carrier 1 accurately. In particular, when conducting scanning exposure from plural imagewise exposure sections, each laser beam can be made to scan the appropriate position on the belt-shaped image carrier 1 to reduce shear of images to an invisible level.

To realize the arrangement mentioned above, it is structured so that a line connecting a rotary shaft of each polygon mirror (rotary polyhedral mirror) may be almost parallel with the surface of the belt-shaped image carrier 1. Due to this arranging structure, it is possible to make a laser beam to scan the belt-shaped image carrier 1 directly. Incidentally, it is preferable to structure so that an air flow may be generated so prevent thermal deformation around each imagewise exposure section. Owing to the prevention of the thermal deformation of each unit, a laser beam from each unit can scan the appropriate position on the belt-shaped image carrier 1.

A seamed belt is used for the belt-shaped image carrier 1 stated above, and in this case, a developed length of the belt-shaped image carrier 1 needs to be made as short as possible because it has an influence on the size of an image forming apparatus. On the other hand, for the reasons of necessity for forming an image on a large-sized recording sheet and increase of printing speed by forming plural images on the belt-shaped image carrier 1, there is also an occasion where a developed length of the belt-shaped image carrier 1 needs to be increased. For efficient and continuous transfer onto the recording sheet, therefore, it is necessary to establish a developed length of the belt-shaped image carrier 1 and an effective image area taking the length of the recording sheet and a sheet feeding interval into consideration.

In the invention, the establishment mentioned above has been made in a way that the relations of $2n \geq L \geq n+2x$ and $m \geq n+x$ are satisfied. As shown illustratively in FIG. 15, total length L of belt-shaped image carrier 1" in its rotational direction is set to be not less than the length which is the sum of length n of the largest recording sheet capable of forming an image and twice the shortest length x between recording sheets P fed continuously and to be not more than 2n. The reason for the lower limit value of (n+2x) is that n or more is necessary to form an image on the largest recording sheet within one turn of belt-shaped image carrier 1" and sheet feeding intervals need to be considered when forming plural images each being smaller than n within one turn of belt-shaped image carrier 1", therefore, the total length L of the belt-shaped image carrier 1" represented by n is too short. For the reason of process control mentioned above, therefore, it is necessary to make the total length L to be longer than n by 2x for the efficient process control. It is reasonable that the upper limit value is represented by 2n when a small-sized apparatus and process control are considered. The reason for the lower limit value (n+x) for length m of an effective image area of the belt-shaped image carrier 1" is that n or more is needed to form an image of the largest recording sheet size within one turn of the belt-shaped image carrier 1", and it is necessary for efficient process control to set the lower limit value to be longer than n by x from the viewpoint of process control When a developed length (total length) of a belt-shaped image carrier and a length of an effective image area of the belt-shaped image carrier 1" are set as stated above, printing speed, an apparatus size and process control are in harmony in an image forming apparatus employing belt-shaped image carrier 1" having thereon a seam, which is effective.

(Third embodiment)

Image forming process and structure of a color image forming apparatus representing the third embodiment of an image forming apparatus of the invention will be explained with reference to a sectional structure diagram in FIG. 16. Since the image forming apparatus in the third embodiment is the same as that in the first embodiment in terms of basic structure, the same symbols are given to the same parts and explanation therefor will be omitted here.

Belt-shaped image carrier 1 is a flexible photoreceptor belt trained about driving roller 7 and rotary rollers 3 and 5, and it is stretched tensely by an action of tension roller 9 to rotate clockwise while touching partially backup member 40' provided on its internal circumferential surface. In the belt-shaped image carrier 1, a thin film of metal such as tin oxide, lead oxide or indium oxide is provided as a conductive layer on a flexible base body such as polyester, polyimide, or polyethyleneterephthalate and the upper surface of the conductive layer is coated with an organic photoconductor layer (OPC) and the conductive layer is grounded. In the belt-shaped image carrier 1 in the present embodiment, OPC is coated on an 80 μm-thick base body of polyethyleneterephthalate to be controlled accurately so that the total thickness of 100 μm may be kept constantly.

On the side of the stretched belt-shaped image carrier 1, there are provided four sets of image forming means each being composed of charging means, imagewise exposure means and developing section.

Scorotron charging electrodes 61, 63, 65 and 67 each representing a charging means are used for image forming processes for colors of yellow (Y), magenta (M), cyan (C) and black (K), and they electrically charge organic photoconductor layers of belt-shaped image carrier 1 with control grids kept at prescribed voltage and with corona discharge by discharge wires, thus, uniform voltage is given to the belt-shaped image carrier 1.

Each of imagewise exposure sections 25, 27, 29 and 31 having an exposure optical system representing an imagewise exposure means makes a laser beam emitted from a semiconductor laser to be rotated for scanning by a polygon mirror rotated by a driving motor and conducts imagewise exposure for belt-shaped image carrier 1 through fθ lens. The imagewise exposure is conducted when image signals of each color read by a separate image reading device are subjected to image processing and then are inputted as electric signals in each of the imagewise exposure sections 25, 27, 29 and 31.

Developing sections 42, 43, 45 and 47 each housing one-component or two-component developing agents for each of yellow (Y), magenta (M), cyan (C) and black (K) representing a developing section employing a non-contact developing method are arranged vertically at one side of belt-shaped image carrier 1 arranged vertically to be positioned in parallel with the belt surface in a way that each of the developing sections is perpendicular to the moving direction of the belt-shaped image carrier 1, and each of them is provided with developing sleeve 55 (only a part of them is illustrated) which rotates in the same direction while keeping a prescribed distance from the circumferential surface of the belt-shaped image carrier 1 through a means explained later.

The developing sections 42, 43, 45 and 47 develop reversely the electrostatic latent images on the belt-shaped image carrier 1 formed through charging by scorotron charging electrodes 61, 63, 65 and 67 and imagewise exposure by imagewise exposure sections 25, 27, 29 and 31 with impression of developing bias voltage under the non-contact condition.

Upon the start of image recording, a driving motor revolves to rotate belt-shaped image carrier 1 clockwise through driving roller 7, and scorotron charging electrode 61 starts supplying voltage to the belt-shaped image carrier 1 through its charging action. After being supplied with voltage, the belt-shaped image carrier 1 starts to be subjected to exposure by electric signals corresponding to the first color signals, namely, to image signals for yellow (Y) at imagewise exposure section 25, whereby an electrostatic latent image corresponding to a yellow (Y) image is formed on the photoreceptor layer on the surface of the belt through its rotation (sub-scanning). This latent image is subjected to reversal development conducted by developing section 42 under the condition that developing agents stuck to and carried by developing sleeve 55 are on the non-contact basis, thus a toner image for yellow (Y) is formed when the belt-shaped image carrier 1 rotates.

Then, voltage is supplied on the toner image for yellow (Y) on the belt-shaped image carrier 1 by scorotron charging electrode 63 through its charging action, and exposure by electric signals corresponding to the second color signals of imagewise exposure section 27, namely, to image signals for magenta (M) is given, thus, a toner image for magenta (M) is formed, through non-contact reversal development conducted by developing section 43, to be superposed on the toner image for yellow (Y).

Through the same process, a toner image for cyan (C) corresponding to the third color signals is further formed by scorotron charging electrode 65, imagewise exposure section 29 and developing section 45 to be superposed, and a toner image for black (K) corresponding to the fourth color signals is further formed by scorotron charging electrode 67, imagewise exposure section 31 and developing section 47 to be superposed, thus, color toner images are formed on the circumferential surface of the belt-shaped image carrier 1 when it makes one turn.

Developing agent for replenishment for each color is supplied to each of developing sections 42, 43, 45 and 47 by each of toner replenishing tanks 241, 242, 243 and 244. For developing operation conducted by each of developing sections 42, 43, 45 and 47, DC development bias or development bias of DC plus AC is impressed on each developing sleeve 55, and jumping development by means of one-component developing agents or two-component developing agents sticking to the developing sleeve 55 is conducted, thus there is conducted non-contact reversal development for the belt-shaped image carrier 1 whose conductive layer is grounded wherein a toner image is made to stick to an exposure section on a photoreceptor from the developing sleeve 55 on which DC bias having the same polarity as that of electric charges on the belt-shaped image carrier 1 is impressed.

The color toner image thus formed on the circumferential surface of the belt-shaped image carrier 1 is neutralized by pre-transfer exposure unit 25 after being uniformed in terms of voltage of sticking toner by scorotron charging electrode 21', and then is transferred at a transfer section onto a transfer sheet which is fed out from cassette 81 or 510 representing a sheet feeding unit or from manual feeding section 32, then conveyed to timing roller 88 and is conveyed while being synchronized with a toner image area on the belt-shaped image carrier 1 by the timing roller 88 by transfer roller 92 which is arranged to face the lower portion of side roller 7 for driving the belt-shaped image carrier 1.

The transfer sheet onto which the toner image has been transferred is conveyed, after being separated from the circumferential surface of the belt-shaped image carrier 1 which follows the curved surface of side roller 7, to fixing section 100 where it is heated and pressed, whereby toner is fused and fixed on the transfer sheet, and then is ejected out of the fixing section 100 and conveyed by sheet ejection and conveyance rollers 35A, 35B and 35C to be delivered onto sheet delivery tray 111 provided at the upper portion with a toner image surface on the transfer sheet facing downward.

On the other hand, the surface of the belt-shaped image carrier 1 from which the transfer sheet has been separated is scraped by cleaning blade 17 in cleaning means 11 so that residual toner is removed and cleaned, and the belt-shaped image carrier 1 is either ready for succeeding toner image forming for the following document image or is stopped momentarily to be on standby. Incidentally, in the case of succeeding toner image forming for the following document image, the photoreceptor surface of the belt-shaped image carrier 1 is subjected to exposure conducted by pre-charging exposure unit 28 so that hysteresis is removed.

In the color image forming apparatus of the present embodiment, development clearance Dsd formed between the photoreceptor surface of the belt-shaped image carrier 1 and developing sleeve 55 for each color can be maintained at an established clearance of 500–600 μm which is suitable for non-contact development for the total length of developing sleeve 55 within a highly accurate fluctuation range of not more than ±20 μm. This has been achieved by the study of inventors of the invention after confirming that the established development clearance Dsd maintained within the fluctuation range in the aforesaid accuracy makes it possible to develop excellent toner images having no unevenness.

In FIG. 17, each of sectional views of developing sections 42, 43, 45 and 47 arranged to face belt-shaped image carrier 1 shown in FIG. 16 is enlarged. On backup member 40' representing a stopper supporting member provided inside the belt-shaped image carrier 1, there is provided semi-cylindrical stopper supporting section 41' which faces at least developing sleeve 55 and is protruded to be in a fin shape and has a radius of 1.5 mm on its tip. Each stopper supporting section is provided so that it touches the back side of the belt-shaped image carrier 1 in the direction perpendicular to the rotational direction of the belt-shaped image carrier 1. Further, in the color image forming apparatus of the present embodiment, on the back side of the belt-shaped image carrier 1 where a scanning beam from each of imagewise exposure sections 25, 27, 29 and 31 conducts imagewise exposure on a photoreceptor layer on the belt-shaped image carrier 1, there is provided semi-cylindrical stopper supporting section 42' having a small radius similar to that in the aforesaid stopper supporting section 41' for the purpose of preventing vibration or fluctuation caused in the course of rotation of the photoreceptor surface so that each stopper supporting section touches in the direction perpendicular to the rotational direction of the belt-shaped image carrier 1. The belt-shaped image carrier 1 trained about rotary rollers 3 and 5 is given tension of a certain level on its one side by pressure roller 9, and on the other side thereof where image forming is conducted, the back side of the belt-shaped image carrier 1 is touched at stopper supporting sections 41' and 42' at eight places each corresponding to each color, and the belt-shaped image carrier 1 is rotated clockwise at constant speed by side roller 7 which rotates at constant speed with a large winding angle.

The belt-shaped image carrier 1 located on the side where image forming is conducted is stretched to be almost a plane by the tension between each pair of two contact places among eight contact places, and angle θ formed between the plane on the upstream side and the plane on the downstream side both of the belt stretched to both sides of the stopper supporting section 41' is preferably set to be in the range of 175°–179°. Since contact of the stopper supporting sections 41' and 42' with the back side of the belt-shaped image carrier 1 acts as frictional resistance, it is structured so that the stopper supporting sections 41' and 42' touch the back side of the belt-shaped image carrier 1 through a semi-cylindrical section having preferably a radius on a section ranging from 1 mm to 3 mm, thus, an area of contact with the back side of the belt is reduced, and thereby frictional resistance in the course of rotation of the belt is reduced. When the angle θ formed between the plane on the upstream side and the plane on the downstream side both of the belt stretched to both sides of the stopper supporting section 41' is small, namely when the belt-shaped image carrier 1 is greatly bent to rotate, the resistance in rotation at thee contact point is great, which is not preferable.

Resistance in the course of rotation of the belt-shaped image carrier 1 is reduced as stated above and a slip between side roller 7 and the belt-shaped image carrier 1 at their contact point is eliminated to achieve an arrangement wherein the belt-shaped image carrier 1 rotates at constant speed and no shear is caused on superposed toner images, and development clearance Dsd is accurately maintained to be constant in the following way.

FIG. 18(*a*) shows sectional view in the axial direction and FIG. 18(*b*) shows sectional view in the direction perpendicular to the axial direction both of a developing area formed by developing sleeve 55, On both ends of the developing sleeve 55 which is cylindrical and rotates, there are provided ball bearings 232 each serving as a stopper member. An inner ring of the ball bearing 232 is provided fixedly on the developing sleeve 55 and an outer ring is fixed in casing 233 for each of developing sections 42, 43, 45 and 47, and when a part of the ball bearing 232 is brought into contact with stopper supporting section 43' by an urging mechanism provided separately and when the outer ring of the ball bearing 232 representing a stopper member comes in contact with the stopper supporting section 43', development clearance Dsd is formed between an outer circumference of the developing sleeve 55 and the photoreceptor surface of the belt-shaped image carrier 1.

In the invention, there is formed a plane which is in parallel with a plane formed by belt-shaped image carrier 1 that is stretched on both sides of the belt-shaped image carrier 1, and the plane serves as stopper supporting member 43'. FIG. 19 is a perspective view showing the relation between the belt-shaped image carrier 1 and the stopper supporting member 43', and each of the upstream side and the downstream side both from the stopper supporting section 41' provided to face the belt-shaped image carrier 1 to the stopper supporting section 42' is formed to be a plane, and angle θ formed between the plane on the upstream side and the plane on the downstream side stretched to both sides of the stopper supporting section 41' is within a range of 175°–179°. Therefore, the belt-shaped image carrier 1 moves stably while touching a linear portion that is perpendicular to the rotational direction of the belt on a semi-cylindrical portion with a small radius at the tip of the stopper supporting section 41' and keeping the flatness.

In the invention, a position of contact with stopper supporting section 43' of the ball bearing 232 representing a stopper member is established to be within a range of 0–5 mm on either the upstream side or the downstream side in the vicinity of the stopper supporting section 41'. An embodiment shown in FIG. 18(b) indicates the state wherein stopper supporting section 43' having a plane that is in parallel with a plane (hatched section) which is on the upstream side of the point of contact with the stopper supporting section 41' of the belt-shaped image carrier 1, is provided. By making the ball bearing 232 to come in contact to be close (preferably within a range of 0–5 mm) to the stopper supporting section 41' of the plane, it has become possible to keep the development clearance Dsd within a small range of fluctuation for the established clearance.

A part of data arrived at the aforesaid conclusion is shown in both FIGS. 20 and 21 wherein fluctuations on the surface of the belt-shaped image carrier 1 are measured by a displacement gauge, then are subjected to A/D conversion and are shown as a fluctuation amount, in which FIG. 20 shows a position of measurement while FIG. 21 shows a fluctuation amount in the direction of the development clearance Dsd at the position of measurement shown in FIG. 20. By using a material of SUS as a backup member, arranging the structure to lightly contact with the back side of the belt-shaped image carrier 1 with stopper supporting section 41' having on its tip a radius of 3R and by applying the tensile force of 0.8 kg on one side as tension, the fluctuation on the belt surface is measured while rotating the belt-shaped image carrier 1 at linear speed of 102 mm/s in the arrowed direction. Fluctuation at the position (=0 mm) directly above the stopper supporting section 41' is shown in FIG. 21(a), fluctuation at the position being away toward the upstream side from the position by 2 mm (=2 mm) directly above the stopper supporting section 41' is shown in FIG. 21(b), fluctuation at the position being away similarly by 4 mm (=4 mm) is shown in FIG. 21(c), fluctuation at the position being away similarly by 6 mm (=6 mm) is shown in FIG. 21(d), and fluctuation at the position being away similarly by 10 mm (=10 mm) is shown in FIG. 21(e).

As is apparent from the test graph shown in FIG. 21, it was confirmed that dispersion of fluctuation is minimum at the position directly above the stopper supporting section 41', and the dispersion of fluctuation grows greater as a position goes away from that position, while the dispersion is within ±20 µm for the allowable value when the position is within a range of 0–5 mm. Tests were made also for the downstream side, and a difference of fluctuation between the upstream side and the downstream side has not been observed at all. Even when the tension for the belt was changed from 0.8 kg, a difference of fluctuation was hardly observed. Further, even in a change of linear speed of the belt-shaped image carrier 1, only a tendency of slight increase in fluctuation dispersion in the enhanced linear speed was observed. Inventors of the invention have confirmed from many tests that it is most appropriate to conduct non-contact development for a photoreceptor at the place within a range of 0 mm–5 mm from the stopper supporting section 41' either toward the upstream side or toward the downstream side.

A primary factor of a fluctuation amount at the position directly above the stopper supporting section 41' (=0) in the direction toward development clearance Dsd is the fluctuation in thickness of the belt-shaped image carrier 1, and a value of fluctuation shows minimum dispersion constantly. Therefore, it is most preferable to make an arrangement so that developing sleeve 55 may be located at the position corresponding to the aforesaid position. In this case, however, it is necessary that a line on which the stopper supporting section 41' comes in contact with the belt-shaped image carrier 1 and an axial line of the developing sleeve 55 keep parallelism accurately and have development clearance Dsd uniformly in the axial direction. At the point slightly away (=within 5) from this position directly above (=0) either toward the upstream side or toward the downstream side, even when the axial direction of the developing sleeve 55 is deviated aslant from the direction perpendicular to the rotational direction of the belt-shaped image carrier 1, the development clearance Dsd is not changed, and a fluctuation amount is within an allowable range. Therefore, mounting of developing sections 42, 43, 45 and 47 on a color image forming apparatus has been changed from the conventional one, and clearance accuracy can easily be maintained.

Incidentally, it is preferable that stopper supporting member 43' provided newly in the invention is united integrally with backup member 40' to be the same member, and it is appropriate that a molded resin member or a metallic member is used, and a material of SUS is also used from the viewpoint of strength. Further, in place of a color image forming apparatus wherein a color image is formed during one turn of a belt proved in the present embodiment, the invention can also be applied to a color image forming apparatus wherein one set of a scorotron charging electrode, an imagewise exposure section and four developing sections each housing developing agent of a different color is provided around a belt photoreceptor, and four toner images each having a different color are formed to be superposed while the belt photoreceptor makes four turns.

Further, an image forming apparatus of the invention can also be an image forming apparatus wherein a charging means, an imagewise exposure means and a developing means are arranged around a belt photoreceptor, and a monochromatic image is formed. In addition, the developing section mentioned above is not limited to non-contact developing, and it can also be a developing section which conducts contact developing.

(Fourth Embodiment)

As a fourth embodiment of an image forming apparatus of the invention, a color image forming apparatus will be explained as follows with reference to FIGS. 22–24. Since this color image forming apparatus is the same in terms of basic structure as the third embodiment, the same parts are given the same symbols and explanation therefor will be omitted here.

A scanning exposure means to be provided on an image forming apparatus of the invention, namely, each of imagewise exposure sections 25, 27, 29 and 31 is provided with polygon mirror 37 serving as a laser beam deflecting means which deflects a laser beam to scan as shown in FIG. 22, FIG. 23 and its top view in FIG. 24, driving circuit unit 222 serving as a driving means which controls drive of the polygon mirror 37 and an LED serving as a laser beam generating means (not shown) to be installed behind the polygon mirror 37, and a cylindrical lens and an fθ lens are positioned on an optical path which represents a laser beam reflected on the polygon mirror.

The optical member mentioned above are installed in a casing made of aluminum or of industrial resin, and exposure optical systems respectively for Y, M, C and K which are in the same shape as shown in FIG. 23 are arranged in a vertical row so that a scanning beam may be projected almost horizontally to the surface of the belt-shaped image carrier 1.

There is a certain space under each of the imagewise exposure sections 25, 27, 29 and 31 for the reason to establish a position for a scanning beam to project on the belt-shaped image carrier 1, and the driving circuit unit 222 is protruded to the space and a driving motor for the polygon mirror 37 is further protruded from an enclosure of the casing.

On the other hand, with regard to the main body of the image forming apparatus, a pair or two pairs of air inlet S are formed vertically on an outer wall on the rear side of the apparatus as shown on a top view in FIG. 24, and a pair or two pairs of air outlet E are formed vertically on an outer wall on the side of the apparatus, and there is provided slightly large propeller fan F inside each air outlet E.

Each propeller fan F mentioned above operates, simultaneously with the start of image forming, or with turning on of power supply, to make the relatively low temperature outside air sucked through the air inlet R to pass through the space for each of imagewise exposure sections 25, 27, 29 and 31 to form an electrical current, whereby the driving circuit unit 222 which generates a large amount of heat and is mounted to be protruded from the casing and the driving motor for polygon mirror unit 221 are cooled, and a warmed air current is immediately ejected out of the apparatus main body through the air outlet E.

As a result, abnormal temperature rise is prevented in advance for each of the imagewise exposure sections 25, 27, 29 and 31, and thereby the writing position adjusted and set in advance can accurately be maintained constantly, making it possible to form a color image with high quality, and harmful ozone in the apparatus generated by corona discharge can be removed if an ozone absorption filter is provided on the air outlet E.

For enhancing the cooling efficiency further, it is preferable to arrange the driving motor for the polygon mirror unit 221 and the driving circuit unit 222 to be close to the propeller fan F, and to arrange heat generating bodies such as fixing section 100 and a power supply to be far from the air inlet S, and thereby to cool the driving motor for the polygon mirror unit 221 and the driving circuit unit 222 with sucked air current at low temperature.

It is also possible to replace the position of the air inlet R with that of the air outlet E, and to take in the outside air with the propeller fan F to form an air current in the space under each of the imagewise exposure sections 25, 27, 29 and 31 for cooling.

Figure 8:
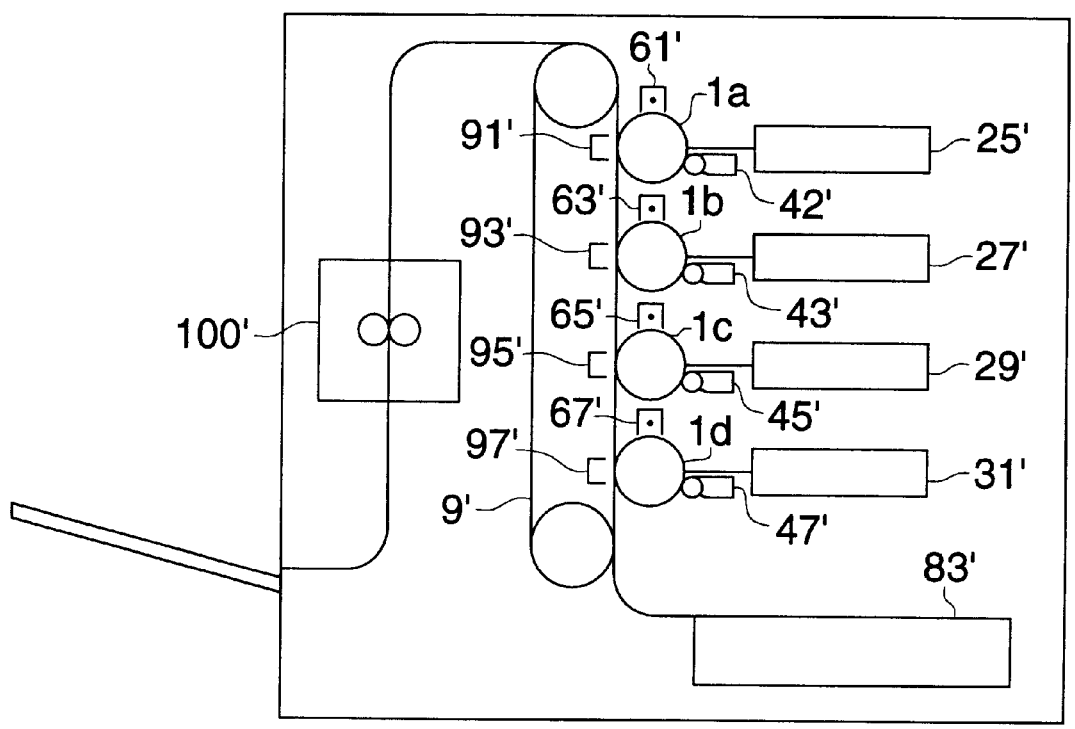
FIG. 8 is a side view showing schematically the structure of an image forming apparatus in the invention.

Incidentally, in the present embodiment, there has been explained an image forming apparatus wherein toner images are superposed in succession on a belt-shaped photoreceptor, and color toner images thus formed and superposed are collectively transferred onto a transfer sheet, but working of the invention with exactly the same means is possible by arranging plural scanning exposure means in each casing and by arranging them in a row, also for an apparatus of the so-called tandem type wherein an image forming means composed of a charging means, a scanning exposure means, and a developing section is provided around plural photoreceptors as shown in FIG. 8, and each toner image formed on a photoreceptor is superposed in succession on a transfer material for forming a color toner image.

(Fifth Embodiment)

Next, a color image forming apparatus in the fifth embodiment will be explained with reference to FIGS. 25–28. Since this apparatus is the same in terms of basic structure as the third embodiment, the same parts are given the same symbols and explanation therefor will be omitted here.

In the same way as in the third embodiment, voltage of sticking toner on color toner images formed on the surface of belt-shaped image carrier 1 is made uniform by scorotron charging electrode 21' or by pre-transfer exposure unit 25.

After the voltage of sticking toner is made uniform, color toner images are fed out of cassette 83 and 51 representing a transfer sheet holder or of manual feeding section 32 to be conveyed to timing roller 88, and then are transferred by transfer roller 92 arranged to face the lower portion of driving roller 7 which is for driving the belt-shaped image carrier 1 onto a transfer sheet which is fed, through driving of timing roller 33', in synchronization with a toner image area on the belt-shaped image carrier 1. In the area where the belt-shaped image carrier 1 comes near the transfer roller 92, a transfer area is generated by bias voltage which is impressed on the transfer roller 92 and sticking toner moves. Transfer/separation unit 47' can rotate around unit supporting shaft 47A serving as a fulcrum, and the transfer roller 92 is brought into close contact with the belt-shaped image carrier 1 by an action of coil spring 26A under the condition to be set at a prescribed position in the apparatus shown in FIG. 1.

The transfer sheet onto which the toner image has been transferred is conveyed, after being separated from the circumferential surface of the belt-shaped image carrier 1 which follows the curved surface of side roller 7, to fixing section 100 where it is heated and pressed, whereby toner is fused and fixed on the transfer sheet, and then is ejected out of the fixing section 100 and conveyed by sheet ejection and conveyance rollers 35A, 35B and 35C to be delivered onto sheet delivery tray 111 provided at the upper portion with a toner image surface on the transfer sheet facing downward.

On the other hand, the surface of the belt-shaped image carrier 1 from which the transfer sheet has been separated is scraped by cleaning blade 17 in cleaning means 11 so that residual toner is removed and cleaned, and the belt-shaped image carrier 1 is either ready for succeeding toner image forming for the following document image or is stopped momentarily to be on standby. Incidentally, in the case of succeeding toner image forming for the following document image, the photoreceptor surface of the belt-shaped image carrier 1 is subjected to exposure conducted by pre-charging exposure unit 28 so that hysteresis is removed.

Developing sections 42, 43, 45 and 47 are arranged vertically upward or downward directly in this order. The surface of the belt-shaped image carrier 1 where these four developing sections 42, 43, 45 and 47 are arranged to be close to each other is inclined from the vertical direction, and a clearance between the belt-shaped image carrier 1 and developing sleeve 55 is made to be the same for four developing sections 42, 43, 45 and 47. Therefore, the developing section 43 is slightly deviated to the left from the developing section 42 in the drawing. In the same way, the developing section 45 is slightly deviated to the left from the developing section 43 in the drawing, and the developing section 47 is slightly deviated to the left from the developing section 45 in the drawing.

Imagewise exposure sections 25, 27, 29 and 31 are arranged vertically upward or downward directly in this order. Since the belt-shaped image carrier 1 is inclined as stated above, the imagewise exposure section 27 is slightly deviated to the left from the imagewise exposure section 25 to be superposed each other in the drawing. In the same way, the imagewise exposure section 29 is slightly deviated to the left from the imagewise exposure section 27 to be superposed each other in the drawing, and the imagewise exposure section 31 is slightly deviated to the left from the imagewise exposure section 29 to be superposed each other in the drawing.

Developing sections 42, 43, 45 and 47 arranged vertically as stated above are located, in the horizontal direction, on the right side of the belt-shaped image carrier 1 in the drawing, and imagewise exposure sections 25, 27, 29 and 31 arranged vertically are located, in the horizontal direction in the drawing, on the right side of the developing sections 42, 43, 45 and 47 arranged vertically. A two-dot chain line is a virtual line showing an example of a vertical plane which intersects with the belt-shaped image carrier 1 and is in parallel with a rotary shaft of the side roller 7. In FIG. 25, the vertical plane is expressed as a straight line because the state viewed in the same direction as in the rotary shaft is shown in FIG. 25.

When these four developing sections 42, 43, 45 and 47 and four imagewise exposure sections 25, 27, 29 and 31 are viewed through from their sides, they show that they are arranged at the position where they are superposed on the belt-shaped image carrier 1.

Since the developing sections 42, 43, 45 and 47 are arranged to be deviated each other, developing sections 42 and 43 have a portion which is slightly superposed on imagewise exposure section 31 arranged at the leftmost side in the drawing when the developing sections 42 and 43 are viewed through from the top.

Four imagewise exposure sections 25, 27, 29 and 31 are arranged above sheet-feeding cassette 410, and when the imagewise exposure section 31 which is located at the leftmost position in the drawing is viewed through from the top, a part of the imagewise exposure section 31 is slightly protruded from the sheet-feeding cassette 410, but other imagewise exposure sections 25, 27, 29 do not protrude when viewed through from the sheet-feeding cassette 410.

Since the imagewise exposure sections 25, 27, 29 and 31 are arranged in the horizontal direction of the belt-shaped image carrier 1 which is arranged to be long lengthwise in a color image forming apparatus as stated above, it was possible to arrange a rotary shaft of each polygon mirror 221 to be vertical and thereby to arrange, avoiding the position where toner tends to lie under each of the developing sections 42, 43, 45 and 47. Further, since each of the imagewise exposure sections 25, 27, 29 and 31 corresponding respectively to each of the developing sections 42, 43, 45 and 47, just like the imagewise exposure section 25 and the developing section 42 both contributing to formation of the same color toner image are superposed when they are viewed through horizontally, it is possible to make the image forming apparatus to be short in height.

With regard to relative positions for side roller 7, upper roller 3, lower roller 5 and pressure roller 9, the uppermost portion of belt-shaped image carrier 1 is a portion where the belt-shaped image carrier 1 is trained about rotary roller 3, and the lowermost portion thereof is a portion where the belt-shaped image carrier 1 is trained about the lower roller 5, in the drawing. Let it be assumed that a distance from the uppermost portion to the lowermost portion of the belt-shaped image carrier 1 for K is a longitudinal distance. On the other hand, the leftmost portion is a portion where the belt-shaped image carrier 1 is trained about driving roller 7 and the rightmost portion is a portion where the belt-shaped image carrier 1 is pushed out by backup member 40', and a distance from the rightmost portion to the leftmost portion is assumed to be a lateral distance. In the belt-shaped image carrier 1, the longitudinal distance is greater than the lateral distance, and the belt-shaped image carrier 1 is arranged to be long lengthwise.

Next, a conveyance path will be explained. In the present embodiment, transfer sheets each being of a size of A4 or smaller are loaded in a sheet-feeding cassette. The transfer sheets are held obliquely because one end of sheet-supporting plate 42 is pushed up by an action of a spring.

On a basis of one at a time, the transfer sheets held obliquely are fed into feed rollers 44 by pickup roller 430 and then are conveyed to the conveyance path 46 by the feed rollers 44. In the conveyance path 46 (shown with one-dot chain lines in the drawing), two conveyance guide plates 45A and 45B each representing a metallic plate are arranged to be away by several millimeters from each other, and the other two conveyance guide plates 45C and 45D are arranged to be away by the same distance from each other, and a space between the conveyance guide plate 45A and the conveyance guide plate 45B is conveyance path 46A, and a space between the conveyance guide plate 45C and the conveyance guide plate 45D is conveyance path 46B, both of which represent a part of the conveyance path through which a transfer sheet passes. Though the conveyance path 46 is split by timing roller 88 into two portions of the conveyance paths 46A and 46B, a transfer sheet can be conveyed almost in a straight line from the sheet-feeding cassette to transfer roller 92.

Sheet-feeding cassette 510 holds therein transfer sheets of a size of B4 or smaller. Transfer sheets which are held obliquely by sheet-supporting plate 520 in the same way as the transfer sheets in the sheet-feeding cassette are fed into conveyance path 56 (shown with broken lines in the drawing) by pickup roller 530 and feed roller 54, on a basis of one at a time. In the structure of a conveyance path, conveyance path 56A is formed by bringing conveyance guide plates 55A and 55B to be close each other with five conveyance guide plates 55A, 55B, 55C, 55D and 55E each representing a metallic plate, and conveyance path 56B is formed by bringing conveyance guide plates 55D and 55E to be close each other for the conveyance guide plates 55D, and a transfer sheet is caused to pass through the clearance thus formed. At the straight portion of the conveyance path 56, conveyance guide plates are arranged to form a clearance of several millimeters, while at the first and second turning portions 60A and 60B, conveyance guide plates are arranged to form a clearance of the maximum of about 1 cm, so that a transfer sheet passes through the conveyance path 56 formed between the guide plates. Though the conveyance path 56 is split into two portions in the vicinity of conveyance roller 57, a direction of a transfer sheet can be changed clockwise in the drawing by about 180° from the direction of conveyance made by pickup roller 530, at the first turning portion 60A. The transfer sheet whose direction has been changed is temporarily conveyed straight and passes through the upper portion of the sheet-feeding cassette 510, and then is changed in terms of direction counterclockwise in the drawing by about 130° at the second turning portion 60B, thus, the transfer sheet is merged into the conveyance path 46 before the timing roller 88. An S-shaped conveyance path is provided with two turning portions where a direction of a transfer sheet is reversed as stated above.

The conveyance path 56 representing the second conveyance path passes through a range including mostly the horizontal direction of a sheet-feeding cassette and the vertical direction of sheet-feeding cassette 510. A vertical plane (in the drawing) passing through transfer roller 92 intersects with transfer sheets loaded on sheet-feeding cassette 510 under the condition that the vertical plane is in contact with pickup roller 430 and is not in contact with feed roller 44, and the first turning portion 60A and the second turning portion 60B are arranged on both sides of the vertical plane. On the other hand, the vertical plane is arranged at the position where it does not intersect with transfer sheets loaded on the sheet-feeding cassette 410.

Since the sheet-feeding cassette 410 is arranged directly under the imagewise exposure sections 25, 27, 29 and 31, it was possible to make the conveyance path 46 shown with a one-dot chain line in the drawing to be almost straight. It was therefore possible to control occurrence of transfer sheet jamming. In addition, since the sheet-feeding cassette is arranged directly under the imagewise exposure sections 25, 27, 29 and 31, a space occupied horizontally by the imagewise exposure sections 25, 27, 29 and 31 and a space occupied horizontally by the sheet-feeding cassette in a color image forming apparatus are used commonly, which makes the space occupied horizontally to be used efficiently, while controlling an increase of the space. Since the imagewise exposure sections 25, 27, 29 and 31 and the developing sections 42, 43, 45 and 47 are arranged in the horizontal direction of the belt-shaped image carrier 1, it was possible to save the space in the vertical direction in the color image forming apparatus.

Since the laser scanning optical system represents the imagewise exposure sections 25, 27, 29 and 31 which are arranged in the horizontal direction of the belt-shaped image carrier 1 in the present embodiment, polygon mirrors 221 are arranged with their rotating shafts pointing upward vertically. When the rotating shaft of the polygon mirror 221 is kept obliquely or horizontally in stead of vertically, the rotating shaft tends to be blurred, and when it is blurred, a latent image is formed under the state wherein an optical path of the laser beam is deviated, which sometimes causes an outputted image with lowered quality. When the rotating shaft of the polygon mirror 221 is kept to be vertical as in the present embodiment, it is possible to be free from the problem mentioned above, and stable forming of a latent image is possible. When the laser scanning optical system is used, an optical path extending up to the belt-shaped image carrier 1 needs to be long and a space for the exposure optical system needs to be large, which makes an application of the invention to be effective.

In the present embodiment, there are provided sheet-feeding cassette 410 with which a transfer sheet is conveyed through straight conveyance path 46 and sheet-feeding cassette 510 with which a transfer sheet is conveyed through S-shaped conveyance path 56. In this case, when transfer sheets in A4 size used frequently generally are loaded on cassette 410 and transfer sheets in B4 size used less frequently are loaded on cassette 510, for example, the straight conveyance path 46 is used frequently and the S-shaped conveyance path 56 is used less frequently. Therefore, a period of time to use the conveyance path 56 is short in the total time for using a color image forming apparatus, which can reduce occurrence of sheet jamming in total. Further, since the sheet-feeding cassette 510 representing an example of the second transfer object holding means is arranged directly under the sheet-feeding cassette 410 representing an example of the first transfer object holding means, a space in the horizontal direction is used by both cassettes in common, which can control an increase of the space in the horizontal direction.

Since the radius of curvature on two turning portions 60A and 60B in the conveyance path 56 is made to be 15 mm or more, it is possible to control occurrence of sheet jamming even in the case of an S-shaped conveyance path.

When a cassette is compared with sheet-feeding cassette 510, the sheet-feeding cassette 510 is greater in terms of a dimension in the horizontal direction, whereby it can hold transfer sheets in greater size. In the case of a color image forming apparatus provided with two or more sheet-feeding cassettes as in the present embodiment, when a sheet-feeding cassette that feeds transfer sheets in greater size is arranged to be lower, and a sheet-feeding cassette that feeds transfer sheets in smaller size is arranged to be higher, it is possible to control an increase of dimensions in the horizontal direction of the color image forming apparatus and to provide a sheet-feeding cassette capable of feeding a sheet straight in the apparatus.

Next, jam recovery in a color image forming apparatus will be explained with reference to FIGS. 26–28. The jam recovery means a restoration work to be done after occurrence of sheet jamming, and in this case, the work to remove a jammed sheet from the vicinity of the turning portion will be explained. The jammed sheet means the transfer sheet left in the apparatus by sheet jamming.

Transfer/separation unit 47' is set at the position shown in FIG. 27 in the case of jam recovery, and it is set at the position in FIG. 26 in the case of other than the jam recovery. For removing jammed sheet P1 which was jammed at transfer roller 92, for example, after passing through timing roller 88, an operator takes hold of handle 47B of the transfer/separation unit 47' to release the lock which fixes the transfer/separation unit 47', and rotates it in the direction of arrow mark L from the position in FIG. 26, namely in the direction toward conveyance guide plate 55D, to open the transfer/separation unit 47' to the position shown in FIG. 27 and to open the conveyance path S. The operator can remove the jammed sheet PI from the opened conveyance path S, and when the transfer/separation unit 47' is set again to the position in FIG. 20 after removing the jammed sheet, the conveyance path S is formed at the interval stated above.

On the other hand, conveyance guide plate 55D is set at the position shown in FIG. 28 in the case of jam recovery, and it is set at the position shown in FIG. 26 in the case of other than the jam recovery. For removing jammed sheet P2 which was jammed after arriving at conveyance roller 57, an operator takes hold of handle 59 to release the lock and rotates the conveyance guide plate 55D in the direction of arrow mark M from the position in FIG. 26, namely, toward the transfer/separation unit 47', around supporting shaft 58 serving as a fulcrum to open it to the position shown in FIG. 28 so that the conveyance path 56B is opened. The operator can remove the jammed sheet P2 from the opened conveyance path 56B, and when the conveyance guide plate 55D is set again to the position in FIG. 26 after removing the jammed sheet, the conveyance path 56B is formed at the interval stated above.

A space occupied after transfer/separation unit 47' is rotated and a space occupied after conveyance guide plate 55D is rotated are surrounded by both the transfer/separation unit 47, and the conveyance guide plate 55D, and represent a pillar-shaped half space having a triangular section in which the second turning portion 60B is one of the apexes. Since the transfer/separation unit 47' and the conveyance guide plate 55D own the varying space jointly, the space in the color image forming apparatus can be utilized efficiently.

In the present embodiment, the space is arranged directly above the sheet-feeding cassette 510 to control an increase of the space in the horizontal direction.

Since handle 59 is fixed by an unillustrated cam mechanism so that it can not be held when handle 47B is held, there is arranged so that it is impossible to open the conveyance path 56B by opening the conveyance guide plate 55D when the handle 47B is held by an operator. On the other hand, since handle 47B is fixed by an unillustrated cam mechanism so that it can not be held when handle 59 is held, there is arranged so that it is impossible to open the conveyance path 46B by opening the transfer/separation unit 47' when the handle 59 is held by an operator.

Incidentally, a jammed sheet which is caught at the location before timing roller 33' can be cleared if the sheet-feeding cassette 410 is taken out of the apparatus, while a jammed sheet which is caught at the location before a conveyance roller can be cleared if the sheet-feeding cassette 510 is taken out of the apparatus.

As an example of a guide in the invention, there are shown examples of transfer/separation unit 47' and conveyance guide plate 55D. An opening door may be of either an arrangement wherein a member such as transfer roller 92 or the like is solidly displaced together with sheet-feeding guide plate 45C that covers a conveyance path directly like the transfer/separation unit 47' or an arrangement wherein only a member covering a conveyance path like conveyance guide plate 55D is displaced.

In the explanation above, the expression of arranging by placing in the horizontal direction means that constituent members are placed at positions to be superposed each other when they are viewed through horizontally from the side of a color image forming apparatus.

Further, the expression of arranging directly above or arranging directly under means that constituent members are placed at positions to be superposed each other when they are viewed through vertically from the top of a color image forming apparatus.

Further, the S-shaped conveyance means the conveyance system wherein a transfer object taken out of a transfer object holding means passes through the portion right above the transfer object holding means at the first turning portion, and the second turning portion changes the direction of the transfer object oppositely to the first turning portion.

With regard to the relative positions of belt supporting means such as each roller and a backup member about which a belt-shaped image carrier is trained, it is possible to make a distance in the vertical direction to be greater when comparing the distance in the vertical direction with that in the horizontal direction and to arrange the belt-shaped image carrier to be long lengthwise.

Next, an effect of the aforesaid arrangement of sheet-feeding cassettes in an image forming apparatus will further be explained. With regard to a conventional sheet-feeding unit shown in FIG. 29, sheets of both sizes are turned by 180° as stated above. Therefore, when the curvature of the turning is made greater, there is caused a possibility of sheet jamming. If the curvature is made smaller, therefore, distance n in the vertical direction from the bottom surface of large-sized sheet-feeding cassette 410b to transfer means 41c becomes greater, resulting in an increase of the total height of the apparatus. With regard to a sheet-feeding unit shown in FIG. 30, the possibility of sheet jamming is small because paths c and d are not turned, but distance m in the horizontal direction from an edge of the large-sized sheet-feeding cassette 410b to transfer means 41c becomes greater, resulting in a greater width in the lateral direction of the total apparatus, which has been a problem.

Contrary to this, in the apparatus of the embodiment, path e from small-sized sheet-feeding cassette 410a is formed to be almost straight toward transfer means 41c and path f from large-sized sheet-feeding cassette 410b is formed to be S-shaped by turning its conveyance direction by 120° or more twice, so that it joins the path e. Owing to the sheet-feeding unit shown in FIG. 31, it is possible to control both distance n in the vertical direction and distance m in the horizontal direction to the minimum length, and thereby to structure the image forming apparatus housing therein a sheet-feeding unit to be compact. Since the path e for small-sized sheets is almost straight, there is hardly a possibility of sheet jamming, making the ideal sheet-feeding possible. On the other hand, though the possibility of sheet jamming is greater in the path f for large-sized sheets than in the path for small-sized sheets, there is no problem substantially for large-sized sheets because their stiffness is lower than that for small-sized sheets.

According to the above image forming apparatus, by providing a cleaning means which removes developing agents on an image carrier, at the upper portion on the surface where the image carrier moves upward from the bottom to the top, it is possible to cause the removed developing agents to fall with the force of gravity without using a conveying means, which makes the mechanism to be simple and an apparatus to be small in size.

Due to a collecting means provided under the cleaning means, developing agents removed by the cleaning means fall with the force of gravity and are collected into the collecting means. Therefore, a conveying means is not necessary and an apparatus can be made small.

Further, by providing the collecting means along an image carrier, it is possible to prevent that the image carrier is adversely affected by the heat generated by a fixing section. When a guide means which guides the image carrier toward the closed space formed by the image carrier is provided on the surface where the image carrier moves from the bottom to the top and when the developing agent collecting means is provided along the image carrier, the image carrier is bent by the guide means toward the closed space formed by the image carrier. By providing the developing agent collecting means in the space formed by this bending, the apparatus can be made small.

Due to the grid having life similar to that of an image carrier which is provided on an image carrier cartridge, the image carrier and the grid can be replaced simultaneously after one cycle of operation, which makes the parts replacement to be simple.

By providing the grid on the image carrier cartridge so that the grid and the image carrier are united solidly, the distance between the grid and the image carrier which requires strict distance accuracy can always be kept at constant accuracy.

Due to a charging electrode having life similar to that of a developing section which is provided on an image forming cartridge, the developing section and the charging electrode can be replaced simultaneously after one cycle of operation, which makes the parts replacement to be simple.

Due to the grid having life similar to that of an image carrier which is provided on an image carrier cartridge, the image carrier and the grid can be replaced simultaneously after one cycle of operation, which makes the parts replacement to be simple.

By providing the grid on the image carrier cartridge so that the grid and the image carrier are united solidly, the distance between the grid and the image carrier which requires strict distance accuracy can always be kept at constant accuracy.

Due to the grid having life similar to that of an image carrier which is provided on an image carrier cartridge, the image carrier and the grid can be replaced simultaneously after one cycle of operation, which makes the parts replacement to be simple.

By providing a cleaning means to remove developing agents on an image carrier at the upper portion of the surface of the image carrier moving from the bottom to the top on the image carrier cartridge and by providing a developing agent collecting means which collects developing agents removed by a cleaning means at the lower portion of the cleaning means, it is possible to cause the removed developing agents to fall with the force of gravity without using a conveying means, which makes the mechanism of the image carrier cartridge to be simple and small. It is further possible to make an image carrier cartridge to be small by providing a developing agent collecting means along the image carrier.

Owing to the above image carrier cartridge, it is possible to make the mechanism to be simple and to make an image forming apparatus to be provided with the image carrier cartridge to be small in size.

Due to the grid having life similar to that of an image carrier which is provided on an image carrier cartridge, the image carrier and the grid can be replaced simultaneously after one cycle of operation, which makes the parts replacement to be simple.

By providing a conveyance path between a detecting means and an image carrier, it is possible to make an apparatus to be small without interfering with the conveyance path.

When a light-transmitting cover member on which the transfer material mentioned above slides is provided on the conveyance path which faces the detecting surface of the detecting means, the transfer material slides on the cover member and thereby paper dust and dust sticking to the cover member are removed, whereby the detecting accuracy of the detecting means can always be kept constant.

It has become possible to provide an image forming apparatus wherein a belt-shaped photoreceptor rotates at constant speed around rotary rollers without any slip, a developing clearance formed between the belt-shaped photoreceptor and a developing sleeve can be set easily and accurately, and fluctuation caused during rotation of the belt can be limited within an allowable range, thus excellent image forming can be conducted.

In the above image forming apparatus, an air current for cooling use is formed in the apparatus main body, the air current is caused to flow in the same direction through clearances between exposure optical systems, and further the cooling efficiency can be enhanced to control temperature rise of each exposure optical system and to maintain constantly the temperature within an appropriate temperature range, resulting in that a position of an image written by each exposure optical system agrees with others accurately and a color image with high quality can always be obtained despite continuous use for a long time.

In the above image forming apparatus provided, occurrence of sheet jamming can be controlled, an increase of a floor space occupied by a color image forming apparatus can be controlled, and a high quality color image can be formed.

It is possible to realize a small-sized apparatus by arranging a sheet-feeding cassette housing therein small-sized recording sheets and a sheet-feeding cassette housing therein large-sized recording sheets efficiently, and to provide a sheet-feeding unit and an image forming apparatus wherein recording sheets can be conveyed smoothly.

It is possible to provide an image forming apparatus wherein thermal deformation caused by heat from a fixing device can be prevented for plural laser scanning optical units in the apparatus, and thereby a position slip between the units can be prevented, thus, a high quality color image without shear can be formed.

It is possible to provide a scanning optical unit and an image forming apparatus wherein when plural color images formed by plural laser beams emitted from plural laser scanning optical units are superposed on an image carrier or on a recording medium, the color images are not deviated in the sub-scanning direction, and thereby an appropriate color image with high quality can be formed.

It is possible to provide an image forming apparatus wherein plural charging means, plural developing means, and plural exposure means are arranged around an image carrier to make space saving possible and to realize a small-sized apparatus, and to provide an image forming apparatus and an image forming cartridge wherein plural developing sections and plural charging means can be replaced easily and operability for a user can be improved.

It is possible to provide an image forming apparatus for scanning an image carrier for image forming with plural laser beams through each rotary polygon mirror wherein a color image with high quality can be obtained by preventing deviation of scanning positions of plural laser beams on the image carrier and by scanning at an appropriate position.

It is possible to provide an image forming apparatus having a belt-shaped photoreceptor trained about plural rollers wherein an excellent image can be obtained by preventing that toner is scattered from the belt photoreceptor and by transferring the toner image formed on the belt photoreceptor onto a recording sheet properly.

It is possible to provide an image forming apparatus for forming toner images continuously on a belt-shaped image carrier which has a seam and rotates and for transferring the images onto a recording sheet wherein a developed length of the belt-shaped image carrier and an effective image area thereon can be set by considering a length of the recording sheet and sheet-feeding intervals for the purpose of transferring onto the recording sheet continuously and efficiently, and small-sized apparatus can be attained.

What is claimed is:

1. An image forming apparatus, comprising:

a belt-shaped sheet conveying member arranged lengthwise so as to form a first surface and a second surface which are extended in a substantially vertical direction;

a plurality of photoreceptor drums arranged in parallel in the substantially vertical direction along the first surface of the belt-shaped sheet conveying member, wherein each photoreceptor drum is provided with a charging device, an image exposing device, a developing device, and a transfer device so that different color toner images are formed on the plurality of photoreceptor drums respectively and are transferred to a sheet conveyed on the first surface of the belt-shaped sheet conveying member; and a fixing device, provided at the second-surface side of the belt-shaped sheet conveying member, to fix the different color toner images transferred on the sheet simultaneously.

2. An image forming apparatus comprising:

a belt-shaped image carrying member;

a plurality of charging devices for charging the belt-shaped image carrying member;

a plurality of latent image forming devices for forming latent images on the charged belt-shaped image carrying member;

a plurality of developing devices for developing the latent images so as to form toner images;

a transfer section for transferring the toner images onto a sheet; and a fixing section for fixing the toner images on the sheet;

wherein the belt-shaped image carrying member is arranged lengthwise so as to form a first surface and a second surface which are extended in a substantially vertical direction, and all of said plurality of latent image forming devices are arranged in parallel in the substantially vertical direction along the first surface; and wherein the fixing section is located facing substantially a center portion of the second surface of the belt-shaped image carrying member.

3. The image forming apparatus according to claim 2, wherein said developing devices and said latent image forming devices respectively correspond to each color of yellow, magenta, cyan and black, and each developing device contains a respective one of yellow, magenta, cyan and black color toners.

4. An image forming apparatus comprising:

a belt-shaped image carrying member;

a plurality of charging devices for charging the belt-shaped image carrying member;

a plurality of latent image forming devices for forming latent images on the charged belt-shaped image carrying member;

a plurality of developing devices for developing the latent images so as to form toner images; and a transfer section for transferring the toner images onto a sheet;

wherein the belt-shaped image carrying member is arranged lengthwise so as to form a first surface and a second surface which are extended in a substantially vertical direction, and the plurality of latent image forming devices are arranged in parallel in the substantially vertical direction along the first surface;

wherein the plurality of developing devices are provided in a single body so as to form a developing cartridge; and wherein the developing cartridge is arranged along the first surface of the belt-shaped image carrying member and has a hole through which a laser beam is projected to the belt-shaped image carrying member.

5. An image forming apparatus comprising:

a belt-shaped image carrying member;

a plurality of charging devices for charging the belt-shaped image carrying member;

a plurality of latent image forming devices for forming latent images on the charged belt-shaped image carrying member;

a plurality of developing devices for developing the latent images so as to form toner images; and a transfer section for transferring the toner images onto a sheet;

wherein the belt-shaped image carrying member is arranged lengthwise so as to form a first surface and a second surface which are extended in a substantially vertical direction, and the plurality of latent image forming devices are arranged in parallel in the substantially vertical direction along the first surface; and wherein an air intake port and an air exhaust port are provided on at least a single plane which crosses perpendicularly all of the plurality of latent image forming devices.

6. An image forming apparatus comprising:

an image carrying member;

a plurality of charging devices for charging the image carrying member;

a plurality of laser exposing units for scanning the charged image carrying member with laser beams so as to form latent images at a predetermined position on the image carrying member;

a plurality of developing devices for developing the latent images so as to form toner images; and a transfer section for transferring the toner images onto a sheet;

wherein the plurality of laser exposing units are fixed to each other as a single body so that each laser beam of said laser exposing units is parallel to another laser beam with a predetermined interval; and wherein each laser unit has a polygon mirror from which the laser beams are directly projected to a surface of the image carrying member without reflecting on a mirror.

7. The image forming apparatus according to claim 6, wherein the image carrying member is belt shaped and arranged lengthwise so as to form a first surface and a second surface which are extended in a substantially vertical direction, and the plurality of laser exposing units are fixed to each other as the single body such that the plurality of laser exposing units are arranged in parallel in the substantially vertical direction along the first surface of the image carrying member.

8. The image forming apparatus according to claim 7, wherein the polygon mirror of each laser exposing unit has a rotation axis which is parallel to a rotation axis of the polygon mirror of another laser exposing unit.

9. The image forming apparatus according to claim 6, wherein the plurality of laser exposing units are fixed in the single body so as to make the scanning plane of each laser exposing unit parallel to the scanning plane of another laser exposing unit.

10. The image forming apparatus according to claim 9, wherein the polygon mirror of each laser exposing unit has a rotation axis which is parallel to a rotation axis of the polygon mirror of another laser exposing unit.

11. An image forming apparatus comprising:

an image carrying member;

a plurality of charging devices for charging the image carrying member;

a plurality of laser exposing units for scanning the charged image carrying member with laser beams so as to form latent images at a predetermined position on the image carrying member;

a plurality of developing devices for developing the latent images so as to form toner images; and a transfer section for transferring the toner images onto a sheet;

wherein the plurality of laser exposing units are fixed to each other with adhesive at predetermined positions as a single body so that a scanning plane of each laser exposing unit becomes parallel to a scanning plane of another laser exposing unit, whereby each laser beam of said laser exposing units scans at an accurate interval.

12. An image forming apparatus comprising:

a belt-shaped image carrying member;

a plurality of charging devices that charge the belt-shaped image carrying member;

a plurality of latent image forming devices that form latent images on the charged belt-shaped image carrying member;

a plurality of developing devices that develop the latent images so as to form toner images;

a transfer section that transfers the toner images onto a sheet; and a cleaning unit that removes residual toner on the belt-shaped image carrying member using a blade member, and that stores the residual toner in a toner collection box;

wherein the belt-shaped image carrying member moves upwardly between a lower roller and an upper roller and is arranged lengthwise so as to form a first surface and a second surface which are extended in a substantially vertical direction, and the plurality of latent image forming devices are arranged in parallel in the substantially vertical direction along the first surface; and wherein said toner collecting box comprises a longitudinal space and is located along the second surface of the belt-shaped image carrying member, and the blade member of the cleaning unit comes in contact with the belt-shaped image carrying member at a position corresponding to the upper roller so that the residual toner on the belt-shaped image carrying member is removed, dropped against the second surface of the belt-shaped image carrying member, and then stored in said toner collecting box.

13. The image forming apparatus according to claim 12, wherein an opening portion is provided in an upper portion of the toner collecting box, and the residual toner dropped by the blade member passes through the opening portion.

14. An image forming apparatus comprising:

a belt-shaped sheet conveying member arranged lengthwise so as to form a first surface and a second surface which are extended in a substantially vertical direction;

a plurality of photoreceptor drums arranged in parallel in the substantially vertical direction along the first surface of the belt-shaped conveying member, each of said photoreceptor drums being provided with a charging device, an image exposing device, a developing device, and a transfer device, such that respective different color toner images are formed on the plurality of photoreceptor drums and then transferred onto a sheet to form a superposed color toner image on the sheet; and a fixing device, provided along the second surface of the belt-shaped sheet conveying member, that simultaneously fixes the different color toner images forming the superposed color toner image on the sheet.

15. The image forming apparatus according to claim 14, wherein all of said image exposing devices of said plurality of photoreceptor drums are arranged in parallel in the substantially vertical direction along the first surface of the belt-shaped sheet conveying member.

* * * * *